(12) United States Patent
Berg et al.

(10) Patent No.: US 6,362,897 B1
(45) Date of Patent: Mar. 26, 2002

(54) PRINTING SYSTEM AND METHOD FOR PRINTING DOCUMENTS AND FORMS

(75) Inventors: Brian D. Berg, Springboro; Randy McGee, Huber Heights; Michael L. Swabb, Moraine; Jefferson Allan, Westchester, all of OH (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 08/402,031

(22) Filed: Mar. 10, 1995

(51) Int. Cl.[7] ............................................. G06K 15/00
(52) U.S. Cl. ..................................... 358/1.6; 358/1.1
(58) Field of Search ................................ 395/101, 106, 395/109, 110, 118, 133, 149, 156; 358/448, 452, 462

(56) References Cited

U.S. PATENT DOCUMENTS

| | | | |
|---|---|---|---|
| 4,604,690 A | | 8/1986 | Suganuma et al. ........... 395/700 |
| 4,677,551 A | | 6/1987 | Suganuma ............... 364/401 R |
| 4,899,292 A | * | 2/1990 | Montagna et al. ........... 345/147 |
| 4,939,670 A | | 7/1990 | Freiman et al. .............. 395/110 |
| 5,060,980 A | | 10/1991 | Johnson et al. ................ 283/70 |
| 5,241,464 A | | 8/1993 | Greulich et al. ......... 364/401 R |
| 5,315,504 A | | 5/1994 | Lemble ....................... 364/400 |
| 5,410,646 A | * | 4/1995 | Tondevold et al. .......... 395/149 |
| 5,445,565 A | * | 2/1996 | Millard et al. ............... 395/147 |
| 5,530,793 A | * | 6/1996 | Watkins et al. .............. 395/117 |
| 5,563,999 A | * | 10/1996 | Yausich et al. .............. 395/149 |

FOREIGN PATENT DOCUMENTS

EP     0486160     5/1992

* cited by examiner

Primary Examiner—Gabriel Garcia
(74) Attorney, Agent, or Firm—Killworth, Gottman, Hagan & Schaeff LLP

(57) ABSTRACT

A printing system for printing documents and forms, as needed, in response to user-entered commands, includes a touch screen monitor for displaying information regarding the documents and forms, and user options, and for entry of commands by the user. A memory stores a plurality of documents and forms, the documents and forms being organized into a plurality of libraries, and stores software to control the display of options on the monitor and the interpretation and implementation of commands entered on the monitor. A printer prints documents and forms, and a processor, responsive to the monitor and the memory and communicating therewith, is connected to the printer to control printing of a document or form by the printer upon selection thereof by a user and entry of commands via the touch screen monitor. The memory further stores software to control the display and printing of the documents and forms without the native applications in which the documents and forms were created.

30 Claims, 6 Drawing Sheets

LIBRARIES

- ADMISSIONS
- EMERGENCY / TRAUMA
- EMPLOYEE INSURANCE
- EMPLOYMENT / HUMAN RESOURCES
- LABORATORY
- MATERNITY
- OUTPATIENT CLINICS / THERAPY
- PATIENT SOCIAL / FINANCIAL SERVICES
- PHARMACY
- PSYCHIATRY / PSYCHOLOGY
- PURCHASING
- SURGERY

FIG. 2

| LIBRARIES | DOCUMENTS |
|---|---|
| ADMISSIONS | MEDICAL INSURANCE CLAIMS |
| EMERGENCY / TRAUMA | DENTAL INSURANCE CLAIMS |
| EMPLOYEE INSURANCE | EYEGLASSES INSURANCES CLAIMS |
| EMPLOYMENT / HUMAN RESOURCES | INSURANCE INROLLMENT |
| LABORATORY | INSURANCE PLAN DESCRIPTION KIT |
| MATERNITY | MEDICAL INSURANCE PLAN DESCRIPTION |
| OUTPATIENT CLINICS / THERAPY | DENTAL INSURANCE PLAN DESCRIPTION |
| PATIENT SOCIAL / FINANCIAL SERVICES | EYEGLASSES INSURANCE PLAN DESCRIPTION |
| PHARMACY | |
| PSYCHIATRY / PSYCHOLOGY | |
| PURCHASING | |
| SURGERY | |

FIG. 3

PRINT SCREEN

NUMBER OF COPIES:   1

▨ UP

▨ DOWN

▨ PRINT

▨ CANCEL

PRINTING SYSTEM AND METHOD FOR PRINTING DOCUMENTS AND FORMS

BACKGROUND OF THE INVENTION

The present invention relates to a printing system and method for printing documents and forms as needed by the user of such documents and forms and, more particularly, to such a printing system and method in which the user interface by which user-entered commands are supplied to the system is simplified and improved.

Numerous standard documents and business forms are used by almost every business or other organization of any size in carrying out its routine activities. Generally speaking, such documents and forms are used to disseminate, collect and manage information on a number of subjects. For example, a business typically will use a variety of forms for employee insurance programs. Claim forms are usually required for each type of insurance (e.g., medical insurance, dental insurance, eyeglasses insurance, etc.), as well as insurance enrollment forms, and insurance plan description documents. Commonly, a large number of different documents and forms will be used and must be dispensed at a single location. In order to do this, supplies of the documents and forms must be ordered in advance based on estimated usage, and periodically inventoried at the location. This, in turn, requires planning and maintenance of inventories, a costly and time consuming activity. Commonly, inventories of forms will run low from time to time, especially when form usage is unexpectedly high, sometimes resulting in restricting or delaying whatever activities are associated with the forms in question. This shortage of particular forms can be avoided, for the most part, by stocking an excessively large number of documents and forms, a great many more documents and forms than can reasonably be anticipated to be used. This approach has the disadvantage, however, of requiring more storage space than is preferable, while also resulting in an excessive number of forms being left over and discarded whenever the documents and forms are changed in design or content.

It is seen, therefore, that there is a need for a printing system for printing documents and forms, as needed, in response to user-entered commands; for such a printing system for printing documents and forms, as needed, in response to user entered commands in which the documents and forms are stored in a variety of computer formats and in which the native applications in which the documents and forms were created are not stored; for a method of operating such a system, in which copies of any of a large number of different documents and business forms are stored in a variety of computer formats and may be printed at a single location without the native application in which the documents and business forms were created; and for a method of operating such a system in which the system is specifically configured for users having no computer or printer training.

SUMMARY OF THE INVENTION

These needs are met by a printing system for printing documents and forms, as needed, in response to user-entered commands, constructed according to the present invention. The printing system includes a touch screen monitor for displaying information regarding the-documents and forms, and user options, and for entry of commands by the user, and a memory for storing a plurality of documents and forms. The documents and forms are organized into a plurality of libraries. The memory stores software to control the display of options on the monitor and the interpretation and implementation of commands entered on the monitor. The printing system further includes a printer for printing documents and forms, and a processor, responsive to the monitor and the memory and communicating therewith. The processor is connected to the printer to control printing of a document or form by the printer upon selection thereof by a user and entry of commands via the touch screen monitor.

The software causes the monitor initially to display a listing of libraries and, upon user selection of a library, then causes the monitor to display a listing of the documents and forms included in the selected library. The software may cause a document or form to be printed by the printer upon user selection of the document or form from the listing of documents and forms displayed on the monitor. The software may also cause the monitor to display a listing of one or more kits of documents and forms that are included in the selected library, as well. A kit is a collection of documents and forms that are typically used together. By including documents and forms together in this fashion and permitting the kit of documents to be printed at the same time, the document selection process is simplified and needed documents are not inadvertently omitted.

The software may cause a listing of the individual documents and forms making up a kit to be displayed on the monitor upon user selection of the kit of documents and forms. The software may then cause the documents and forms making up the kit to be printed by the printer upon user confirmation.

The software may cause a document or form to be displayed on the monitor upon user selection of the document or form from the listing of documents and forms displayed on the monitor. The software may cause the document displayed on the monitor to be enlarged or cause the portion of the document displayed to be changed upon entry of a user-entered command.

The printing system may further comprise a communication link connected to the processor. The communication link permits information regarding printing activity to be transmitted to a remote location and, additionally, permits data defining the images of documents and forms to be transmitted from a remote location to the printing system for storage in the memory. The memory may include a disk drive to permit data defining the images of documents and forms to be supplied to the memory by means of a disk inserted in the disk drive.

The printing system for printing documents and forms, as needed, in response to user-entered commands, includes software in which a screen is caused to be displayed on the monitor for selection of the number of copies of a document or form to be printed after user selection of the document or form from the listing of documents and forms displayed on the monitor. The software counts the number of documents and forms printed by said printer, and limits printing to a predetermined number of documents and forms until authorized to print additional documents and forms.

In a printing system including a touch screen monitor, a processor, a memory, and a printer, the method of printing documents and forms, comprising the steps of: displaying on the monitor a listing of a plurality of libraries of documents and forms stored in the memory and available for printing, sensing user selection of one of the libraries, displaying on the monitor a listing of documents and forms in the selected library, sensing user selection of one of the documents and forms in the selected library, and printing the selected document or form on the printer. The step of displaying on the monitor a listing of documents and forms may include the step of displaying on the monitor a listing of documents and forms and one or more kits of documents and forms, as well.

The method of printing documents and forms further includes the steps of sensing user selection of one of the kits, and printing the selected kit on the printer. The step of printing the selected document or form on the printer includes the steps of: displaying on the monitor a listing of options in response to sensing user selection of one of the documents and forms in the selected library, the options including viewing the selected document or form, and printing the selected document or form. The selection of one of the options by the user is then sensed, and the option selected by the user is then performed. The step of performing the option selected by the user may include the steps of: displaying on the monitor the number of copies to be printed in response to the selection by the user of the option of printing the selected document or form, sensing user selection of the number of copies to be printed, and printing the selected number of copies of the selected document or form.

A printing system for printing documents and forms, as needed, in response to user-entered commands, comprises a user interface for entry of commands by a user, a monitor for displaying information regarding the documents and forms, and user options, and a memory for storing a plurality of documents and forms in various computer formats. The documents and forms are created in a plurality of native applications. The memory further stores software to control the display of options on the monitor and the interpretation and implementation of commands entered on the interface, and software to control the display and printing of the documents and forms without the native applications in which the documents and forms were created. The system further includes a printer for printing documents and forms, and a processor, responsive to the interface, and the memory and communicating therewith. The processor is connected to the printer to control printing of a document or form by the printer upon selection thereof by a user and entry of commands via the interface. The processor is connected to the monitor to control display of a document or form by the monitor upon selection thereof by a user and entry of commands via the interface.

The software performs the following functions:
a). causes the monitor initially to display a listing of libraries and, upon user selection of a library, then causes the monitor to display a listing of the documents and forms included in the selected library.
b). causes the monitor initially to display a listing of libraries and, upon user selection of a library, then causes the monitor to display a listing of the documents and forms included in the selected library and of one or more kits of documents and forms included in the selected library.
c). causes a listing of the documents and forms making up a kit to be displayed on the monitor upon user selection of the kit of documents and forms.
d). causes the documents and forms making up a kit to be printed by the printer upon user selection of the kit of documents and forms from the listing displayed on the monitor.
e). causes a document or form to be printed by the printer upon user selection of the document or form from the listing of documents and forms displayed on the monitor.
f). causes a screen to be displayed on the monitor for selection of the number of copies of a document or form to be printed upon user selection of the document or form from the listing of documents and forms displayed on the monitor.
g). causes a document or form to be displayed on the monitor upon user selection of the document or form from the listing of documents and forms displayed on the monitor.
h). causes the document displayed on the monitor to be enlarged or causes the portion of the document displayed to be changed upon entry of a user-entered command.
i). counts the number of documents and forms printed by the printer, limiting printing to a predetermined number of documents and forms until authorized to print additional documents and forms.

The system further comprises a communication link connected to the processor to permit information regarding printing activity to be transmitted to a remote location, and a communication link connected to the processor to permit documents and forms to be transmitted from a remote location to the printing system for storage in the memory.

The memory includes a disk drive to permit documents and forms to be supplied to the memory on a disk inserted in the disk drive.

The monitor for displaying information regarding the documents and forms, and user options, comprises a touch screen monitor. The user interface for entry of commands by a user comprises one or more screens displayed on the monitor.

Accordingly, it is an object of the present invention to provide a printing system for printing documents and forms upon entry of user commands; to provide such a printing system in which the user interface is simplified; and to provide such a printing system in which changing the design of documents and forms is facilitated. Other objects and advantages of the invention will be apparent from the following detailed description, the accompanying drawings, and the appended claims.

BRIEF DESCRIPTION IF THE DRAWINGS

FIG. 2 is a view showing the screen of the touch screen monitor displaying a listing of libraries;

FIG. 3 is a view showing the screen of the touch screen monitor displaying listings of documents and forms in a selected library, such as EMPLOYEE INSURANCE;

FIG. 5A is a view showing the touch screen monitor displaying a print screen; and FIG. 5B is a view showing the touch screen monitor displaying an alternative print screen.

DETAILED DESCRIPTION OF THE PREFERRED EMBODIMENT

Figure 1:
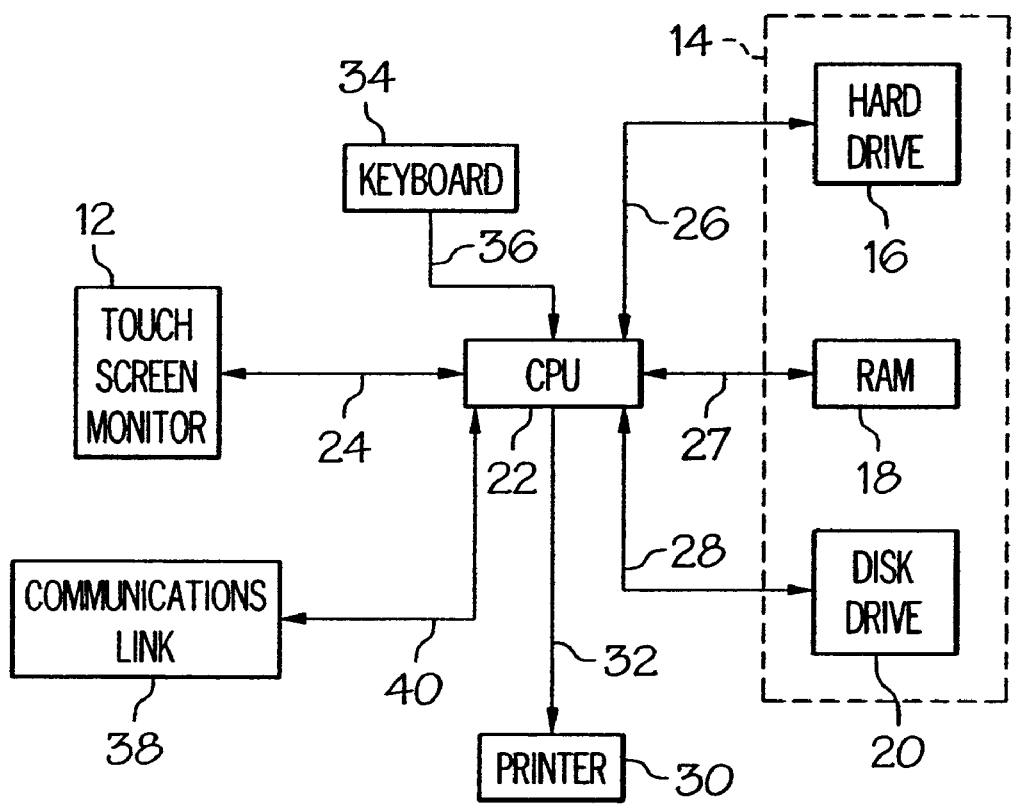
FIG. 1 is a schematic diagram depicting a printing system for printing documents and forms, as needed, in response to user-entered commands, according to the present invention.

Reference is now made to FIG. 1 of the drawings which depicts diagrammatically, in block diagram form, the document and form printing system of the present invention for printing such documents and forms, as they may be needed. By making possible the expedited printing of forms and documents through a simple, easy-to-use interface, the present invention insures that copies of documents and forms can be distributed whenever needed, even during periods of unexpectedly high demand. Further, the present invention eliminates the need to inventory documents and forms, thereby eliminating the waste that results from updating the design of a form while a significant number of forms of the old design remain in inventory.

The printing system includes a touch screen monitor 12 for displaying information regarding the documents and forms, and user options, and for entry of commands by the user. The monitor preferably will comprise an Elo Touch Systems touch screen monitor, with a mouse replacement driver. As is known, a touch screen monitor senses the position on the monitor screen that is touched by a user. A list of options or commands may be displayed to the user, and the selection made simply by having the user touch the screen at the desired option or command.

The printing system further includes a memory 14 for storing files of data defining the images of a plurality of documents and forms. The documents and forms are organized into a plurality of libraries, as discussed more fully below. The memory 14 includes a hard drive 16, a random access memory (RAM) 18, and a removable disk drive 20. Typically, files with data defining document images and the software for controlling operation of the printing system are stored on hard drive 16. Hard drive 16 preferably has a capacity of at least 500 MB. The memory 14 further includes RAM 18, preferably having a capacity of at least 8 MB.

It is further preferable that memory 14 includes a floppy disk drive 20. Disk drive 20 is one means of updating files of data. Disk drive 20 permits the image data for documents and forms that are outdated to be replaced with image data for the redesigned documents and forms. The updated image data is supplied to memory 14 on a disk inserted in disk drive 20, with the data subsequently being read into hard drive 16.

The memory 14 further stores software to control the operation of the printing system including the display of options on said monitor 12 and the interpretation and implementation of commands entered on monitor 12. The software is stored on hard drive 16 for control of the operation of processor 22. Processor 22 is responsive to the monitor 12 and the memory 14 and communicates with monitor 12 and memory 14 over lines 24, and 26, 27, and 28, respectively. The processor is preferably an IBM compatible PC 486DX2-66 with Windows 3.1 or higher and a local bus Windows video accelerator with 2 MB of RAM.

The processor 22 is connected to printer 30 via line 32 to control printing of a document or form by the printer 30 upon selection thereof by a user and entry of commands by the user via the touch screen monitor 12. The printer is preferably a high speed, high resolution (600 D.P.I. or greater) laser printer, such as for example a Lexmark 4039 printer, a Hewlett-Packard HP-4M+ printer, or a Hewlett-Packard HP-SI printer. It will be appreciated, however, that any of a number of printers may be incorporated into the printing system, depending on the printing speed and resolution.

The printing system may also include a keyboard 34 connected to processor 22 via line 36, and a communications link 38 connected to processor 22 via line 40. The keyboard 34, which may include a mouse, as well, and which may provide an alternative way for a user of the printing system to input user commands, may be omitted if desired. As an alternative, a conventional monitor may be used in place of touch screen monitor 12, with the keyboard 34 providing the only way for a user of the printing system to input user commands. It is seen, therefore, that a user interface for entry of commands by a user may consist of either the monitor 12, the keyboard 34, or the combination of the monitor 12 and the keyboard 34.

The communications link 38 preferably comprises a modem for linking the processor 22 to a host computer or other communications system via telephone lines. The communication link 38 may transmit information regarding printing activity or other operations of the printing system to a remote location. Further, the communication link 38 may be used to receive data defining documents and forms from a remote location for storage in the memory 14, and to diagnose and correct system problems.

In operation, the software in memory 14 may cause the monitor 12 initially to display a listing of libraries, as shown in FIG. 2. The illustrated library listing is the sort that might typically be found in a printing system located in a hospital. Upon selection of one of the libraries by the user manually touching the screen of the monitor 12 at the selected library listing, the monitor 12 highlights the selection and displays a listing of the documents and forms included in the selected library on the right half of the monitor screen, as shown in FIG. 3. Other menu systems could be used, but this system is preferred because of clarity and simplicity. The documents and forms listed in FIG. 3 are the type that might be presented in response to selection of the "EMPLOYEE INSURANCE" library. Note that the documents include individual descriptions for MEDICAL INSURANCE PLAN, DENTAL INSURANCE PLAN, and EYE-GLASSES INSURANCE PLAN. In the illustrated example, upon user selection of the EMPLOYEE INSURANCE library, the software also causes the monitor to display in the listing the kits that are included in the selected library. It will be noted that the INSURANCE PLAN DESCRIPTION KIT of documents and forms is included in the library, as well. The INSURANCE PLAN DESCRIPTION KIT includes all three of the medical, dental, and eyeglasses insurance descriptions. Selection of this kit preferably causes a listing of the three documents making up the kit to be displayed on the monitor. This permits the user to verify that the selected kit includes the needed documents.

Figure 4:
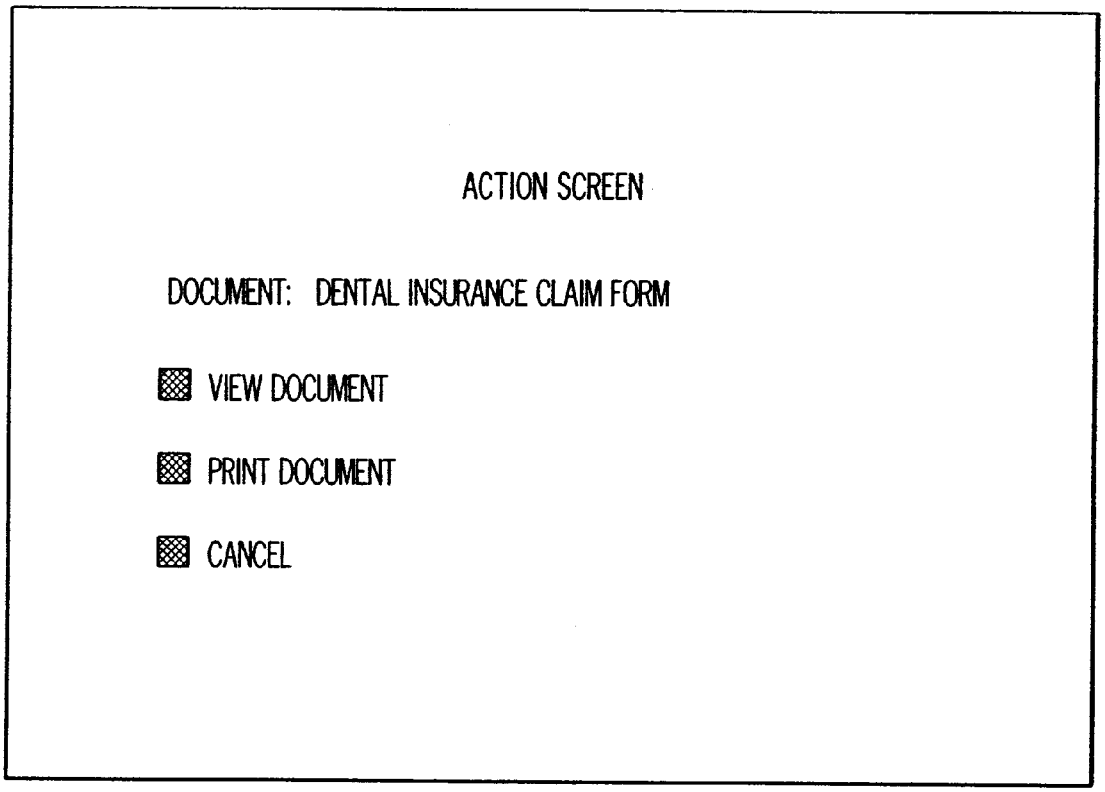
FIG. 4 is a view showing the touch screen monitor displaying an action screen.

Assuming that one of the documents or forms on the screen of FIG. 3 is selected, with the selection being indicated by the user touching the listing of the document or form on the screen of the monitor 12, the software causes the selected document or form to be printed by the printer 30. Toward this end, selection of a document or form results in the display of an "ACTION SCREEN," as shown in FIG. 4, on the monitor 12. This screen gives the user the option of either viewing the document by touching "VIEW DOCUMENT" to be certain that the correct document has been selected, printing the document by touching "PRINT DOCUMENT," or canceling the operation by touching "CANCEL."

Figure 5B:
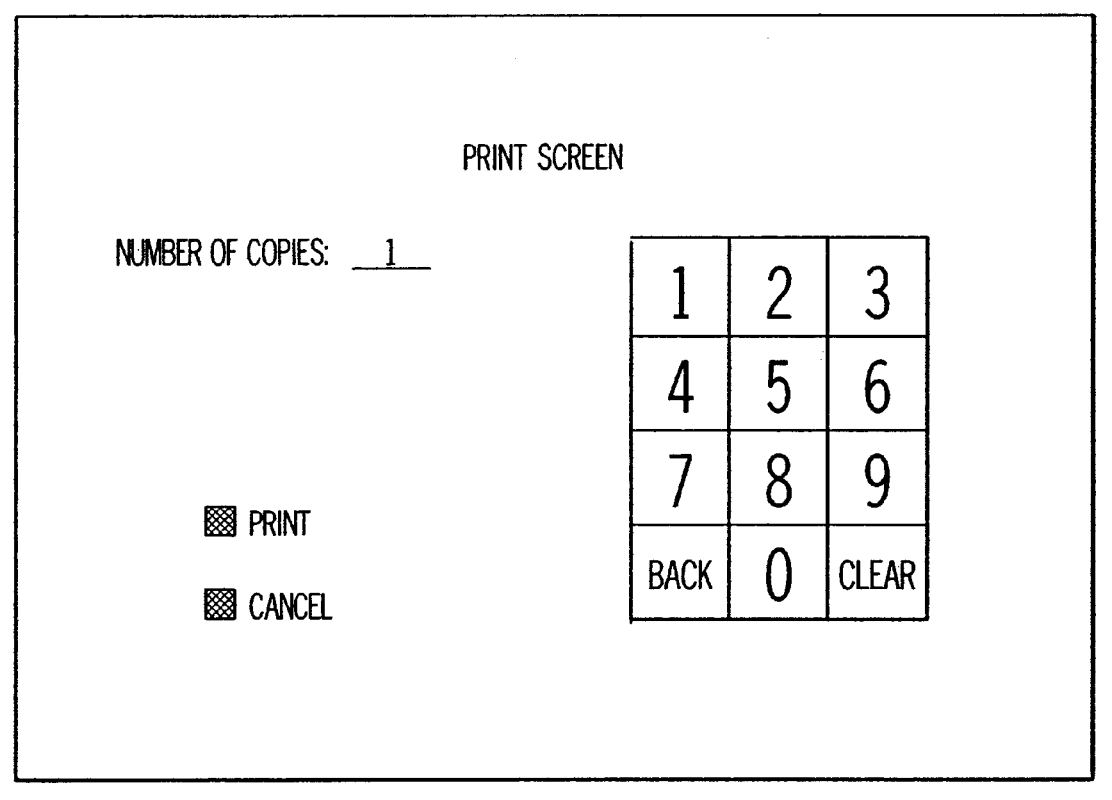

If the "PRINT DOCUMENT" option is selected, the system displays the "PRINT SCREEN" shown in FIG. 5A. On this screen, the monitor 12 displays the number of copies of the document or form selected to be printed. This number may be slewed up or down by repeated actuation of the "UP" or "DOWN" listings. Once the appropriate number of documents for printing is displayed, selection of the "PRINT" listing results in printing of the desired number of copies of the documents or forms by the printer 30 without further instruction. It will be appreciated that, as an alternative to the slewing arrangement illustrated in FIG. 5A, a full numeric touch pad may be displayed to permit direct entry of the desired number of documents or forms to be printed, as illustrated in FIG. 5B.

In the event that the "VIEW DOCUMENT" listing of the ACTION SCREEN of FIG. 4 is selected, the software causes the image of the selected document or form to be displayed on the monitor 12. If desired, the software may cause the document image displayed on the monitor to be enlarged or may cause the portion of the document displayed to be changed upon entry of a user-entered command. Preferably, these commands are entered through the monitor 12 or through a mouse (not shown) associated with keyboard 34.

If desired, the software may count the number of copies of documents and forms printed by the printer 30, limiting printing to a predetermined total number of copies of documents and forms. The system will become inoperative to print additional documents and forms until it is reset over communications link 38 or through appropriate instructions entered on keyboard 34 or monitor 12. By this arrangement, it is possible for the printing system to be rented to a user, with the user paying in advance for a specified predetermined number of forms. Other limits may be placed on the operation of the printer system of the present invention, as well. For example, the system may limit the number of copies of a selected document or form that may be printed at any time, or that may be authorized for printing in a single command entry. These limits may be applied to all documents and all libraries or only to selected documents and selected libraries.

The operation of the printing system of FIG. 1 will now be discussed in greater detail. As will be appreciated from the foregoing, the printing system of the present invention, including a touch screen monitor 12, a processor 22, a memory 14, and a printer 30, operates according to the following steps: a) displaying on the monitor 12 a listing of a plurality of libraries of documents and forms stored in the memory 14 and available for printing, b) sensing user selection of one of the libraries, c) displaying on the monitor 12 a listing of documents and forms in the selected library, d) sensing user selection of one of the documents and forms in the selected library, and e) printing the selected document or form on the printer 30. The listing of documents and forms may also include one or more kits of documents. Selection of the kit of documents may further result in the display of a screen having a listing of documents and forms that make up the kit. If a kit is selected, this is sensed by a user and the selected kit is printed on the printer after verification of the documents and forms that make up the kit.

The step of printing the selected document or form on the printer 30 includes the steps of displaying on the monitor 12 a listing of options in response to sensing user selection of one of the documents and forms in the selected library, the options including viewing the selected document or form, and printing the selected document or form. When user selection of one of the options is sensed, that option is performed. The step of performing the option selected by the user includes the steps of displaying on the monitor 12 the number of copies to be printed in response to the selection by the user of the option of printing the selected document or form, sensing user selection of the number of copies to be printed, and printing the selected number of copies of the selected document or form.

The present invention has the ability to store, manage, view and print documents and forms that-have been composed and are stored in a wide variety of computer formats without the need to have the native application software present on the system. For example, a document that has been created in a particular word processing format, such as WordPerfect®, Microsoft Word®, etc., may be stored on the system in memory 14 on hard drive 16. The document may be displayed on monitor 12, and printed on printer 30 without the need to have the word processing software loaded on the system. This is accomplished by viewing and printing conversion software stored in memory 14. Preferably the viewing and printing conversion software is VCET API—Viewing & Conversion Enabling Technology Application Programming Interface, available from Cimmetry Systems Inc., 1430 Mass Ave., Suite 306, Cambridge, Mass. 02138-3810. Other viewing and printing conversion software is available from Systems Compatibility Group, 401 N. Wabash, Suite 600, Chicago, Ill. 60611.

The following is a listing of the software incorporated in the printing system of the present invention, and cooperating with the viewing and printing conversion software described above.

Having described the present invention in detail and by reference to various embodiments thereof, it will be apparent that certain modifications and variations are possible without departing from the scope of the invention defined in the appended claims.

What is claimed is:

1. A printing system for printing documents and forms, as needed, in response to user-entered commands, comprising:
   a touch screen monitor for displaying information regarding the documents and forms, and user options, and for entry of commands by the user,
   a memory for storing a plurality of documents and forms, said documents and forms being organized into a plurality of libraries, and for storing software to control the display of options on said monitor and the interpretation and implementation of commands entered on said monitor,
   a printer for printing documents and forms, and
   a processor, responsive to said monitor and said memory and communicating therewith, said processor being connected to said printer to control printing of a document or form by said printer upon selection thereof by a user and entry of commands via said touch screen monitor, wherein said software causes said monitor initially to display a listing of libraries and, upon user selection of a library, then causes said monitor to display a listing of the documents and forms included in the selected library and of one or more kits of documents and forms included in the selected library.

2. The printing system for printing documents and forms, as needed, in response to user-entered commands, according to claim 1, in which the software causes a listing of the documents and forms making up a kit to be displayed on the monitor upon user selection of the kit of documents and forms.

3. The printing system for printing documents and forms, as needed, in response to user-entered commands, according to claim 1, in which the software causes the documents and forms making up a kit to be printed by the printer upon user selection of the kit of documents and forms from the listing displayed on the monitor.

4. The printing system for printing documents and forms, as needed, in response to user-entered commands, according to claim 1, in which the software causes a document or form to be printed by the printer upon user selection of the document or form from the listing of documents and forms displayed on the monitor.

5. The printing system for printing documents and forms, as needed, in response to user-entered commands, according to claim 4, in which the software causes a screen to be displayed on the monitor for selection of the number of copies of a document or form to be printed upon user selection of the document or form from the listing of documents and forms displayed on the monitor.

6. The printing system for printing documents and forms, as needed, in response to user-entered commands, according to claim 1, in which the software causes a document or form to be displayed on the monitor upon user selection of the document or form from the listing of documents and forms displayed on the monitor.

7. The printing system for printing documents and forms, as needed, in response to user-entered commands, according to claim 6, in which the software causes the document displayed on the monitor to be enlarged or causes the portion of the document displayed to be changed upon entry of a user-entered command.

8. The printing system for printing documents and forms, as needed, in response to user-entered commands, according to claim 1, further comprising a communication link connected to said processor to permit information regarding printing activity to be transmitted to a remote location.

9. The printing system for printing documents and forms, as needed, in response to user-entered commands, according to claim 1, further comprising a communication link connected to said processor to permit documents and forms to be transmitted from a remote location to said printing system for storage in said memory.

10. The printing system for printing documents and forms, as needed, in response to user-entered commands, according to claim 1, in which said memory includes a disk drive to permit documents and forms to be supplied to said memory on a disk inserted in said disk drive.

11. The printing system for printing documents and forms, as needed, in response to user-entered commands, according to claim 1, in which the software counts the number of documents and forms printed by said printer, limiting printing to a predetermined number of documents and forms until authorized to print additional documents and forms.

12. In a printing system including a touch screen monitor, a processor, a memory, and a printer, the method of printing documents and forms, comprising the steps of:
    displaying on the monitor a listing of a plurality of libraries of documents and forms and one or more kits of documents and forms stored in the memory in the form of data defining images of said documents and forms available for printing,
    sensing user selection of one of said libraries,
    displaying on the monitor a listing of documents and forms in the selected library,
    sensing user selection of one of said documents and forms in the selected library, and
    printing the selected document or form on the printer.

13. The method of printing documents and forms according to claim 12, further including the steps of:
    sensing user selection of one of said kits, and
    printing the selected kit on the printer.

14. The method of printing documents and forms according to claim 12, in which the step of printing the selected document or form on the printer includes the steps of:
    displaying on the monitor a listing of options in response to sensing user selection of one of said documents and forms in the selected library, said options including viewing the selected document or form, and printing the selected document or form,
    sensing user selection of one of the options, and
    performing the option selected by the user.

15. The method of printing documents and forms according to claim 14, in which the step of performing the option selected by the user includes the steps of:
    displaying on the monitor the number of copies to be printed in response to the selection by the user of the option of printing the selected document or form,
    sensing user selection of the number of copies to be printed, and
    printing the selected number of copies of the selected document or form.

16. A printing system for printing documents and forms, as needed, in response to user-entered commands, comprising:
    a user interface for entry of commands by a user,
    a monitor for displaying information regarding the documents and forms, and user options,
    a memory for storing a plurality of documents and forms in various computer formats, said documents and forms being created in a plurality of native applications, for storing software to control the display of options on said monitor and the interpretation and implementation of commands entered on said interface, and for storing software to control the display and printing of the documents and forms without the native applications in which the documents and forms were created,
    a printer for printing documents and forms, and
    a processor, responsive to said interface, and said memory and communicating therewith, said processor being connected to said printer to control printing of a document or form by said printer upon selection thereof by a user and entry of commands via said interface, and said processor being connected to said monitor to control display of a document or form by said monitor upon selection thereof by a user and entry of commands via said interface.

17. The printing system for printing documents and forms, as needed, in response to user-entered commands, according to claim 16, in which said software causes said monitor initially to display a listing of libraries and, upon user selection of a library, then causes said monitor to display a listing of the documents and forms included in the selected library.

18. The printing system for printing documents and forms, as needed, in response to user-entered commands, according to claim 17, in which said software causes said monitor initially to display a listing of libraries and, upon user selection of a library, then causes said monitor to display a listing of the documents and forms included in the selected library and of one or more kits of documents and forms included in the selected library.

19. The printing system for printing documents and forms, as needed, in response to user-entered commands, according to claim 18, in which the software causes a listing of the documents and forms making up a kit to be displayed on the monitor upon user selection of the kit of documents and forms.

20. The printing system for printing documents and forms, as needed, in response to user-entered commands, according to claim 18, in which the software causes the documents and forms making up a kit to be printed by the printer upon user selection of the kit of documents and forms from the listing displayed on the monitor.

21. The printing system for printing documents and forms, as needed, in response to user-entered commands, according to claim 17, in which the software causes a document or form to be printed by the printer upon user selection of the document or form from the listing of documents and forms displayed on the monitor.

22. The printing system for printing documents and forms, as needed, in response to user-entered commands, according to claim 21, in which the software causes a screen to be displayed on the monitor for selection of the number of copies of a document or form to be printed upon user selection of the document or form from the listing of documents and forms displayed on the monitor.

23. The printing system for printing documents and forms, as needed, in response to user-entered commands, according to claim 21, in which the software causes a document or form to be displayed on the monitor upon user selection of the document or form from the listing of documents and forms displayed on the monitor.

24. The printing system for printing documents and forms, as needed, in response to user-entered commands, according to claim 23, in which the software causes the document displayed on the monitor to be enlarged or causes the portion of the document displayed to be changed upon entry of a user-entered command.

25. The printing system for printing documents and forms, as needed, in response to user-entered commands, according to claim 16, further comprising a communication link connected to said processor to permit information regarding printing activity to be transmitted to a remote location.

26. The printing system for printing documents and forms, as needed, in response to user-entered commands, according to claim 16, further comprising a communication link connected to said processor to permit documents and forms to be transmitted from a remote location to said printing system for storage in said memory.

27. The printing system for printing documents and forms, as needed, in response to user-entered commands, according to claim 16, in which said memory includes a disk drive to permit documents and forms to be supplied to said memory on a disk inserted in said disk drive.

28. The printing system for printing documents and forms, as needed, in response to user-entered commands, according to claim 16, in which the software counts the number of documents and forms printed by said printer, limiting printing to a predetermined number of documents and forms until authorized to print additional documents and forms.

29. The printing system for printing documents and forms, as needed, in response to user-entered commands, according to claim 16, in which said monitor for displaying information regarding the documents and forms, and user options, comprises a touch screen monitor, and in which said user interface for entry of commands by a user comprises one or more screens displayed on said monitor.

30. A printing system for printing documents and forms, as needed, in response to user-entered commands, comprising:

a touch screen monitor for displaying information regarding the documents and forms, and user options, and for entry of commands by the user, a memory for storing a plurality of documents and forms, said documents and forms being organized into a plurality of libraries, and for storing software to control the display of options on said monitor and the interpretation and implementation of commands entered on said monitor, a printer for printing documents and forms, and a processor, responsive to said monitor and said memory and communicating therewith, said processor being connected to said printer to control printing of a document or form by said printer upon selection thereof by a user and entry of commands via said touch screen monitor, wherein said software counts the number of document and forms printed by said printer, limiting printing to a predetermined number of documents and forms until authorized to print additional documents and forms.

* * * * *

UNITED STATES PATENT AND TRADEMARK OFFICE
CERTIFICATE OF CORRECTION

PATENT NO. : 6,362,897 B1
DATED : March 26, 2002
INVENTOR(S) : Berg et al.

It is certified that error appears in the above-identified patent and that said Letters Patent is hereby corrected as shown below:

Column 1,
Line 62, reads as "the-document", should read -- the document --.

Column 7,
Line 56, reads as "forms that-have been", should read -- forms that have been --.

Column 8,
Line 6, reads as "Chicago, Ill.", should read -- Chicago, IL --.
After line 10, the attached software listing should be inserted.

Signed and Sealed this

First Day of October, 2002

Attest:

JAMES E. ROGAN
Attesting Officer    Director of the United States Patent and Trademark Office

```cpp
// actiondl.h : header file
//

/////////////////////////////////////////////////////////////////////////////
// ActionDlg dialog class ActionDlg : public CDialog
{
        //char *File;
        long FileId;
//ini    char *Group,*FileName;
// Construction
public:
//ini    ActionDlg(char *aGroup, char *aFile, CWnd* pParent = NULL);   // standard constructor
//       ActionDlg(char *aFile, CWnd* pParent = NULL);   // standard constructor
        ActionDlg(long aFileId, CWnd* pParent = NULL); // standard constructor // Dialog Data
        //{{AFX_DATA(ActionDlg)
        enum { IDD = IDD_DIALOG2 };
        CStatic m_Title;
        CStatic m_Description;
        //}}AFX_DATA // Implementation
protected:
        virtual void DoDataExchange(CDataExchange* pDX);    // DDX/DDV support // Generated message map functions
        //{{AFX_MSG(ActionDlg)
        virtual BOOL OnInitDialog();
        afx_msg void OnClose();
        afx_msg void OnView();
        afx_msg void OnPrint();
        //}}AFX_MSG
        DECLARE_MESSAGE_MAP()
};
```

```
// actiondl.h : header file
//

/////////////////////////////////////////////////////////////////
// ActionDlg dialog class ActionDlg : public CDialog
{
        //char *File;
        long FileId;
//ini    char *Group,*FileName;
// Construction
public:
//ini    ActionDlg(char *aGroup, char *aFile, CWnd* pParent = NULL);   // standard constructor
//       ActionDlg(char *aFile, CWnd* pParent = NULL);  // standard constructor
        ActionDlg(long aFileId, CWnd* pParent = NULL); // standard constructor // Dialog Data
        //{{AFX_DATA(ActionDlg)
        enum { IDD = IDD_DIALOG2 };
        CStatic m_Title;
        CStatic m_Description;
        //}}AFX_DATA // Implementation
protected:
        virtual void DoDataExchange(CDataExchange* pDX);    // DDX/DDV support // Generated message map functions
        //{{AFX_MSG(ActionDlg)
        virtual BOOL OnInitDialog();
        afx_msg void OnClose();
        afx_msg void OnView();
        afx_msg void OnPrint();
        //}}AFX_MSG
        DECLARE_MESSAGE_MAP()
};
```

```cpp
// actiondl.cpp : implementation file
//
include "stdafx.h"

#include <stdlib.h>
include <string.h> include "pod.h"
include "actiondl.h"
#include "pctl.h"
#include "viewdlg.h"
#include "printcon.h"
#include "db-init.h"
#include "kitviewe.h"

#include "db.h"

ifdef _DEBUG
undef THIS_FILE
static char BASED_CODE THIS_FILE[] = __FILE__;
endif /////////////////////////////////////////////////////////////////////////////
// ActionDlg dialog
/*ini
ActionDlg::ActionDlg(char *aGroup, char *aFile, CWnd* pParent)
        : CDialog(ActionDlg::IDD, pParent)
{
        Group = (char *)malloc(strlen(aGroup)+2);
        strcpy(Group,aGroup);
*/
/*ActionDlg::ActionDlg(char *aFile, CWnd* pParent)
        : CDialog(ActionDlg::IDD, pParent)
*/
ActionDlg::ActionDlg(long aFileId, CWnd* pParent /*=NULL*/)
        : CDialog(ActionDlg::IDD, pParent)
{
        /*
        File = (char *)malloc(strlen(aFile)+2);
        strcpy(File,aFile);
        */
        FileId = aFileId;
        //{{AFX_DATA_INIT(ActionDlg)
                // NOTE: the ClassWizard will add member initialization here
        //}}AFX_DATA_INIT
} void ActionDlg::DoDataExchange(CDataExchange* pDX)
{
        CDialog::DoDataExchange(pDX);
        //{{AFX_DATA_MAP(ActionDlg)
        DDX_Control(pDX, IDC_STATIC_TITLE, m_Title);
        DDX_Control(pDX, IDC_STATIC_DESCRIPTION, m_Description);
```

```
        //}}AFX_DATA_MAP
}

BEGIN_MESSAGE_MAP(ActionDlg, CDialog)
        //{{AFX_MSG_MAP(ActionDlg)
        ON_WM_CLOSE()
        ON_BN_CLICKED(IDVIEW, OnView)
        ON_BN_CLICKED(IDPRINT, OnPrint)
        //}}AFX_MSG_MAP
END_MESSAGE_MAP()

/////////////////////////////////////////////////////////////////////////////
// ActionDlg message handlers BOOL ActionDlg::OnInitDialog()
{
        char buf[1024];
//ini    char *s;
        CDialog::OnInitDialog();

// TODO: Add extra initialization here
        DataBase DbDocument(DocumentName);
        //if (DbDocument.Select("File",File))
        if (DbDocument.Select("Id",FileId))
                return TRUE;
        m_Title.SetWindowText(DbDocument.Get("Name",buf));
        m_Description.SetWindowText(DbDocument.Get("Desc",buf));
        /*ini
        m_Title.SetWindowText(File);
        GetPrivateProfileString(Group,File,"No description available.",buf,1024,"pod.ini");
        s = strchr(buf,'|');
        *s++ = '\0';
        FileName = (char *)malloc(strlen(buf)+2);
        strcpy(FileName,buf);
        m_Description.SetWindowText(s);
        */ return TRUE;  // return TRUE  unless you set the focus to a control
} void ActionDlg::OnClose()
{
        // TODO: Add your message handler code here and/or call default
//       free(File);
//ini    free(Group);
//ini    free(FileName);

CDialog::OnClose();
} void ActionDlg::OnView()
{
```

```
            // TODO: Add your control notification handler code here
//ini   ViewDlg v(FileName);
        char buf[250];
        // Get the Document Directory.
        GetPrivateProfileString("System Defaults","DocumentDirectory","c:\\",buf,200,"pod.ini");
        if ( *(buf + strlen(buf) - 1) != '\\')
                strcat(buf,"\\");
        // Get the file name.
        DataBase DbDocument(DocumentName);
        if (DbDocument.Select("Id",FileId))
                return;
        if (strcmp(DbDocument.Get("File",buf+strlen(buf)),"*") == 0)
                {
                KitViewerDlg kv(FileId);
                kv.DoModal();
                }
        else
                {
                //strcat(buf,File);
                //MessageBox(buf);
                ViewDlg v(buf);
                v.DoModal();
                }
} void ActionDlg::OnPrint()
{
        // TODO: Add your control notification handler code here
//      PrintControlDlg p(FileName);
        //PrintControlDlg p(File);
        PrintControlDlg p(FileId);
        p.DoModal();
        OnCancel();
}
```

```
DESCRIPTION   'CodeBase 5.1 DLL for Windows'
EXETYPE       WINDOWS
STUB          'WINSTUB.EXE'
CODE          PRELOAD MOVEABLE DISCARDABLE
DATA          PRELOAD FIXED SINGLE
HEAPSIZE      4096

IMPORTS
  C4ATOD         = CB5.1
  C4ATOI         = CB5.2
  C4ATOL         = CB5.3
  C4DESCEND      = CB5.4
  C4DESCEND_DATE = CB5.5
  C4DESCEND_NUM  = CB5.6
  C4DESCEND_STR  = CB5.7
  C4ENCODE       = CB5.8
  CODE4ALLOC     = CB5.9
  D4ALIAS        = CB5.10
  D4ALIAS_SET    = CB5.11
  D4APPEND       = CB5.12
  D4APPEND_BLANK = CB5.13
  D4APPEND_DATA  = CB5.14
  D4APPEND_START = CB5.15
  D4BLANK        = CB5.16
  D4BOF          = CB5.17
  D4BOTTOM       = CB5.18
  D4CHANGED      = CB5.19
  D4CHECK        = CB5.20
  D4CLOSE        = CB5.21
  D4CLOSE_ALL    = CB5.22
  D4CREATE       = CB5.23
  D4DATA         = CB5.24
  D4DELETE       = CB5.25
  D4DELETED      = CB5.26
  D4EOF          = CB5.27
  D4FIELD        = CB5.28
  D4FIELD_INFO   = CB5.29
  D4FIELD_J      = CB5.30
  D4FIELD_NUMBER = CB5.31
  D4FLUSH        = CB5.32
  D4FLUSH_DATA   = CB5.33
  D4FLUSH_FILES  = CB5.34
  D4FREE_BLOCKS  = CB5.35
  D4GO           = CB5.36
  D4GO_DATA      = CB5.37
  D4GO_EOF       = CB5.38
  D4INDEX        = CB5.39
  D4INIT         = CB5.40
  D4INIT_UNDO    = CB5.41
  D4LOCK         = CB5.42
  D4LOCK_ALL     = CB5.43
  D4LOCK_APPEND  = CB5.44
  D4LOCK_FILE    = CB5.45
  D4LOCK_GROUP   = CB5.46
```

```
D4LOCK_INDEX    = CB5.47
D4LOCK_TEST     = CB5.48
D4LOCK_TEST_APPEND = CB5.49
D4LOCK_TEST_FILE  = CB5.50
D4LOCK_TEST_INDEX = CB5.51
D4MEMO_COMPRESS = CB5.52
D4NUM_FIELDS    = CB5.53
D4OPEN          = CB5.54
D4OPT_START     = CB5.55
D4OPT_SUSPEND   = CB5.56
D4OPTIMIZE      = CB5.57
D4OPTIMIZE_WRITE = CB5.58
D4PACK          = CB5.59
D4PACK_DATA     = CB5.60
D4POSITION      = CB5.61
D4POSITION_SET  = CB5.62
D4READ          = CB5.63
D4READ_OLD      = CB5.64
D4RECALL        = CB5.65
D4RECCOUNT      = CB5.66
D4RECNO         = CB5.67
D4RECORD        = CB5.68
D4RECORD_POSITION = CB5.69
D4RECORD_WIDTH  = CB5.70
D4REFRESH       = CB5.71
D4REFRESH_RECORD = CB5.72
D4REINDEX       = CB5.73
D4SEEK          = CB5.74
D4SEEK_DOUBLE   = CB5.75
D4SKIP          = CB5.76
D4TAG           = CB5.77
D4TAG_DEFAULT   = CB5.78
D4TAG_NEXT      = CB5.79
D4TAG_PREV      = CB5.80
D4TAG_SELECT    = CB5.81
D4TAG_SELECTED  = CB5.82
D4TOP           = CB5.83
D4UNLOCK        = CB5.84
D4UNLOCK_FILES  = CB5.85
D4VALIDATE_MEMO_IDS = CB5.86
D4WRITE         = CB5.87
D4WRITE_DATA    = CB5.88
D4WRITE_KEYS    = CB5.89
D4ZAP           = CB5.90
D4ZAP_DATA      = CB5.91
DATE4ASSIGN     = CB5.92
DATE4CDOW       = CB5.93
DATE4CMONTH     = CB5.94
DATE4DAY        = CB5.95
DATE4DOW        = CB5.96
DATE4FORMAT     = CB5.97
DATE4FORMAT_MDX = CB5.98
DATE4INIT       = CB5.99
DATE4LONG       = CB5.100
```

```
DATE4MONTH    = CB5.101
DATE4TIME_NOW = CB5.102
DATE4TODAY    = CB5.103
DATE4YEAR     = CB5.104
E4            = CB5.105
E4CODE        = CB5.106
E4DESCRIBE    = CB5.107
E4EXIT        = CB5.108
E4EXIT_TEST   = CB5.109
E4HOOK        = CB5.110
E4SET         = CB5.111
E4SEVERE      = CB5.112
E4TEXT        = CB5.113
EXPR4CALC_CREATE = CB5.114
EXPR4DOUBLE   = CB5.115
EXPR4FREE     = CB5.116
EXPR4KEY      = CB5.117
EXPR4KEY_LEN  = CB5.118
EXPR4LEN      = CB5.119
EXPR4PARSE    = CB5.120
EXPR4SOURCE   = CB5.121
EXPR4TRUE     = CB5.122
EXPR4TYPE     = CB5.123
EXPR4VARY     = CB5.124
F4ASSIGN      = CB5.125
F4ASSIGN_CHAR = CB5.126
F4ASSIGN_DOUBLE = CB5.127
F4ASSIGN_FIELD  = CB5.128
F4ASSIGN_INT  = CB5.129
F4ASSIGN_LONG = CB5.130
F4ASSIGN_N    = CB5.131
F4ASSIGN_PTR  = CB5.132
F4BLANK       = CB5.133
F4CHAR        = CB5.134
F4DATA        = CB5.135
F4DECIMALS    = CB5.136
F4DOUBLE      = CB5.137
F4INT         = CB5.138
F4LEN         = CB5.139
F4LONG        = CB5.140
F4MEMO_ASSIGN = CB5.150
F4MEMO_ASSIGN_N = CB5.151
F4MEMO_FREE   = CB5.152
F4MEMO_LEN    = CB5.153
F4MEMO_NCPY   = CB5.154
F4MEMO_PTR    = CB5.155
F4MEMO_STR    = CB5.156
F4NAME        = CB5.157
F4NCPY        = CB5.158
F4PTR         = CB5.159
F4STR         = CB5.160
F4TRUE        = CB5.161
F4TYPE        = CB5.162
FILE4CLOSE    = CB5.163
```

```
FILE4CREATE      = CB5.164
FILE4FLUSH       = CB5.165
FILE4LEN         = CB5.166
FILE4LEN_SET     = CB5.167
FILE4LOCK        = CB5.168
FILE4LOCK_HOOK   = CB5.169
FILE4OPEN        = CB5.170
FILE4OPTIMIZE    = CB5.171
FILE4OPTIMIZE_WRITE = CB5.172
FILE4READ        = CB5.173
FILE4READ_ALL    = CB5.174
FILE4READ_ERROR  = CB5.175
FILE4REFRESH     = CB5.176
FILE4REPLACE     = CB5.177
FILE4TEMP        = CB5.178
FILE4UNLOCK      = CB5.179
FILE4WRITE       = CB5.180
FILE4SEQ_READ    = CB5.181
FILE4SEQ_READ_ALL = CB5.182
FILE4SEQ_READ_INIT = CB5.183
FILE4SEQ_WRITE   = CB5.184
FILE4SEQ_WRITE_FLUSH = CB5.185
FILE4SEQ_WRITE_INIT = CB5.186
FILE4SEQ_WRITE_REPEAT = CB5.187
I4CLOSE          = CB5.188
I4CREATE         = CB5.189
I4LOCK           = CB5.190
I4OPEN           = CB5.191
I4REINDEX        = CB5.192
I4TAG            = CB5.193
I4TAG_INFO       = CB5.194
I4UNLOCK         = CB5.195
L4ADD            = CB5.196
L4ADD_AFTER      = CB5.197
L4ADD_BEFORE     = CB5.198
L4FIRST          = CB5.199
L4LAST           = CB5.200
L4NEXT           = CB5.201
L4POP            = CB5.202
L4PREV           = CB5.203
L4REMOVE         = CB5.204
MEM4ALLOC        = CB5.205
MEM4CREATE       = CB5.206
MEM4FREE         = CB5.207
MEM4RELEASE      = CB5.208
MEM4RESET        = CB5.209
RELATE4BOTTOM    = CB5.210
RELATE4CHANGED   = CB5.211
RELATE4CREATE_SLAVE = CB5.212
RELATE4DO        = CB5.213
RELATE4DO_ONE    = CB5.214
RELATE4ERROR_ACTION = CB5.215
RELATE4FREE      = CB5.216
RELATE4INIT      = CB5.217
```

```
RELATE4LOCK      = CB5.218
RELATE4MATCH_LEN = CB5.219
RELATE4NEXT      = CB5.220
RELATE4QUERY_SET = CB5.221
RELATE4SKIP      = CB5.222
RELATE4SKIP_ENABLE = CB5.223
RELATE4SORT_SET  = CB5.224
RELATE4TOP       = CB5.225
RELATE4TYPE      = CB5.226
RELATE4UNLOCK    = CB5.227
SORT4FREE        = CB5.229
SORT4GET         = CB5.230
SORT4GET_INIT    = CB5.231
SORT4INIT        = CB5.232
SORT4PUT         = CB5.233
T4ADD            = CB5.234
T4ADD_CALC       = CB5.235
T4BOTTOM         = CB5.236
T4DOWN           = CB5.237
T4DUMP           = CB5.238
T4EOF            = CB5.239
T4FLUSH          = CB5.240
T4FREE_ALL       = CB5.241
T4GO             = CB5.242
T4KEY            = CB5.243
T4OPEN           = CB5.244
T4POSITION       = CB5.245
T4POSITION_SET   = CB5.246
T4RECNO          = CB5.247
T4REMOVE         = CB5.248
T4REMOVE_CALC    = CB5.249
T4SEEK           = CB5.250
T4SKIP           = CB5.251
T4TOP            = CB5.252
T4UP             = CB5.253
T4UP_TO_ROOT     = CB5.254
U4ALLOC          = CB5.255
U4ALLOC_AGAIN    = CB5.256
U4ALLOC_ER       = CB5.257
U4ALLOC_FREE     = CB5.258
U4FREE           = CB5.259
U4NAME_CHAR      = CB5.260
U4NAME_EXT       = CB5.261
U4NAME_PIECE     = CB5.262
U4NCPY           = CB5.263
U4YYMMDD         = CB5.264
EXPR4CALC_LOOKUP = CB5.265
C4TRIM_N         = CB5.266
EXPR4FUNCTIONS   = CB5.267
C4DTOA45         = CB5.268
EXPR4CALC_DELETE = CB5.269
E4LOOKUP         = CB5.270
C4UPPER          = CB5.271
EXPR4CALC_NAME_CHANGE = CB5.272
```

```
EXPR4CALC_MODIFY   = CB5.273
RELATE4FREE_RELATE = CB5.274
EXPR4CALC_MASSAGE  = CB5.275
D4UPDATE_HEADER    = CB5.276
U4SWITCH           = CB5.277
DATE4FORMAT_MDX2   = CB5.278
EXPR4DOUBLE2       = CB5.279
D4POSITION2        = CB5.280
F4DOUBLE2          = CB5.281
T4POSITION2        = CB5.282
F4MEMO_SET_LEN     = CB5.283
C4LTOA45           = CB5.284
I4ADD_TAG          = CB5.285
EXPR4CALC_RESET    = CB5.286
T4IS_DESCENDING    = CB5.287
I4IS_PRODUCTION    = CB5.288
T4UNIQUE           = CB5.289
D4SEEK_N           = CB5.290
C4DLL_INST         = CB5.291
C4ATOD2            = CB5.292
F4MEMO_CHECK       = CB5.293
D4UNLOCK_APPEND    = CB5.294
D4UNLOCK_DATA      = CB5.295
D4UNLOCK_FILE      = CB5.296
D4UNLOCK_RECORDS   = CB5.297
C4LOWER            = CB5.298
I4CHECK            = CB5.299
U4REMOVE           = CB5.300

AREA4CREATE             = CB5.301
AREA4FREE               = CB5.302
AREA4NUMOBJECTS         = CB5.303
AREA4OBJFIRST           = CB5.304
AREA4OBJLAST            = CB5.305
AREA4OBJNEXT            = CB5.306
AREA4OBJPREV            = CB5.307
AREA4PAGEBREAK          = CB5.308
GROUP4CREATE            = CB5.309
GROUP4FOOTERFIRST       = CB5.310
GROUP4FOOTERNEXT        = CB5.311
GROUP4FOOTERPREV        = CB5.312
GROUP4FREE              = CB5.313
GROUP4HEADERFIRST       = CB5.314
GROUP4HEADERNEXT        = CB5.315
GROUP4HEADERPREV        = CB5.316
GROUP4NUMFOOTERS        = CB5.317
GROUP4NUMHEADERS        = CB5.318
GROUP4REPEATHEADER      = CB5.319
GROUP4RESETEXPRSET      = CB5.320
GROUP4RESETPAGE         = CB5.321
GROUP4RESETPAGENUM      = CB5.322
GROUP4SWAPFOOTER        = CB5.323
GROUP4SWAPHEADER        = CB5.324
OBJ4BITMAPSTATICCREATE  = CB5.325
```

```
OBJ4BITMAPSTATICFREE   = CB5.326
OBJ4BITMAPFILECREATE   = CB5.327
OBJ4BITMAPFILEFREE     = CB5.328
OBJ4BITMAPFIELDCREATE  = CB5.329
OBJ4BITMAPFIELDFREE    = CB5.330
OBJ4BRACKETS           = CB5.331
OBJ4CALCCREATE         = CB5.332
OBJ4CALCFREE           = CB5.333
OBJ4DATEFORMAT         = CB5.334
OBJ4DECIMALS           = CB5.335
OBJ4DELETE             = CB5.336
OBJ4DISPLAYONCE        = CB5.337
OBJ4DISPLAYZERO        = CB5.338
OBJ4EXPRCREATE         = CB5.339
OBJ4EXPRFREE           = CB5.340
OBJ4FIELDCREATE        = CB5.341
OBJ4FIELDFREE          = CB5.342
OBJ4FRAMECORNERS       = CB5.343
OBJ4FRAMECREATE        = CB5.344
OBJ4FRAMEFILL          = CB5.345
OBJ4FRAMEFREE          = CB5.346
OBJ4JUSTIFY            = CB5.347
OBJ4LEADINGZERO        = CB5.348
OBJ4LINECREATE         = CB5.349
OBJ4LINEFREE           = CB5.350
OBJ4LINEWIDTH          = CB5.351
OBJ4LOOKAHEAD          = CB5.352
OBJ4NUMERICTYPE        = CB5.353
OBJ4STYLE              = CB5.354
OBJ4TEXTCREATE         = CB5.355
OBJ4TEXTFREE           = CB5.356
OBJ4TOTALCREATE        = CB5.357
OBJ4TOTALFREE          = CB5.358
RELATE4RETRIEVE        = CB5.359
RELATE4SAVE            = CB5.360
REPORT4CAPTION         = CB5.361
REPORT4CURRENCY        = CB5.362
REPORT4DATEFORMAT      = CB5.363
REPORT4DECIMAL         = CB5.364
REPORT4DO              = CB5.365
REPORT4FREE            = CB5.366
REPORT4GENERATEPAGE    = CB5.367
REPORT4GROUPFIRST      = CB5.368
REPORT4GROUPLAST       = CB5.369
REPORT4GROUPLOOKUP     = CB5.370
REPORT4GROUPNEXT       = CB5.371
REPORT4GROUPPREV       = CB5.372
REPORT4GROUPHARDRESETS = CB5.373
REPORT4INIT            = CB5.374
REPORT4MARGINS         = CB5.375
REPORT4NUMGROUPS       = CB5.376
REPORT4NUMSTYLES       = CB5.377
REPORT4OUTPUT          = CB5.378
REPORT4PAGEFREE        = CB5.379
```

```
REPORT4PAGEHEADERFOOTER = CB5.380
REPORT4PAGEINIT         = CB5.381
REPORT4PAGEMARGINSGET   = CB5.382
REPORT4PAGEOBJFIRST     = CB5.383
REPORT4PAGEOBJNEXT      = CB5.384
REPORT4PAGESIZE         = CB5.385
REPORT4PAGESIZEGET      = CB5.386
REPORT4PARENT           = CB5.387
REPORT4PRINTERSELECT    = CB5.388
REPORT4PRINTERDC        = CB5.389
REPORT4QUERYSET         = CB5.390
REPORT4RETRIEVE         = CB5.391
REPORT4SAVE             = CB5.392
REPORT4SEPARATOR        = CB5.393
REPORT4SORTSET          = CB5.394
REPORT4STYLEFIRST       = CB5.395
REPORT4STYLELAST        = CB5.396
REPORT4STYLENEXT        = CB5.397
REPORT4STYLESELECT      = CB5.398
REPORT4STYLESELECTED    = CB5.399
REPORT4STYLESHEETLOAD   = CB5.400
REPORT4STYLESHEETSAVE   = CB5.401
REPORT4TITLEPAGE        = CB5.402
REPORT4TITLESUMMARY     = CB5.403
REPORT4TOSCREEN         = CB5.404
STYLE4COLOR             = CB5.405
STYLE4CREATE            = CB5.406
STYLE4DELETE            = CB5.407
STYLE4FREE              = CB5.408
STYLE4INDEX             = CB5.409
STYLE4LOOKUP            = CB5.410
TOTAL4CREATE            = CB5.411
TOTAL4FREE              = CB5.412
REPORT4DATADO           = CB5.413
TOTAL4ADDCONDITION      = CB5.414
REPORT4DATAFILESET      = CB5.415
REPORT4DATAGROUP        = CB5.416
OBJ4DATAFIELDSET        = CB5.417
WRITEDIB                = CB5.418
GETDIB                  = CB5.419
PALETTESIZE             = CB5.420
FINDDIBBITS             = CB5.421
REPORT4INDEX_TYPE       = CB5.422
AREA4ADD_OBJECT         = CB5.423
OBJ4REMOVE              = CB5.424
GROUP4POSITIONSET       = CB5.425
REPORT4GET_PRINTERIC    = CB5.426
TOTAL4LOOKUP            = CB5.427
AREA4SORT_OBJ_TREE      = CB5.428
RELATE4LOOKUP_DATA      = CB5.429
REPORT4RETRIEVE2        = CB5.430
RELATE4SAVE2            = CB5.431
RELATE4RETRIEVE2        = CB5.432
```

```
T4BLOCK              = CB5.451
T4CHECK              = CB5.452

CTRL4ADDCODE                  = CB5.500
CTRL4CODELISTINIT             = CB5.501
CTRL4FREECTRLNODE             = CB5.502
CTRL4FREECODELIST             = CB5.503
CTRL4GETCTRLCODE               = CB5.504
CTRL4INITVBX                   = CB5.505
CTRL4INITVBXUNDO               = CB5.506
```

```c
// DataBase file names
extern char *LibraryName;
extern char *DocumentName;
extern char *KitLinkName;
extern char *UsageName;
extern char *ConfigName;

// DataBase utility functions
void CreateDataBase();
void DeleteDataBase();
```

```c
#include "stdafx.h"
include "pod.h"
#include "pwmainte.h"

#include <stdio.h>
include <stdlib.h> include <io.h> include "db.h"
//#include "d4all.hpp"

// Library Table
/*
static FIELD4INFO LibraryTable[] = {
        {"Name",'C',31,0},
        {"Id",'N',11,0},
        {0,0,0,0}};
static TAG4INFO LibraryTag[] = {
        {"NameTag","Name","",0,0},
        {"IdTag","Id","",e4unique,0},
        {0,0,0,0,0}};
*/
char *LibraryName = "Library";
char *LibraryTable[] = {
        "Name,c,31",
        "Id,I,11",
        NULL};

// Document (& Kit) Table
/*
static FIELD4INFO DocumentTable[] = {
        {"Name",'C',31,0},
        {"Id",'N',11,0},
        {"GroupId",'N',11,0},
        {"File",'C',20,0},
        {"Desc",'C',1024,0},
        {"Avail",'N',11,0},
        {0,0,0,0}};
static TAG4INFO DocumentTag[] = {
        {"NameTag","Name","",0,0},
        {"IdTag","Id","",e4unique,0},
        {"GroupIdTag","GroupId","",e4unique,0},
        {"FileTag","File","",e4unique,0},
        {0,0,0,0,0}};
*/
char *DocumentName = "Document";
char *DocumentTable[] = {
        "Name,c,31",
        "Id,I,11",
        "GroupId,I,11",
        "File,c,20",
        "Desc,c,1024",
        "Avail,I,11",
```

```
        NULL};

// Kit Link Table
/*
static FIELD4INFO KitLinkTable[] = {
        {"KitId",'N',11,0},
        {"DocId",'N',11,0},
        {0,0,0,0}};
static TAG4INFO KitLinkTag[] = {
        {"KitIdTag","KitId","",0,0},
        {"DocIdTag","DocId","",0,0},
        {0,0,0,0}};
*/
char *KitLinkName = "KitLink";
char *KitLinkTable[] = {
        "KitId,I,11",
        "DocId,I,11",
        NULL};

// Usage Table
/*
static FIELD4INFO UsageTable[] = {
        {"DocId",'N',11,0},
        {"Date",'D',8,0},
        {"Quantity",'N',11,0},
        {0,0,0,0}};
static TAG4INFO UsageTag[] = {
        {"DocIdTag","DocId","",0,0},
        {"DateTag","Date","",0,0},
        {"QuantityTag","Quantity","",0,0},
        {0,0,0,0}};
*/
char *UsageName = "Usage";
char *UsageTable[] = {
        "DocId,I,11",
        "Date,c,8",
        "Quantity,I,11",
        NULL};

// Configuration Table
/*static FIELD4INFO ConfigTable[] = {
        {"Item",'C',31,0},
        {"Value",'C',31,0},
        {0,0,0,0}};
static TAG4INFO ConfigTag[] = {
        {"ItemTag","Item","",0,0},
        {0,0,0,0}};
*/
char *ConfigName = "Config";
char *ConfigTable[] = {
        "Item,c,51",
        "Value,c,51",
        NULL};
```

```c
static void CheckExistance(char *List, char *FileName, int *cnt)
        {
        char buf[50];
        strcpy(buf,FileName);
        strcat(buf,".dbf");
        if (_access(buf,0) == 0)
                {
                if ((*cnt)++)
                        strcat(List,", ");
                strcat(List,FileName);
                }
        } void CreateDataBase()
        {
        char buf[1024],buf1[1024];
        int count=0;

buf[0] = '\0';
        CheckExistance(buf,LibraryName,&count);
        CheckExistance(buf,DocumentName,&count);
        CheckExistance(buf,KitLinkName,&count);
        CheckExistance(buf,UsageName,&count);
        CheckExistance(buf,ConfigName,&count);
        strcat(buf,".");
        if (count)
                {
                if (count == 1)
                        strcpy(buf1,"The following database already exists: ");
                else
                        strcpy(buf1,"The following databases already exist: ");
                strcat(buf1,buf);
                MessageBox(0,buf1,"Oh, no you don't!",MB_OK);
                return;
                }
        MessageBox(0,"Creating databases.","What's up?",MB_OK);

DataBase Library(LibraryName,LibraryTable);
        DataBase Document(DocumentName,DocumentTable);
        DataBase KitLink(KitLinkName,KitLinkTable);
        DataBase Usage(UsageName,UsageTable);
        DataBase Config(ConfigName,ConfigTable);
        //
        Config.AppendBlank();
        Config.Assign("Item","michaelpw");
        Config.Assign("Value",PWMaintenanceDlg::encrypt(buf,"mls@src"));
        Config.AppendBlank();
        Config.Assign("Item","documentpw");
        Config.Assign("Value",PWMaintenanceDlg::encrypt(buf,"src"));
        Config.AppendBlank();
        Config.Assign("Item","kitpw");
```

```
        Config.Assign("Value",PWMaintenanceDlg::encrypt(buf,"src"));
        Config.AppendBlank();
        Config.Assign("Item","grouppw");
        Config.Assign("Value",PWMaintenanceDlg::encrypt(buf,"src"));
        //

/*      Code4 cb;
        Data4 Library,Document,KitLink,Usage,Config;

if (Library.create(cb,LibraryName,LibraryTable,LibraryTag))
                MessageBox(0,"Error creating Library data base.","Data4.create()",MB_OK);
        Library.close();

if (Document.create(cb,DocumentName,DocumentTable,DocumentTag))
                MessageBox(0,"Error creating Document (& Kit) data
base.","Data4.create()",MB_OK);
        Document.close();

if (KitLink.create(cb,KitLinkName,KitLinkTable,KitLinkTag))
                MessageBox(0,"Error creating Kit Link data base.","Data4.create()",MB_OK);
        KitLink.close();

if (Usage.create(cb,UsageName,UsageTable,UsageTag))
                MessageBox(0,"Error creating Usage data base.","Data4.create()",MB_OK);
        Usage.close();

if (Config.create(cb,ConfigName,ConfigTable,ConfigTag))
                MessageBox(0,"Error creating Config data base.","Data4.create()",MB_OK);
        Config.close();
*/
        } static void DeleteTable(char *s)
        {
        char buf[50];
        strcpy(buf,s);
        strcat(buf,".dbf");
        remove(buf);
        strcpy(buf,s);
        strcat(buf,".mdx");
        remove(buf);
        } void DeleteDataBase()
        {
        remove(DocumentName);
        remove(LibraryName);
        remove(KitLinkName);
        remove(UsageName);
        remove(ConfigName);
        /*
```

```
DeleteTable(DocumentName);
DeleteTable(LibraryName);
DeleteTable(KitLinkName);
DeleteTable(UsageName);
DeleteTable(ConfigName);
*/
}
```

```c
#include "stdafx.h"
include "pod.h"
#include "pwmainte.h"

#include <stdio.h>
include <stdlib.h> include <io.h> include "db.h"
//#include "d4all.hpp"

// Library Table
/*
static FIELD4INFO LibraryTable[] = {
        {"Name",'C',31,0},
        {"Id",'N',11,0},
        {0,0,0,0}};
static TAG4INFO LibraryTag[] = {
        {"NameTag","Name","",0,0},
        {"IdTag","Id","",e4unique,0},
        {0,0,0,0,0}};
*/
char *LibraryName = "Library";
char *LibraryTable[] = {
        "Name,c,31",
        "Id,I,11",
        NULL};

// Document (& Kit) Table
/*
static FIELD4INFO DocumentTable[] = {
        {"Name",'C',31,0},
        {"Id",'N',11,0},
        {"GroupId",'N',11,0},
        {"File",'C',20,0},
        {"Desc",'C',1024,0},
        {"Avail",'N',11,0},
        {0,0,0,0}};
static TAG4INFO DocumentTag[] = {
        {"NameTag","Name","",0,0},
        {"IdTag","Id","",e4unique,0},
        {"GroupIdTag","GroupId","",e4unique,0},
        {"FileTag","File","",e4unique,0},
        {0,0,0,0,0}};
*/
char *DocumentName = "Document";
char *DocumentTable[] = {
        "Name,c,31",
        "Id,I,11",
        "GroupId,I,11",
        "File,c,20",
        "Desc,c,1024",
        "Avail,I,11",
```

```
        NULL};

// Kit Link Table
/*
static FIELD4INFO KitLinkTable[] = {
        {"KitId",'N',11,0},
        {"DocId",'N',11,0},
        {0,0,0,0}};
static TAG4INFO KitLinkTag[] = {
        {"KitIdTag","KitId","",0,0},
        {"DocIdTag","DocId","",0,0},
        {0,0,0,0,0}};
*/
char *KitLinkName = "KitLink";
char *KitLinkTable[] = {
        "KitId,I,11",
        "DocId,I,11",
        NULL};

// Usage Table
/*
static FIELD4INFO UsageTable[] = {
        {"DocId",'N',11,0},
        {"Date",'D',8,0},
        {"Quantity",'N',11,0},
        {0,0,0,0}};
static TAG4INFO UsageTag[] = {
        {"DocIdTag","DocId","",0,0},
        {"DateTag","Date","",0,0},
        {"QuantityTag","Quantity","",0,0},
        {0,0,0,0,0}};
*/
char *UsageName = "Usage";
char *UsageTable[] = {
        "DocId,I,11",
        "Date,c,8",
        "Quantity,I,11",
        NULL};

// Configuration Table
/*static FIELD4INFO ConfigTable[] = {
        {"Item",'C',31,0},
        {"Value",'C',31,0},
        {0,0,0,0}};
static TAG4INFO ConfigTag[] = {
        {"ItemTag","Item","",0,0},
        {0,0,0,0,0}};
*/
char *ConfigName = "Config";
char *ConfigTable[] = {
        "Item,c,51",
        "Value,c,51",
        NULL};
```

```
static void CheckExistance(char *List, char *FileName, int *cnt)
        {
        char buf[50];
        strcpy(buf,FileName);
        strcat(buf,".dbf");
        if (_access(buf,0) == 0)
                {
                if ((*cnt)++)
                        strcat(List,", ");
                strcat(List,FileName);
                }
        } void CreateDataBase()
        {
        char buf[1024],buf1[1024];
        int count=0;

buf[0] = '\0';
        CheckExistance(buf,LibraryName,&count);
        CheckExistance(buf,DocumentName,&count);
        CheckExistance(buf,KitLinkName,&count);
        CheckExistance(buf,UsageName,&count);
        CheckExistance(buf,ConfigName,&count);
        strcat(buf,".");
        if (count)
                {
                if (count == 1)
                        strcpy(buf1,"The following database already exists: ");
                else
                        strcpy(buf1,"The following databases already exist: ");
                strcat(buf1,buf);
                MessageBox(0,buf1,"Oh, no you don't!",MB_OK);
                return;
                }
        MessageBox(0,"Creating databases.","What's up?",MB_OK);

DataBase Library(LibraryName,LibraryTable);
        DataBase Document(DocumentName,DocumentTable);
        DataBase KitLink(KitLinkName,KitLinkTable);
        DataBase Usage(UsageName,UsageTable);
        DataBase Config(ConfigName,ConfigTable);
        //
        Config.AppendBlank();
        Config.Assign("Item","michaelpw");
        Config.Assign("Value",PWMaintenanceDlg::encrypt(buf,"mls@src"));
        Config.AppendBlank();
        Config.Assign("Item","documentpw");
        Config.Assign("Value",PWMaintenanceDlg::encrypt(buf,"src"));
        Config.AppendBlank();
        Config.Assign("Item","kitpw");
```

```
            Config.Assign("Value",PWMaintenanceDlg::encrypt(buf,"src"));
            Config.AppendBlank();
            Config.Assign("Item","grouppw");
            Config.Assign("Value",PWMaintenanceDlg::encrypt(buf,"src"));
            //

/*          Code4 cb;
            Data4 Library,Document,KitLink,Usage,Config;

if (Library.create(cb,LibraryName,LibraryTable,LibraryTag))
                    MessageBox(0,"Error creating Library data base.","Data4.create()",MB_OK);
            Library.close();

if (Document.create(cb,DocumentName,DocumentTable,DocumentTag))
                    MessageBox(0,"Error creating Document (& Kit) data
base.","Data4.create()",MB_OK);
            Document.close();

if (KitLink.create(cb,KitLinkName,KitLinkTable,KitLinkTag))
                    MessageBox(0,"Error creating Kit Link data base.","Data4.create()",MB_OK);
            KitLink.close();

if (Usage.create(cb,UsageName,UsageTable,UsageTag))
                    MessageBox(0,"Error creating Usage data base.","Data4.create()",MB_OK);
            Usage.close();

if (Config.create(cb,ConfigName,ConfigTable,ConfigTag))
                    MessageBox(0,"Error creating Config data base.","Data4.create()",MB_OK);
            Config.close();
*/
            } static void DeleteTable(char *s)
            {
            char buf[50];
            strcpy(buf,s);
            strcat(buf,".dbf");
            remove(buf);
            strcpy(buf,s);
            strcat(buf,".mdx");
            remove(buf);
            } void DeleteDataBase()
            {
            remove(DocumentName);
            remove(LibraryName);
            remove(KitLinkName);
            remove(UsageName);
            remove(ConfigName);
            /*
```

```
DeleteTable(DocumentName);
DeleteTable(LibraryName);
DeleteTable(KitLinkName);
DeleteTable(UsageName);
DeleteTable(ConfigName);
*/
}
```

```c
#include <stdio.h>
include <stdlib.h> include "d4all.hpp"

static FIELD4INFO LibraryTable[] = {
        {"Name",'C',31,0},
        {"Id",'C',11,0},
        {0,0,0,0}};
static TAG4INFO LibraryTag[] = {
        {"NameTag","Name","",0,0},
        {"IdTag","Id","",e4unique,0},
        {0,0,0,0,0}};

void CreateDataBase()
        {
        Code4 cb;
        Data4 Library;

if (Library.create(cb,"Library",LibraryTable,LibraryTag))
                printf("Error creating Library data base.\n");
        cb.exitTest();
        Library.close();
        }
```

```c
#include <stdio.h>
include <stdlib.h> include "d4all.hpp"

static FIELD4INFO LibraryTable[] = {
        {"Name",'C',31,0},
        {"Id",'C',11,0},
        {0,0,0,0}};
static TAG4INFO LibraryTag[] = {
        {"NameTag","Name","",0,0},
        {"IdTag","Id","",e4unique,0},
        {0,0,0,0,0}};

void CreateDataBase()
        {
        Code4 cb;
        Data4 Library;

if (Library.create(cb,"Library",LibraryTable,LibraryTag))
                printf("Error creating Library data base.\n");
        cb.exitTest();
        Library.close();
        }
```

```cpp
// document.h : header file
//

/////////////////////////////////////////////////////////////////
// DocumentMaintenanceDlg dialog class DocumentMaintenanceDlg : public CDialog
{
        long DocId;
        int FillScreen();
        void Lock();
        void UnLock();
// Construction
public:
        DocumentMaintenanceDlg(CWnd* pParent = NULL);    // standard constructor // Dialog Data
        //{{AFX_DATA(DocumentMaintenanceDlg)
        enum { IDD = IDD_DIALOG6 };
        CEdit    m_Description;
        CStatic  m_Available;
        CEdit    m_DocumentName;
        CComboBox    m_Group;
        CStatic  m_FileName;
        //}}AFX_DATA // Implementation
protected:
        virtual void DoDataExchange(CDataExchange* pDX);    // DDX/DDV support // Generated message map functions
        //{{AFX_MSG(DocumentMaintenanceDlg)
        afx_msg void OnAdd();
        afx_msg void OnModify();
        afx_msg void OnDelete();
        virtual BOOL OnInitDialog();
        afx_msg void OnSelchangeCombo1();
        afx_msg void OnKillfocusEditName();
        afx_msg void OnKillfocusEditDescription();
        //}}AFX_MSG
        DECLARE_MESSAGE_MAP()
};
```

```cpp
// document.cpp : implementation file
// include "stdafx.h"
include "pod.h"
#include "document.h"
#include "getfiled.h"
#include "selectdo.h"
#include "db-init.h"

#include <lzexpand.h>
#include <io.h>
#include <sys\types.h>
include <sys\stat.h> include "db.h"

ifdef _DEBUG
undef THIS_FILE
static char BASED_CODE THIS_FILE[] = __FILE__;
endif /////////////////////////////////////////////////////////////////////////
// DocumentMaintenanceDlg dialog DocumentMaintenanceDlg::DocumentMaintenanceDlg(CWnd* pParent /*=NULL*/)
        : CDialog(DocumentMaintenanceDlg::IDD, pParent)
{
        //{{AFX_DATA_INIT(DocumentMaintenanceDlg)
                // NOTE: the ClassWizard will add member initialization here
        //}}AFX_DATA_INIT
} void DocumentMaintenanceDlg::DoDataExchange(CDataExchange* pDX)
{
        CDialog::DoDataExchange(pDX);
        //{{AFX_DATA_MAP(DocumentMaintenanceDlg)
        DDX_Control(pDX, IDC_EDIT_DESCRIPTION, m_Description);
        DDX_Control(pDX, IDC_STATIC_AVAILABLE, m_Available);
        DDX_Control(pDX, IDC_EDIT_NAME, m_DocumentName);
        DDX_Control(pDX, IDC_COMBO1, m_Group);
        DDX_Control(pDX, IDC_STATIC_FILE, m_FileName);
        //}}AFX_DATA_MAP
}

BEGIN_MESSAGE_MAP(DocumentMaintenanceDlg, CDialog)
        //{{AFX_MSG_MAP(DocumentMaintenanceDlg)
        ON_BN_CLICKED(IDC_ADD, OnAdd)
        ON_BN_CLICKED(IDC_MODIFY, OnModify)
        ON_BN_CLICKED(IDC_DELETE, OnDelete)
        ON_CBN_SELCHANGE(IDC_COMBO1, OnSelchangeCombo1)
        ON_EN_KILLFOCUS(IDC_EDIT_NAME, OnKillfocusEditName)
        ON_EN_KILLFOCUS(IDC_EDIT_DESCRIPTION, OnKillfocusEditDescription)
```

```cpp
    //}}AFX_MSG_MAP
END_MESSAGE_MAP()

/////////////////////////////////////////////////////////////////////////////
// DocumentMaintenanceDlg message handlers void DocumentMaintenanceDlg::OnAdd()
{
    // TODO: Add your control notification handler code here
    char *FileName,DocumentDirectory[200],buf[1024],buf1[50];
    OFSTRUCT ofSrc,ofDst;
    HFILE hSrc,hDst;
    GetFileDlg g;
    if (g.DoModal() != IDOK)
        return;
    // Need to get the file name back to here.
    //MessageBox(g.FileName);
    if ((FileName = strrchr(g.FileName,'\\')) == NULL)
        {
        MessageBox("No file was selected.");
        return;
        }
    ++FileName;
    // Get the Document Directory.
    GetPrivateProfileString("System
Defaults","DocumentDirectory","c:\\",DocumentDirectory,200,"pod.ini");
    if ( *(DocumentDirectory + strlen(DocumentDirectory) - 1) != '\\')
        strcat(DocumentDirectory,"\\");
    // Make sure the file isn't already in the database.
    DataBase DbDocument(DocumentName);
    DataBase DbGroup(LibraryName);
    if (DbDocument.Select("File",FileName) == 0)
        {
        // If it is, ask the user if they want to replace the old file.
        if (MessageBox("A file by this name already \nexists. Do you want to \nreplace it with this file ?","Warning",MB_YESNO|MB_ICONQUESTION) == IDYES)
            {

//sprintf(buf,"<<%s>>g.FileName\n<<%s%s>>DocDirFileName",g.FileName,DocumentDirectory,FileName);
            //MessageBox(buf);
            m_FileName.SetWindowText(FileName);
            sprintf(buf,"%s%s",DocumentDirectory,FileName);
            if (strcmp(buf,g.FileName) == 0)
                {
                MessageBox("You are trying to copy a file on top of itself.  You can replace an existing document with a new one, but you can't replace an existing document with itself.","Status",MB_OK|MB_ICONHAND);
                return;
                }
            //
            _chmod(buf,_S_IWRITE);
            hSrc = LZOpenFile(g.FileName,&ofSrc,OF_READ);
```

```
                        hDst = LZOpenFile(buf,&ofDst,OF_CREATE);
                        LZCopy(hSrc,hDst);
                        LZClose(hSrc);
                        LZClose(hDst);
                        _chmod(buf,_S_IREAD);
                        // Get group, name, available, & description.
                        if (DbGroup.Select("Id",DbDocument.GetLong("GroupId")))
                                m_Group.SelectString(-1," No Library");
                        else
                                m_Group.SelectString(-1,DbGroup.Get("Name",buf1));
                        m_DocumentName.SetWindowText(DbDocument.Get("Name",buf1));
                        if (DbDocument.GetLong("Avail") < 0)
                                m_Available.SetWindowText("No Limit");
                        else
                                m_Available.SetWindowText(DbDocument.Get("Avail",buf1));
                        m_Description.SetWindowText(DbDocument.Get("Desc",buf));
                        // UnLock fields for user input.
                        UnLock();
                        }
                return;
                }
        // Add the new file.
        sprintf(buf,"%s%s",DocumentDirectory,FileName);
        if (strcmp(buf,g.FileName))
                {
                hSrc = LZOpenFile(g.FileName,&ofSrc,OF_READ);
                hDst = LZOpenFile(buf,&ofDst,OF_CREATE);
                LZCopy(hSrc,hDst);
                LZClose(hSrc);
                LZClose(hDst);
                }
        else
                MessageBox("You are reclaiming a
document.","Status",MB_OK|MB_ICONINFORMATION);
        // Write protect the file.
        _chmod(buf,_S_IREAD);
        //
        DbDocument.AppendBlank();
        DbDocument.Assign("File",FileName);
        m_FileName.SetWindowText(FileName);
        DbDocument.AssignLong("Id",DbDocument.GetRecNum());
        // Set the group to none.
        DbDocument.AssignLong("GroupId",-1);
        m_Group.SelectString(-1," No Library");
        // Set the name to none so Modify button can see empty names.
        DbDocument.Assign("Name","No Name");
        m_DocumentName.SetWindowText("No Name");
        // Clear Name, Available, and Description.
        DbDocument.AssignLong("Avail",-1);
        m_Available.SetWindowText("No Limit");
        DbDocument.Assign("Desc","No Description");
        m_Description.SetWindowText("No Description");
        // UnLock fields for user input.
        UnLock();
```

```
} int DocumentMaintenanceDlg::FillScreen()
        {
        char buf[1024];
        DataBase DbDocument(DocumentName);
        DataBase DbGroup(LibraryName);
        if (DbDocument.Select("Id",DocId))
                {
                MessageBox("Error...Selected document doesn't exist.");
                return 1;
                }
        m_DocumentName.SetWindowText(DbDocument.Get("Name",buf));
        m_FileName.SetWindowText(DbDocument.Get("File",buf));
        if (DbGroup.Select("Id",DbDocument.GetLong("GroupId")))
                m_Group.SelectString(-1," No Library");
        else
                m_Group.SelectString(-1,DbGroup.Get("Name",buf));
        if (DbDocument.GetLong("Avail") < 0)
                m_Available.SetWindowText("No Limit");
        else
                m_Available.SetWindowText(DbDocument.Get("Avail",buf));
        m_Description.SetWindowText(DbDocument.Get("Desc",buf));
        return 0;
        } void DocumentMaintenanceDlg::OnModify()
{
        // TODO: Add your control notification handler code here
        SelectDocumentDlg s;
        // Need to get the document name or number back here.
        if (s.DoModal() != IDOK)
                return;
        DocId = s.DocId;
        FillScreen();
        UnLock();
} void DocumentMaintenanceDlg::OnDelete()
{
        // TODO: Add your control notification handler code here
        char buf[1024],buf1[50],DocumentDirectory[200];
        SelectDocumentDlg s;
        // Need to get the document name or number back here.
        if (s.DoModal() != IDOK)
                return;
        // Get the selected document and show it to user to confirm deletion.
        DocId = s.DocId;
        if (FillScreen())
                return;
        // Now confirm deletion, then delete.
```

```
        DataBase DbDocument(DocumentName);
        DbDocument.Select("Id",DocId);
        sprintf(buf,"Are you sure that you want to\ndelete <<%s>>
?",DbDocument.Get("Name",buf1));
        if (MessageBox(buf,"Warning",MB_YESNO|MB_ICONQUESTION) != IDYES)
                {
                UnLock();
                return;
                }
        Lock();
        // Unprotect the document file.
        // Get the Document Directory.
        GetPrivateProfileString("System
Defaults","DocumentDirectory","c:\\",DocumentDirectory,200,"pod.ini");
        if ( *(DocumentDirectory + strlen(DocumentDirectory) - 1) != '\\')
                strcat(DocumentDirectory,"\\");
        sprintf(buf,"%s%s",DocumentDirectory,DbDocument.Get("File",buf1));
        _chmod(buf,_S_IWRITE);
        // Delete the document from the database.
        DbDocument.Delete();
        DocId = -1L;
        // Clear the screen fields.
        m_DocumentName.SetWindowText("");
        m_FileName.SetWindowText("");
        m_Group.SelectString(-1," No Library");
        m_Available.SetWindowText("");
        m_Description.SetWindowText("");
}

BOOL DocumentMaintenanceDlg::OnInitDialog()
{
        char buf[100];
        CDialog::OnInitDialog();

// TODO: Add extra initialization here
        // Lock the input fields so the user can't touch them.
        Lock();
        // Fill the group pick list with the libraries.
        DocId = -1L;
        DataBase DbLibrary(LibraryName);
        m_Group.AddString(" No Library");
        for (DbLibrary.Top(); DbLibrary.Eof()==0; DbLibrary.Skip(1))
                {
                if (DbLibrary.Get("Name",buf) != NULL)
                        {
                        m_Group.AddString(buf);
                        }
                } return TRUE;  // return TRUE  unless you set the focus to a control
}
```

```
void DocumentMaintenanceDlg::OnSelchangeCombo1()
{
        // TODO: Add your control notification handler code here
        char FileName[50],Group[50];
        DataBase DbDocument(DocumentName);
        DataBase DbGroup(LibraryName);

// Get the Document record.
        m_FileName.GetWindowText(FileName,50);
        if (DbDocument.Select("File",FileName))
                {
                MessageBox("Error...Couldn't find current document in database.");
                return;
                }
        // Check for no group and deal with it.
        m_Group.GetWindowText(Group,50);
        if (strcmp(Group," No Library") == 0)
                {
                DbDocument.AssignLong("GroupId",-1L);
                return;
                }
        // Get the Group record.
        if (DbGroup.Select("Name",Group))
                {
                MessageBox("Error...Couldn't find group in database.");
                return;
                }
        // Assign the new group.
        DbDocument.AssignLong("GroupId",DbGroup.GetLong("Id"));
} void DocumentMaintenanceDlg::OnKillfocusEditName()
{
        // TODO: Add your control notification handler code here
        char buf[50];
        DataBase DbDocument(DocumentName);

// Get the Document record.
        m_FileName.GetWindowText(buf,50);
        if (DbDocument.Select("File",buf))
                {
                MessageBox("Error...Couldn't find current document in database.");
                return;
                }
        m_DocumentName.GetWindowText(buf,50);
        DbDocument.Assign("Name",buf);
} void DocumentMaintenanceDlg::OnKillfocusEditDescription()
{
        // TODO: Add your control notification handler code here
        char buf[1024];
```

```
        DataBase DbDocument(DocumentName);

// Get the Document record.
        m_FileName.GetWindowText(buf,50);
        if (DbDocument.Select("File",buf))
                {
                MessageBox("Error...Couldn't find current document in database.");
                return;
                }
        m_Description.GetWindowText(buf,1024);
        DbDocument.Assign("Desc",buf);
} void DocumentMaintenanceDlg::Lock()
        {
        m_DocumentName.EnableWindow(0);
        m_Group.EnableWindow(0);
        m_Description.EnableWindow(0);
        } void DocumentMaintenanceDlg::UnLock()
        {
        m_DocumentName.EnableWindow();
        m_Group.EnableWindow();
        m_Description.EnableWindow();
        }
```

```
// getfiled.h : header file
//

/////////////////////////////////////////////////////////////
// GetFileDlg dialog class GetFileDlg : public CDialog
{
        char *What;
// Construction
public:
        GetFileDlg(char *aWhat=NULL, CWnd* pParent = NULL);        // standard constructor
        ~GetFileDlg();

// Dialog Data
        //{{AFX_DATA(GetFileDlg)
        enum { IDD = IDD_DIALOG7 };
        CListBox      m_Files;
        CEdit   m_Location;
        //}}AFX_DATA
        char FileName[100];

// Implementation
protected:
        virtual void DoDataExchange(CDataExchange* pDX);     // DDX/DDV support // Generated message map functions
        //{{AFX_MSG(GetFileDlg)
        virtual BOOL OnInitDialog();
        afx_msg void OnUpdateEdit1();
        afx_msg void OnSelchangeList1();
        //}}AFX_MSG
        DECLARE_MESSAGE_MAP()
};
```

```cpp
// getfiled.cpp : implementation file
// include "stdafx.h"
include "pod.h"
#include "getfiled.h"

#ifdef _DEBUG
undef THIS_FILE
static char BASED_CODE THIS_FILE[] = __FILE__;
endif /////////////////////////////////////////////////////////////////////////////
// GetFileDlg dialog GetFileDlg::GetFileDlg(char *aWhat, CWnd* pParent /*=NULL*/)
        : CDialog(GetFileDlg::IDD, pParent)
{
        if (aWhat != NULL)
                {
                if ((What = new char[strlen(aWhat)+2]) != 0)
                        strcpy(What,aWhat);
                }
        else
                {
                What = 0;
                }

//{{AFX_DATA_INIT(GetFileDlg)
                // NOTE: the ClassWizard will add member initialization here
        //}}AFX_DATA_INIT
}

GetFileDlg::~GetFileDlg()
        {
        if (What != 0)
                delete What;
        } void GetFileDlg::DoDataExchange(CDataExchange* pDX)
{
        CDialog::DoDataExchange(pDX);
        //{{AFX_DATA_MAP(GetFileDlg)
        DDX_Control(pDX, IDC_LIST1, m_Files);
        DDX_Control(pDX, IDC_EDIT1, m_Location);
        //}}AFX_DATA_MAP
}

BEGIN_MESSAGE_MAP(GetFileDlg, CDialog)
        //{{AFX_MSG_MAP(GetFileDlg)
        ON_EN_UPDATE(IDC_EDIT1, OnUpdateEdit1)
        ON_LBN_SELCHANGE(IDC_LIST1, OnSelchangeList1)
```

```
        //}}AFX_MSG_MAP
END_MESSAGE_MAP()

/////////////////////////////////////////////////////////////////
// GetFileDlg message handlers BOOL GetFileDlg::OnInitDialog()
{
        CDialog::OnInitDialog();

// TODO: Add extra initialization here
        int n;
        if (What == NULL)
                n=GetPrivateProfileString("System
Defaults","AddDirectory","c:\\",FileName,100,"pod.ini");
        else
                n=GetPrivateProfileString("System Defaults",What,"c:\\",FileName,100,"pod.ini");
        if (n<1)
                strcpy(FileName,"c:\\");
        if (*(FileName+strlen(FileName)-1) == '\\')
                strcat(FileName,"*.*");
        else
                strcat(FileName,"\\*.*");
        m_Location.SetWindowText(FileName);
        m_Files.ResetContent();
        m_Files.Dir(0,FileName);

return TRUE;  // return TRUE  unless you set the focus to a control
} void GetFileDlg::OnUpdateEdit1()
{
        // TODO: Add your control notification handler code here
        char *s;
        if (m_Location.GetWindowText(FileName,100) == 0)
                {
                strcpy(FileName,"c:\\*.*");
                m_Location.SetWindowText(FileName);
                }
        m_Files.ResetContent();
        m_Files.Dir(0,FileName);
        if ((s = strrchr(FileName,'\\')) != NULL)
                {
                *s = '\0';
                if (What == NULL)
                        WritePrivateProfileString("System
Defaults","AddDirectory",FileName,"pod.ini");
                else
                        WritePrivateProfileString("System Defaults",What,FileName,"pod.ini");
                *s = '\\';
                }
}
```

```
void GetFileDlg::OnSelchangeList1()
{
        // TODO: Add your control notification handler code here
        char *s;
        if ((s = strrchr(FileName,'\\')) != NULL)
                s++;
        else
                s = FileName;
        m_Files.GetText(m_Files.GetCurSel(),s);
        OnOK();
}
```

```cpp
// groupmai.h : header file
//

/////////////////////////////////////////////////////////////////
// GroupMaintenanceDlg dialog class GroupMaintenanceDlg : public CDialog
{
// Construction
public:
        GroupMaintenanceDlg(CWnd* pParent = NULL);   // standard constructor // Dialog Data
        //{{AFX_DATA(GroupMaintenanceDlg)
        enum { IDD = IDD_DIALOG5 };
        CComboBox    m_Group2;
        CComboBox    m_Group1;
        CListBox     m_Documents2;
        CListBox     m_Documents1;
        //}}AFX_DATA // Implementation
protected:
        virtual void DoDataExchange(CDataExchange* pDX);    // DDX/DDV support // Generated message map functions
        //{{AFX_MSG(GroupMaintenanceDlg)
        afx_msg void OnAddGroup();
        virtual BOOL OnInitDialog();
        afx_msg void OnDeleteGroup();
        afx_msg void OnRenameGroup();
        afx_msg void OnSelchangeCombo1();
        afx_msg void OnSelchangeCombo2();
        afx_msg void OnSelchangeList1();
        afx_msg void OnSelchangeList2();
        //}}AFX_MSG
        DECLARE_MESSAGE_MAP()
};
```

```cpp
// groupmai.cpp : implementation file
// include "stdafx.h"
include "pod.h"
#include "groupmai.h"
#include "inputstr.h"
#include "db-init.h"

#include "db.h"

ifdef _DEBUG
undef THIS_FILE
static char BASED_CODE THIS_FILE[] = __FILE__;
endif /////////////////////////////////////////////////////////////////////////////
// GroupMaintenanceDlg dialog GroupMaintenanceDlg::GroupMaintenanceDlg(CWnd* pParent /*=NULL*/)
        : CDialog(GroupMaintenanceDlg::IDD, pParent)
{
        //{{AFX_DATA_INIT(GroupMaintenanceDlg)
        //}}AFX_DATA_INIT
} void GroupMaintenanceDlg::DoDataExchange(CDataExchange* pDX)
{
        CDialog::DoDataExchange(pDX);
        //{{AFX_DATA_MAP(GroupMaintenanceDlg)
        DDX_Control(pDX, IDC_COMBO2, m_Group2);
        DDX_Control(pDX, IDC_COMBO1, m_Group1);
        DDX_Control(pDX, IDC_LIST2, m_Documents2);
        DDX_Control(pDX, IDC_LIST1, m_Documents1);
        //}}AFX_DATA_MAP
}

BEGIN_MESSAGE_MAP(GroupMaintenanceDlg, CDialog)
        //{{AFX_MSG_MAP(GroupMaintenanceDlg)
        ON_BN_CLICKED(IDC_ADD_GROUP, OnAddGroup)
        ON_BN_CLICKED(IDC_DELETE_GROUP, OnDeleteGroup)
        ON_BN_CLICKED(IDC_RENAME_GROUP, OnRenameGroup)
        ON_CBN_SELCHANGE(IDC_COMBO1, OnSelchangeCombo1)
        ON_CBN_SELCHANGE(IDC_COMBO2, OnSelchangeCombo2)
        ON_LBN_SELCHANGE(IDC_LIST1, OnSelchangeList1)
        ON_LBN_SELCHANGE(IDC_LIST2, OnSelchangeList2)
        //}}AFX_MSG_MAP
END_MESSAGE_MAP()

/////////////////////////////////////////////////////////////////////////////
// GroupMaintenanceDlg message handlers
```

```
void GroupMaintenanceDlg::OnAddGroup()
{
        // TODO: Add your control notification handler code here
        InputStringDlg isd("Enter a name for the Library.");
        if(isd.DoModal() != IDOK)
                return;
        //MessageBox(isd.InputString);
        DataBase DbLibrary(LibraryName);
        DbLibrary.AppendBlank();
        DbLibrary.Assign("Name",isd.InputString);
        DbLibrary.AssignLong("Id",DbLibrary.GetRecNum());
        m_Group1.AddString(isd.InputString);
        m_Group2.AddString(isd.InputString);
        m_Group1.SelectString(-1,isd.InputString);
        m_Documents1.ResetContent();
}

BOOL GroupMaintenanceDlg::OnInitDialog()
{
        char buf[100];
        CDialog::OnInitDialog();

// TODO: Add extra initialization here
        DataBase DbLibrary(LibraryName);
        m_Group1.AddString(" No Library");
        m_Group2.AddString(" No Library");
        for (DbLibrary.Top();  DbLibrary.Eof()==0; DbLibrary.Skip(1))
                {
                if (DbLibrary.Get("Name",buf) != NULL)
                        {
                        m_Group1.AddString(buf);
                        m_Group2.AddString(buf);
                        }
                //m_Group1.AddString(DbLibrary.Get("Name",buf));
                }
        // Now initialize the left side to No Library.
        m_Group1.SelectString(-1," No Library");
        m_Documents1.ResetContent();
        DataBase DbDocument(DocumentName);
        if (DbDocument.Select("GroupId",-1L))
                return TRUE;
        for (; DbDocument.Eof()==0; DbDocument.Skip(1))
                {
                m_Documents1.AddString(DbDocument.Get("Name",buf));
                } return TRUE;  // return TRUE  unless you set the focus to a control
} void GroupMaintenanceDlg::OnDeleteGroup()
{
        // TODO: Add your control notification handler code here
        char buf[50],buf1[100];
```

```
        long GroupId;
        int flag;
        m_Group1.GetWindowText(buf,50);
        sprintf(buf1,"Are you sure that you want to\ndelete <<%s>> ?",buf);
        if (MessageBox(buf1,"Warning",MB_YESNO|MB_ICONQUESTION) != IDYES)
                return;
        DataBase DbLibrary(LibraryName);
        if (DbLibrary.Select("Name",buf))
                return;
        GroupId = DbLibrary.GetLong("Id");
        DbLibrary.Delete();
        m_Group1.DeleteString(m_Group1.GetCurSel());
        m_Group2.DeleteString(m_Group2.FindString(-1,buf));
        m_Documents1.ResetContent();
        // Now move all documents in this group to No Group.  If No Group is being
        // displayed on other side, add documents to its list.
        m_Group2.GetWindowText(buf,50);
        flag = strcmp(buf," No Library");
        DataBase DbDocument(DocumentName);
        if (DbDocument.Select("GroupId",GroupId))
                return;
        for (; DbDocument.Eof()==0; DbDocument.Skip(1))
                {
                DbDocument.AssignLong("GroupId",-1L);
                if (flag == 0)
                        m_Documents2.AddString(DbDocument.Get("Name",buf));
                }
} void GroupMaintenanceDlg::OnRenameGroup()
{
        // TODO: Add your control notification handler code here
        char OldName[50];
        // Get the old name for the library.
        m_Group1.GetWindowText(OldName,50);
        // Get the new name for the library.
        InputStringDlg isd("Enter a new library name.",OldName);
        if(isd.DoModal() != IDOK)
                return;
        // Locate the library in the database.
        DataBase DbLibrary(LibraryName);
        if (DbLibrary.Select("Name",OldName))
                return;
        // Change the name in the database.
        DbLibrary.Assign("Name",isd.InputString);
        // Delete the old name from the combo boxes.
        m_Group1.DeleteString(m_Group1.GetCurSel());
        m_Group2.DeleteString(m_Group2.FindString(-1,OldName));
        // Add the new name to the combo boxes.  Select it in 1.
        m_Group1.AddString(isd.InputString);
        m_Group1.SelectString(-1,isd.InputString);
        m_Group2.AddString(isd.InputString);
}
```

```
void GroupMaintenanceDlg::OnSelchangeCombo1()
{
        // TODO: Add your control notification handler code here
        char buf[50];
        long GroupId;
        DataBase DbDocument(DocumentName);
        DataBase DbGroup(LibraryName);

// Get the group id & use it to get all documents in the group.
        m_Group1.GetWindowText(buf,50);
        m_Documents1.ResetContent();
        if (strcmp(buf," No Library") == 0)
                {
                GroupId = -1;
                }
        else
                {
                if (DbGroup.Select("Name",buf))
                        {
                        MessageBox("Error...Group not in database.");
                        return;
                        }
                GroupId = DbGroup.GetLong("Id");
                }
        if (DbDocument.Select("GroupId",GroupId))
                return;
        for (; DbDocument.Eof()==0; DbDocument.Skip(1))
                {
                m_Documents1.AddString(DbDocument.Get("Name",buf));
                }
} void GroupMaintenanceDlg::OnSelchangeCombo2()
{
        // TODO: Add your control notification handler code here
        char buf[50];
        long GroupId;
        DataBase DbDocument(DocumentName);
        DataBase DbGroup(LibraryName);

// Get the group id & use it to get all documents in the group.
        m_Group2.GetWindowText(buf,50);
        m_Documents2.ResetContent();
        if (strcmp(buf," No Library") == 0)
                {
                GroupId = -1;
                }
        else
                {
                if (DbGroup.Select("Name",buf))
                        {
```

```
                    MessageBox("Error...Group not in database.");
                    return;
                }
            GroupId = DbGroup.GetLong("Id");
            }
        if (DbDocument.Select("GroupId",GroupId))
            return;
        for (; DbDocument.Eof()==0; DbDocument.Skip(1))
            {
            m_Documents2.AddString(DbDocument.Get("Name",buf));
            }
} void GroupMaintenanceDlg::OnSelchangeList1()
{
    // TODO: Add your control notification handler code here
    char dbuf[50],gbuf[50];
    int i;
    long GroupId;
    DataBase DbDocument(DocumentName);
    // If the right side is empty, initialize it to No Library.
    m_Group2.GetWindowText(gbuf,50);
    if (strcmp(gbuf,"") == 0)
        {
        m_Group2.SelectString(-1," No Library");
        m_Group2.GetWindowText(gbuf,50);
        m_Documents2.ResetContent();
        if (DbDocument.Select("GroupId",-1L) == 0)
            {
            for (; DbDocument.Eof()==0; DbDocument.Skip(1))
                {
                m_Documents2.AddString(DbDocument.Get("Name",dbuf));
                }
            }
        }
    m_Group1.GetWindowText(dbuf,50);
    // If the same group is on both sides, don't do anything.
    if (strcmp(gbuf,dbuf) == 0)
        return;
    // Get the selected document's name.
    m_Documents1.GetText(i=m_Documents1.GetCurSel(),dbuf);
    m_Documents1.DeleteString(i);
    // Now take care of the database.
    DataBase DbGroup(LibraryName);
    if (DbDocument.Select("Name",dbuf))
        {
        MessageBox("Error...Document not in database.");
        return;
        }
    m_Documents2.AddString(dbuf);
    if (strcmp(gbuf," No Library") == 0)
        {
        GroupId = -1;
```

```
                }
        else
                {
                if (DbGroup.Select("Name",gbuf))
                        GroupId = -1;
                else
                        GroupId = DbGroup.GetLong("Id");
                }
        DbDocument.AssignLong("GroupId",GroupId);
} void GroupMaintenanceDlg::OnSelchangeList2()
{
        // TODO: Add your control notification handler code here
        char dbuf[50],gbuf[50];
        int i;
        long GroupId;
        // If the same group is on both sides, don't do anything.
        m_Group1.GetWindowText(gbuf,50);
        m_Group2.GetWindowText(dbuf,50);
        if (strcmp(gbuf,dbuf) == 0)
                return;
        // Get the selected document's name.
        m_Documents2.GetText(i=m_Documents2.GetCurSel(),dbuf);
        m_Documents2.DeleteString(i);
        // Now take care of the database.
        DataBase DbDocument(DocumentName);
        DataBase DbGroup(LibraryName);
        if (DbDocument.Select("Name",dbuf))
                {
                MessageBox("Error...Document not in database.");
                return;
                }
        m_Documents1.AddString(dbuf);
        if (strcmp(gbuf," No Library") == 0)
                {
                GroupId = -1;
                }
        else
                {
                if (DbGroup.Select("Name",gbuf))
                        GroupId = -1;
                else
                        GroupId = DbGroup.GetLong("Id");
                }
        DbDocument.AssignLong("GroupId",GroupId);
}
```

```cpp
// groupmai.cpp : implementation file
// include "stdafx.h"
include "pod.h"
#include "groupmai.h"
#include "inputstr.h"
#include "db-init.h"

#include "db.h"

ifdef _DEBUG
undef THIS_FILE
static char BASED_CODE THIS_FILE[] = __FILE__;
endif /////////////////////////////////////////////////////////////////////////////
// GroupMaintenanceDlg dialog GroupMaintenanceDlg::GroupMaintenanceDlg(CWnd* pParent /*=NULL*/)
        : CDialog(GroupMaintenanceDlg::IDD, pParent)
{
        //{{AFX_DATA_INIT(GroupMaintenanceDlg)
        //}}AFX_DATA_INIT
} void GroupMaintenanceDlg::DoDataExchange(CDataExchange* pDX)
{
        CDialog::DoDataExchange(pDX);
        //{{AFX_DATA_MAP(GroupMaintenanceDlg)
        DDX_Control(pDX, IDC_COMBO2, m_Group2);
        DDX_Control(pDX, IDC_COMBO1, m_Group1);
        DDX_Control(pDX, IDC_LIST2, m_Documents2);
        DDX_Control(pDX, IDC_LIST1, m_Documents1);
        //}}AFX_DATA_MAP
}

BEGIN_MESSAGE_MAP(GroupMaintenanceDlg, CDialog)
        //{{AFX_MSG_MAP(GroupMaintenanceDlg)
        ON_BN_CLICKED(IDC_ADD_GROUP, OnAddGroup)
        ON_BN_CLICKED(IDC_DELETE_GROUP, OnDeleteGroup)
        ON_BN_CLICKED(IDC_RENAME_GROUP, OnRenameGroup)
        ON_CBN_SELCHANGE(IDC_COMBO1, OnSelchangeCombo1)
        ON_CBN_SELCHANGE(IDC_COMBO2, OnSelchangeCombo2)
        ON_LBN_SELCHANGE(IDC_LIST1, OnSelchangeList1)
        ON_LBN_SELCHANGE(IDC_LIST2, OnSelchangeList2)
        //}}AFX_MSG_MAP
END_MESSAGE_MAP()

/////////////////////////////////////////////////////////////////////////////
// GroupMaintenanceDlg message handlers
```

```cpp
void GroupMaintenanceDlg::OnAddGroup()
{
        // TODO: Add your control notification handler code here
        InputStringDlg isd("Enter a name for the Library.");
        if(isd.DoModal() != IDOK)
                return;
        //MessageBox(isd.InputString);
        DataBase DbLibrary(LibraryName);
        DbLibrary.AppendBlank();
        DbLibrary.Assign("Name",isd.InputString);
        DbLibrary.AssignLong("Id",DbLibrary.GetRecNum());
        m_Group1.AddString(isd.InputString);
        m_Group2.AddString(isd.InputString);
        m_Group1.SelectString(-1,isd.InputString);
        m_Documents1.ResetContent();
}

BOOL GroupMaintenanceDlg::OnInitDialog()
{
        char buf[100];
        CDialog::OnInitDialog();

// TODO: Add extra initialization here
        DataBase DbLibrary(LibraryName);
        m_Group1.AddString(" No Library");
        m_Group2.AddString(" No Library");
        for (DbLibrary.Top(); DbLibrary.Eof()==0; DbLibrary.Skip(1))
                {
                if (DbLibrary.Get("Name",buf) != NULL)
                        {
                        m_Group1.AddString(buf);
                        m_Group2.AddString(buf);
                        }
                //m_Group1.AddString(DbLibrary.Get("Name",buf));
                }
        // Now initialize the left side to No Library.
        m_Group1.SelectString(-1," No Library");
        m_Documents1.ResetContent();
        DataBase DbDocument(DocumentName);
        if (DbDocument.Select("GroupId",-1L))
                return TRUE;
        for (; DbDocument.Eof()==0; DbDocument.Skip(1))
                {
                m_Documents1.AddString(DbDocument.Get("Name",buf));
                } return TRUE;  // return TRUE  unless you set the focus to a control
} void GroupMaintenanceDlg::OnDeleteGroup()
{
        // TODO: Add your control notification handler code here
        char buf[50],buf1[100];
```

```
        long GroupId;
        int flag;
        m_Group1.GetWindowText(buf,50);
        sprintf(buf1,"Are you sure that you want to\ndelete <<%s>> ?",buf);
        if (MessageBox(buf1,"Warning",MB_YESNO|MB_ICONQUESTION) != IDYES)
                return;
        DataBase DbLibrary(LibraryName);
        if (DbLibrary.Select("Name",buf))
                return;
        GroupId = DbLibrary.GetLong("Id");
        DbLibrary.Delete();
        m_Group1.DeleteString(m_Group1.GetCurSel());
        m_Group2.DeleteString(m_Group2.FindString(-1,buf));
        m_Documents1.ResetContent();
        // Now move all documents in this group to No Group.  If No Group is being
        // displayed on other side, add documents to its list.
        m_Group2.GetWindowText(buf,50);
        flag = strcmp(buf," No Library");
        DataBase DbDocument(DocumentName);
        if (DbDocument.Select("GroupId",GroupId))
                return;
        for (; DbDocument.Eof()==0; DbDocument.Skip(1))
                {
                DbDocument.AssignLong("GroupId",-1L);
                if (flag == 0)
                        m_Documents2.AddString(DbDocument.Get("Name",buf));
                }
} void GroupMaintenanceDlg::OnRenameGroup()
{
        // TODO: Add your control notification handler code here
        char OldName[50];
        // Get the old name for the library.
        m_Group1.GetWindowText(OldName,50);
        // Get the new name for the library.
        InputStringDlg isd("Enter a new library name.",OldName);
        if(isd.DoModal() != IDOK)
                return;
        // Locate the library in the database.
        DataBase DbLibrary(LibraryName);
        if (DbLibrary.Select("Name",OldName))
                return;
        // Change the name in the database.
        DbLibrary.Assign("Name",isd.InputString);
        // Delete the old name from the combo boxes.
        m_Group1.DeleteString(m_Group1.GetCurSel());
        m_Group2.DeleteString(m_Group2.FindString(-1,OldName));
        // Add the new name to the combo boxes.  Select it in 1.
        m_Group1.AddString(isd.InputString);
        m_Group1.SelectString(-1,isd.InputString);
        m_Group2.AddString(isd.InputString);
}
```

```
void GroupMaintenanceDlg::OnSelchangeCombo1()
{
        // TODO: Add your control notification handler code here
        char buf[50];
        long GroupId;
        DataBase DbDocument(DocumentName);
        DataBase DbGroup(LibraryName);

// Get the group id & use it to get all documents in the group.
        m_Group1.GetWindowText(buf,50);
        m_Documents1.ResetContent();
        if (strcmp(buf," No Library") == 0)
                {
                GroupId = -1;
                }
        else
                {
                if (DbGroup.Select("Name",buf))
                        {
                        MessageBox("Error...Group not in database.");
                        return;
                        }
                GroupId = DbGroup.GetLong("Id");
                }
        if (DbDocument.Select("GroupId",GroupId))
                return;
        for (; DbDocument.Eof()==0; DbDocument.Skip(1))
                {
                m_Documents1.AddString(DbDocument.Get("Name",buf));
                }
} void GroupMaintenanceDlg::OnSelchangeCombo2()
{
        // TODO: Add your control notification handler code here
        char buf[50];
        long GroupId;
        DataBase DbDocument(DocumentName);
        DataBase DbGroup(LibraryName);

// Get the group id & use it to get all documents in the group.
        m_Group2.GetWindowText(buf,50);
        m_Documents2.ResetContent();
        if (strcmp(buf," No Library") == 0)
                {
                GroupId = -1;
                }
        else
                {
                if (DbGroup.Select("Name",buf))
                        {
```

```
                    MessageBox("Error...Group not in database.");
                    return;
                    }
            GroupId = DbGroup.GetLong("Id");
            }
    if (DbDocument.Select("GroupId",GroupId))
            return;
    for (; DbDocument.Eof()==0; DbDocument.Skip(1))
            {
            m_Documents2.AddString(DbDocument.Get("Name",buf));
            }
} void GroupMaintenanceDlg::OnSelchangeList1()
{
    // TODO: Add your control notification handler code here
    char dbuf[50],gbuf[50];
    int i;
    long GroupId;
    DataBase DbDocument(DocumentName);
    // If the right side is empty, initialize it to No Library.
    m_Group2.GetWindowText(gbuf,50);
    if (strcmp(gbuf,"") == 0)
            {
            m_Group2.SelectString(-1," No Library");
            m_Group2.GetWindowText(gbuf,50);
            m_Documents2.ResetContent();
            if (DbDocument.Select("GroupId",-1L) == 0)
                    {
                    for (; DbDocument.Eof()==0; DbDocument.Skip(1))
                            {
                            m_Documents2.AddString(DbDocument.Get("Name",dbuf));
                            }
                    }
            }
    m_Group1.GetWindowText(dbuf,50);
    // If the same group is on both sides, don't do anything.
    if (strcmp(gbuf,dbuf) == 0)
            return;
    // Get the selected document's name.
    m_Documents1.GetText(i=m_Documents1.GetCurSel(),dbuf);
    m_Documents1.DeleteString(i);
    // Now take care of the database.
    DataBase DbGroup(LibraryName);
    if (DbDocument.Select("Name",dbuf))
            {
            MessageBox("Error...Document not in database.");
            return;
            }
    m_Documents2.AddString(dbuf);
    if (strcmp(gbuf," No Library") == 0)
            {
            GroupId = -1;
```

```
                }
        else
                {
                if (DbGroup.Select("Name",gbuf))
                        GroupId = -1;
                else
                        GroupId = DbGroup.GetLong("Id");
                }
        DbDocument.AssignLong("GroupId",GroupId);
} void GroupMaintenanceDlg::OnSelchangeList2()
{
        // TODO: Add your control notification handler code here
        char dbuf[50],gbuf[50];
        int i;
        long GroupId;
        // If the same group is on both sides, don't do anything.
        m_Group1.GetWindowText(gbuf,50);
        m_Group2.GetWindowText(dbuf,50);
        if (strcmp(gbuf,dbuf) == 0)
                return;
        // Get the selected document's name.
        m_Documents2.GetText(i=m_Documents2.GetCurSel(),dbuf);
        m_Documents2.DeleteString(i);
        // Now take care of the database.
        DataBase DbDocument(DocumentName);
        DataBase DbGroup(LibraryName);
        if (DbDocument.Select("Name",dbuf))
                {
                MessageBox("Error...Document not in database.");
                return;
                }
        m_Documents1.AddString(dbuf);
        if (strcmp(gbuf," No Library") == 0)
                {
                GroupId = -1;
                }
        else
                {
                if (DbGroup.Select("Name",gbuf))
                        GroupId = -1;
                else
                        GroupId = DbGroup.GetLong("Id");
                }
        DbDocument.AssignLong("GroupId",GroupId);
}
```

```cpp
// inputstr.cpp : implementation file
// include "stdafx.h"
include "pod.h"
#include "inputstr.h"

#ifdef _DEBUG
undef THIS_FILE
static char BASED_CODE THIS_FILE[] = __FILE__;
endif /////////////////////////////////////////////////////////////////////
// InputStringDlg dialog InputStringDlg::InputStringDlg(char *aPrompt, char *aDefault, CWnd* pParent /*=NULL*/)
        : CDialog(InputStringDlg::IDD, pParent)
{
        //{{AFX_DATA_INIT(InputStringDlg)
                // NOTE: the ClassWizard will add member initialization here
        //}}AFX_DATA_INIT
        //
        if (aPrompt == NULL)
                {
                Prompt = 0;
                }
        else
                {
                //if ((Prompt = (char *)malloc(strlen(aPrompt)+2)) != NULL)
                if ((Prompt = new char[strlen(aPrompt)+2]) != 0)
                        strcpy(Prompt,aPrompt);
                }
        //
        if (aDefault == NULL)
                {
                Default = 0;
                }
        else
                {
                if ((Default = new char[strlen(aDefault)+2]) != 0)
                        strcpy(Default,aDefault);
                }
}

InputStringDlg::~InputStringDlg()
        {
        if (Prompt)
                delete Prompt;
        if (Default)
                delete Default;
        }
```

```cpp
// inputstr.cpp : implementation file
// include "stdafx.h"
include "pod.h"
#include "inputstr.h"

#ifdef _DEBUG
undef THIS_FILE
static char BASED_CODE THIS_FILE[] = __FILE__;
endif /////////////////////////////////////////////////////////////////
// InputStringDlg dialog InputStringDlg::InputStringDlg(char *aPrompt, char *aDefault, CWnd* pParent /*=NULL*/)
        : CDialog(InputStringDlg::IDD, pParent)
{
        //{{AFX_DATA_INIT(InputStringDlg)
                // NOTE: the ClassWizard will add member initialization here
        //}}AFX_DATA_INIT
        //
        if (aPrompt == NULL)
                {
                Prompt = 0;
                }
        else
                {
                //if ((Prompt = (char *)malloc(strlen(aPrompt)+2)) != NULL)
                if ((Prompt = new char[strlen(aPrompt)+2]) != 0)
                        strcpy(Prompt,aPrompt);
                }
        //
        if (aDefault == NULL)
                {
                Default = 0;
                }
        else
                {
                if ((Default = new char[strlen(aDefault)+2]) != 0)
                        strcpy(Default,aDefault);
                }
}

InputStringDlg::~InputStringDlg()
        {
        if (Prompt)
                delete Prompt;
        if (Default)
                delete Default;
        }
```

```cpp
void InputStringDlg::DoDataExchange(CDataExchange* pDX)
{
        CDialog::DoDataExchange(pDX);
        //{{AFX_DATA_MAP(InputStringDlg)
        DDX_Control(pDX, IDC_EDIT1, m_InputString);
        DDX_Control(pDX, IDC_STATIC_PROMPT, m_Prompt);
        //}}AFX_DATA_MAP
}

BEGIN_MESSAGE_MAP(InputStringDlg, CDialog)
        //{{AFX_MSG_MAP(InputStringDlg)
        ON_EN_UPDATE(IDC_EDIT1, OnUpdateEdit)
        ON_WM_CLOSE()
        //}}AFX_MSG_MAP
END_MESSAGE_MAP()

/////////////////////////////////////////////////////////////////////
// InputStringDlg message handlers BOOL InputStringDlg::OnInitDialog()
{
        CDialog::OnInitDialog();

// TODO: Add extra initialization here
        if (Prompt)
                m_Prompt.SetWindowText(Prompt);
        else
                m_Prompt.SetWindowText("");
        if (Default)
                m_InputString.SetWindowText(Default);
        else
                m_InputString.SetWindowText("");
        m_InputString.LimitText(100);
//      m_InputString.SetFocus();

return TRUE;  // return TRUE  unless you set the focus to a control
} void InputStringDlg::OnUpdateEdit()
{
        // TODO: Add your control notification handler code here
        m_InputString.GetWindowText(InputString,99);
} void InputStringDlg::OnClose()
{
        // TODO: Add your message handler code here and/or call default
        // Now using new & delete in constructor & destructor.
        //if (Prompt != NULL)
        //      free(Prompt);
```

```
        CDialog::OnClose();
}
```

```cpp
// kitmaint.h : header file
//

/////////////////////////////////////////////////////////////////
// KitMaintenanceDlg dialog class KitMaintenanceDlg : public CDialog
{
        long KitId;
        int FillScreen();
        void Lock();
        void UnLock();
// Construction
public:
        KitMaintenanceDlg(CWnd* pParent = NULL);     // standard constructor // Dialog Data
        //{{AFX_DATA(KitMaintenanceDlg)
        enum { IDD = IDD_DIALOG11 };
        CButton       m_ButtonDelete2;
        CButton       m_ButtonAdd2;
        CListBox      m_DocumentList;
        CEdit   m_KitName;
        CEdit   m_Description;
        CComboBox     m_Group;
        //}}AFX_DATA // Implementation
protected:
        virtual void DoDataExchange(CDataExchange* pDX);    // DDX/DDV support // Generated message map functions
        //{{AFX_MSG(KitMaintenanceDlg)
        virtual BOOL OnInitDialog();
        afx_msg void OnAdd();
        afx_msg void OnDelete();
        afx_msg void OnModify();
        afx_msg void OnKillfocusEditDescription();
        afx_msg void OnKillfocusEditName();
        afx_msg void OnSelchangeCombo1();
        afx_msg void OnAdd2();
        afx_msg void OnDelete2();
        //}}AFX_MSG
        DECLARE_MESSAGE_MAP()
};
```

```cpp
// kitmaint.cpp : implementation file
// include "stdafx.h"
include "pod.h"
#include "kitmaint.h"
#include "selectdo.h"
#include "db-init.h"

#include "db.h"

ifdef _DEBUG
undef THIS_FILE
static char BASED_CODE THIS_FILE[] = __FILE__;
endif /////////////////////////////////////////////////////////////////
// KitMaintenanceDlg dialog KitMaintenanceDlg::KitMaintenanceDlg(CWnd* pParent /*=NULL*/)
        : CDialog(KitMaintenanceDlg::IDD, pParent)
{
        //{{AFX_DATA_INIT(KitMaintenanceDlg)
                // NOTE: the ClassWizard will add member initialization here
        //}}AFX_DATA_INIT
} void KitMaintenanceDlg::DoDataExchange(CDataExchange* pDX)
{
        CDialog::DoDataExchange(pDX);
        //{{AFX_DATA_MAP(KitMaintenanceDlg)
        DDX_Control(pDX, IDC_DELETE2, m_ButtonDelete2);
        DDX_Control(pDX, IDC_ADD2, m_ButtonAdd2);
        DDX_Control(pDX, IDC_LIST1, m_DocumentList);
        DDX_Control(pDX, IDC_EDIT_NAME, m_KitName);
        DDX_Control(pDX, IDC_EDIT_DESCRIPTION, m_Description);
        DDX_Control(pDX, IDC_COMBO1, m_Group);
        //}}AFX_DATA_MAP
}

BEGIN_MESSAGE_MAP(KitMaintenanceDlg, CDialog)
        //{{AFX_MSG_MAP(KitMaintenanceDlg)
        ON_BN_CLICKED(IDC_ADD, OnAdd)
        ON_BN_CLICKED(IDC_DELETE, OnDelete)
        ON_BN_CLICKED(IDC_MODIFY, OnModify)
        ON_EN_KILLFOCUS(IDC_EDIT_DESCRIPTION, OnKillfocusEditDescription)
        ON_EN_KILLFOCUS(IDC_EDIT_NAME, OnKillfocusEditName)
        ON_CBN_SELCHANGE(IDC_COMBO1, OnSelchangeCombo1)
        ON_BN_CLICKED(IDC_ADD2, OnAdd2)
        ON_BN_CLICKED(IDC_DELETE2, OnDelete2)
        //}}AFX_MSG_MAP
END_MESSAGE_MAP()
```

```
///////////////////////////////////////////////////
// KitMaintenanceDlg message handlers BOOL KitMaintenanceDlg::OnInitDialog()
{
        char buf[100];
        CDialog::OnInitDialog();

// TODO: Add extra initialization here
        Lock();
        KitId = -1L;
        // Fill the group pick list with the libraries.
        DataBase DbLibrary(LibraryName);
        m_Group.AddString(" No Library");
        for (DbLibrary.Top(); DbLibrary.Eof()==0; DbLibrary.Skip(1))
                {
                if (DbLibrary.Get("Name",buf) != NULL)
                        {
                        m_Group.AddString(buf);
                        }
                } return TRUE;  // return TRUE  unless you set the focus to a control
} void KitMaintenanceDlg::OnAdd()
{
        // TODO: Add your control notification handler code here
        DataBase DbDocument(DocumentName);
        DbDocument.AppendBlank();
        DbDocument.Assign("File","*");
        DbDocument.AssignLong("Avail",-1);
        DbDocument.AssignLong("Id",KitId=DbDocument.GetRecNum());
        // Set the group to none.
        DbDocument.AssignLong("GroupId",-1);
        m_Group.SelectString(-1," No Library");
        // Set the name to none so Modify button can see empty names.
        DbDocument.Assign("Name","No Name");
        m_KitName.SetWindowText("No Name");
        // Clear Description.
        DbDocument.Assign("Desc","No Description");
        m_Description.SetWindowText("No Description");
        // Clear Document List
        m_DocumentList.ResetContent();
        UnLock();
} int KitMaintenanceDlg::FillScreen()
        {
        char buf[1024];
        // Get group, name, & description.
```

```
DataBase DbDocument(DocumentName);
DataBase DbGroup(LibraryName);
if (DbDocument.Select("Id",KitId))
        {
        MessageBox("Error...Selected kit doesn't exist.");
        return 1;
        }
m_KitName.SetWindowText(DbDocument.Get("Name",buf));
if (DbGroup.Select("Id",DbDocument.GetLong("GroupId")))
        m_Group.SelectString(-1," No Library");
else
        m_Group.SelectString(-1,DbGroup.Get("Name",buf));
m_Description.SetWindowText(DbDocument.Get("Desc",buf));
// Get the Document List.
m_DocumentList.ResetContent();
DataBase DbKitLink(KitLinkName);
if (DbKitLink.Select("KitId",KitId))
        return 0;
for (; DbKitLink.Eof()==0; DbKitLink.Skip(1))
        {
        if (DbDocument.Select("Id",DbKitLink.GetLong("DocId")) == 0)
                {
                m_DocumentList.AddString(DbDocument.Get("Name",buf));
                }
        }
return 0;
} void KitMaintenanceDlg::OnDelete()
{
        // TODO: Add your control notification handler code here
        char buf[1024],buf1[50];
        SelectDocumentDlg s(1);
        // Need to get the kit id back here.
        if (s.DoModal() != IDOK)
                return;
        KitId = s.DocId;
        if (FillScreen())
                return;
        // Now confirm deletion, then delete.
        DataBase DbDocument(DocumentName);
        DbDocument.Select("Id",KitId);
        sprintf(buf,"Are you sure that you want to\ndelete \"%s\"
?",DbDocument.Get("Name",buf1));
        if (MessageBox(buf,"Warning",MB_YESNO|MB_ICONQUESTION) != IDYES)
                {
                UnLock();
                return;
                }
        Lock();
        // Delete the document from the database.
        DbDocument.Delete();
        KitId = -1L;
```

```
        // Clear the screen fields.
        m_KitName.SetWindowText("");
        m_Group.SelectString(-1," No Library");
        m_Description.SetWindowText("");
} void KitMaintenanceDlg::OnModify()
{
        // TODO: Add your control notification handler code here
        SelectDocumentDlg s(1);
        // Need to get the kit id back here.
        if (s.DoModal() != IDOK)
                return;
        KitId = s.DocId;
        FillScreen();
        UnLock();
} void KitMaintenanceDlg::OnKillfocusEditName()
{
        // TODO: Add your control notification handler code here
        char buf[50];
        DataBase DbDocument(DocumentName);

// Get the Kit record.
        if (DbDocument.Select("Id",KitId))
                {
                MessageBox("Error...Couldn't find current kit in database.");
                return;
                }
        m_KitName.GetWindowText(buf,50);
        DbDocument.Assign("Name",buf);
} void KitMaintenanceDlg::OnKillfocusEditDescription()
{
        // TODO: Add your control notification handler code here
        char buf[1024];
        DataBase DbDocument(DocumentName);

// Get the Kit record.
        if (DbDocument.Select("Id",KitId))
                {
                MessageBox("Error...Couldn't find current kit in database.");
                return;
                }
        m_Description.GetWindowText(buf,1024);
        DbDocument.Assign("Desc",buf);
}
```

```
void KitMaintenanceDlg::OnSelchangeCombo1()
{
        // TODO: Add your control notification handler code here
        char Group[50];
        DataBase DbDocument(DocumentName);
        DataBase DbGroup(LibraryName);

// Get the Kit record.
        if (DbDocument.Select("Id",KitId))
                {
                MessageBox("Error...Couldn't find current kit in database.");
                return;
                }
        // Check for no group and deal with it.
        m_Group.GetWindowText(Group,50);
        if (strcmp(Group," No Library") == 0)
                {
                DbDocument.AssignLong("GroupId",-1L);
                return;
                }
        // Get the Group record.
        if (DbGroup.Select("Name",Group))
                {
                MessageBox("Error...Couldn't find group in database.");
                return;
                }
        // Assign the new group.
        DbDocument.AssignLong("GroupId",DbGroup.GetLong("Id"));
}

// OnAdd2() adds documents to the kit's document list.
void KitMaintenanceDlg::OnAdd2()
{
        // TODO: Add your control notification handler code here
        char buf[50];
        SelectDocumentDlg s;
        if (s.DoModal() != IDOK)
                return;
        DataBase DbDocument(DocumentName);
        if (DbDocument.Select("Id",s.DocId))
                {
                MessageBox("Error...selected document not in database.");
                return;
                }
        DataBase DbKitLink(KitLinkName);
        DbKitLink.AppendBlank();
        DbKitLink.AssignLong("KitId",KitId);
        DbKitLink.AssignLong("DocId",s.DocId);
        m_DocumentList.AddString(DbDocument.Get("Name",buf));
}

// OnDelete2() deletes documents from the kit's document list.
```

```cpp
void KitMaintenanceDlg::OnDelete2()
{
        // TODO: Add your control notification handler code here
        char buf[50],buf1[100];
        int i;
        // Get the selected item from the Document List.
        if ((i=m_DocumentList.GetCurSel()) == LB_ERR)
                {
                MessageBox("You must select a document in the document list to be
deleted.","Information",MB_OK|MB_ICONINFORMATION);
                return;
                }
        m_DocumentList.GetText(i,buf);
        // Verify that the user wants to delete it.
        sprintf(buf1,"Are you sure that you\nwant to delete \"%s\" ?",buf);
        if (MessageBox(buf1,"Warning",MB_YESNO|MB_ICONQUESTION) != IDYES)
                return;
        DataBase DbKitLink(KitLinkName);
        DataBase DbDocument(DocumentName);
        if (DbKitLink.Select("KitId",KitId))
                {
                MessageBox("Error...Can't find any database entries for this kit.");
                return;
                }
        for (; DbKitLink.Eof()==0; DbKitLink.Skip(1))
                {
                if (DbDocument.Select("Id",DbKitLink.GetLong("DocId")) == 0)
                        {
                        if (strcmp(DbDocument.Get("Name",buf1),buf) == 0)
                                {
                                DbKitLink.Delete();
                                m_DocumentList.DeleteString(i);
                                break;
                                }
                        }
                }
} void KitMaintenanceDlg::Lock()
        {
        m_KitName.EnableWindow(0);
        m_Group.EnableWindow(0);
        m_Description.EnableWindow(0);
        m_DocumentList.EnableWindow(0);
        m_ButtonAdd2.EnableWindow(0);
        m_ButtonDelete2.EnableWindow(0);
        } void KitMaintenanceDlg::UnLock()
        {
        m_KitName.EnableWindow();
        m_Group.EnableWindow();
```

```
m_Description.EnableWindow();
m_DocumentList.EnableWindow();
m_ButtonAdd2.EnableWindow();
m_ButtonDelete2.EnableWindow();
}
```

```cpp
// kitviewe.h : header file
//

/////////////////////////////////////////////////////////////////
// KitViewerDlg dialog class KitViewerDlg : public CDialog
{
        long Id;
// Construction
public:
        KitViewerDlg(long aId, CWnd* pParent = NULL);   // standard constructor // Dialog Data
        //{{AFX_DATA(KitViewerDlg)
        enum { IDD = IDD_DIALOG12 };
        CStatic  m_KitName;
        CListBox    m_Document;
        //}}AFX_DATA // Implementation
protected:
        virtual void DoDataExchange(CDataExchange* pDX);    // DDX/DDV support // Generated message map functions
        //{{AFX_MSG(KitViewerDlg)
        virtual BOOL OnInitDialog();
        afx_msg void OnSelchangeList1();
        //}}AFX_MSG
        DECLARE_MESSAGE_MAP()
};
```

```cpp
// kitmaint.cpp : implementation file
// include "stdafx.h"
include "pod.h"
#include "kitmaint.h"
#include "selectdo.h"
#include "db-init.h"

#include "db.h"

ifdef _DEBUG
undef THIS_FILE
static char BASED_CODE THIS_FILE[] = __FILE__;
endif /////////////////////////////////////////////////////////////////////////////
// KitMaintenanceDlg dialog KitMaintenanceDlg::KitMaintenanceDlg(CWnd* pParent /*=NULL*/)
        : CDialog(KitMaintenanceDlg::IDD, pParent)
{
        //{{AFX_DATA_INIT(KitMaintenanceDlg)
                // NOTE: the ClassWizard will add member initialization here
        //}}AFX_DATA_INIT
} void KitMaintenanceDlg::DoDataExchange(CDataExchange* pDX)
{
        CDialog::DoDataExchange(pDX);
        //{{AFX_DATA_MAP(KitMaintenanceDlg)
        DDX_Control(pDX, IDC_DELETE2, m_ButtonDelete2);
        DDX_Control(pDX, IDC_ADD2, m_ButtonAdd2);
        DDX_Control(pDX, IDC_LIST1, m_DocumentList);
        DDX_Control(pDX, IDC_EDIT_NAME, m_KitName);
        DDX_Control(pDX, IDC_EDIT_DESCRIPTION, m_Description);
        DDX_Control(pDX, IDC_COMBO1, m_Group);
        //}}AFX_DATA_MAP
}

BEGIN_MESSAGE_MAP(KitMaintenanceDlg, CDialog)
        //{{AFX_MSG_MAP(KitMaintenanceDlg)
        ON_BN_CLICKED(IDC_ADD, OnAdd)
        ON_BN_CLICKED(IDC_DELETE, OnDelete)
        ON_BN_CLICKED(IDC_MODIFY, OnModify)
        ON_EN_KILLFOCUS(IDC_EDIT_DESCRIPTION, OnKillfocusEditDescription)
        ON_EN_KILLFOCUS(IDC_EDIT_NAME, OnKillfocusEditName)
        ON_CBN_SELCHANGE(IDC_COMBO1, OnSelchangeCombo1)
        ON_BN_CLICKED(IDC_ADD2, OnAdd2)
        ON_BN_CLICKED(IDC_DELETE2, OnDelete2)
        //}}AFX_MSG_MAP
END_MESSAGE_MAP()
```

```
/////////////////////////////////////////////////////////////
// KitMaintenanceDlg message handlers BOOL KitMaintenanceDlg::OnInitDialog()
{
        char buf[100];
        CDialog::OnInitDialog();

// TODO: Add extra initialization here
        Lock();
        KitId = -1L;
        // Fill the group pick list with the libraries.
        DataBase DbLibrary(LibraryName);
        m_Group.AddString(" No Library");
        for (DbLibrary.Top(); DbLibrary.Eof()==0; DbLibrary.Skip(1))
                {
                if (DbLibrary.Get("Name",buf) != NULL)
                        {
                        m_Group.AddString(buf);
                        }
                } return TRUE;  // return TRUE  unless you set the focus to a control
} void KitMaintenanceDlg::OnAdd()
{
        // TODO: Add your control notification handler code here
        DataBase DbDocument(DocumentName);
        DbDocument.AppendBlank();
        DbDocument.Assign("File","*");
        DbDocument.AssignLong("Avail",-1);
        DbDocument.AssignLong("Id",KitId=DbDocument.GetRecNum());
        // Set the group to none.
        DbDocument.AssignLong("GroupId",-1);
        m_Group.SelectString(-1," No Library");
        // Set the name to none so Modify button can see empty names.
        DbDocument.Assign("Name","No Name");
        m_KitName.SetWindowText("No Name");
        // Clear Description.
        DbDocument.Assign("Desc","No Description");
        m_Description.SetWindowText("No Description");
        // Clear Document List
        m_DocumentList.ResetContent();
        UnLock();
} int KitMaintenanceDlg::FillScreen()
        {
        char buf[1024];
        // Get group, name, & description.
```

```
        DataBase DbDocument(DocumentName);
        DataBase DbGroup(LibraryName);
        if (DbDocument.Select("Id",KitId))
                {
                MessageBox("Error...Selected kit doesn't exist.");
                return 1;
                }
        m_KitName.SetWindowText(DbDocument.Get("Name",buf));
        if (DbGroup.Select("Id",DbDocument.GetLong("GroupId")))
                m_Group.SelectString(-1," No Library");
        else
                m_Group.SelectString(-1,DbGroup.Get("Name",buf));
        m_Description.SetWindowText(DbDocument.Get("Desc",buf));
        // Get the Document List.
        m_DocumentList.ResetContent();
        DataBase DbKitLink(KitLinkName);
        if (DbKitLink.Select("KitId",KitId))
                return 0;
        for (; DbKitLink.Eof()==0; DbKitLink.Skip(1))
                {
                if (DbDocument.Select("Id",DbKitLink.GetLong("DocId")) == 0)
                        {
                        m_DocumentList.AddString(DbDocument.Get("Name",buf));
                        }
                }
        return 0;
        } void KitMaintenanceDlg::OnDelete()
{
        // TODO: Add your control notification handler code here
        char buf[1024],buf1[50];
        SelectDocumentDlg s(1);
        // Need to get the kit id back here.
        if (s.DoModal() != IDOK)
                return;
        KitId = s.DocId;
        if (FillScreen())
                return;
        // Now confirm deletion, then delete.
        DataBase DbDocument(DocumentName);
        DbDocument.Select("Id",KitId);
        sprintf(buf,"Are you sure that you want to\ndelete \"%s\"
?",DbDocument.Get("Name",buf1));
        if (MessageBox(buf,"Warning",MB_YESNO|MB_ICONQUESTION) != IDYES)
                {
                UnLock();
                return;
                }
        Lock();
        // Delete the document from the database.
        DbDocument.Delete();
        KitId = -1L;
```

```
            // Clear the screen fields.
            m_KitName.SetWindowText("");
            m_Group.SelectString(-1," No Library");
            m_Description.SetWindowText("");
} void KitMaintenanceDlg::OnModify()
{
            // TODO: Add your control notification handler code here
            SelectDocumentDlg s(1);
            // Need to get the kit id back here.
            if (s.DoModal() != IDOK)
                        return;
            KitId = s.DocId;
            FillScreen();
            UnLock();
} void KitMaintenanceDlg::OnKillfocusEditName()
{
            // TODO: Add your control notification handler code here
            char buf[50];
            DataBase DbDocument(DocumentName);

// Get the Kit record.
            if (DbDocument.Select("Id",KitId))
                        {
                        MessageBox("Error...Couldn't find current kit in database.");
                        return;
                        }
            m_KitName.GetWindowText(buf,50);
            DbDocument.Assign("Name",buf);
} void KitMaintenanceDlg::OnKillfocusEditDescription()
{
            // TODO: Add your control notification handler code here
            char buf[1024];
            DataBase DbDocument(DocumentName);

// Get the Kit record.
            if (DbDocument.Select("Id",KitId))
                        {
                        MessageBox("Error...Couldn't find current kit in database.");
                        return;
                        }
            m_Description.GetWindowText(buf,1024);
            DbDocument.Assign("Desc",buf);
}
```

```
void KitMaintenanceDlg::OnSelchangeCombo1()
{
        // TODO: Add your control notification handler code here
        char Group[50];
        DataBase DbDocument(DocumentName);
        DataBase DbGroup(LibraryName);

// Get the Kit record.
        if (DbDocument.Select("Id",KitId))
                {
                MessageBox("Error...Couldn't find current kit in database.");
                return;
                }
        // Check for no group and deal with it.
        m_Group.GetWindowText(Group,50);
        if (strcmp(Group," No Library") == 0)
                {
                DbDocument.AssignLong("GroupId",-1L);
                return;
                }
        // Get the Group record.
        if (DbGroup.Select("Name",Group))
                {
                MessageBox("Error...Couldn't find group in database.");
                return;
                }
        // Assign the new group.
        DbDocument.AssignLong("GroupId",DbGroup.GetLong("Id"));
}

// OnAdd2() adds documents to the kit's document list.
void KitMaintenanceDlg::OnAdd2()
{
        // TODO: Add your control notification handler code here
        char buf[50];
        SelectDocumentDlg s;
        if (s.DoModal() != IDOK)
                return;
        DataBase DbDocument(DocumentName);
        if (DbDocument.Select("Id",s.DocId))
                {
                MessageBox("Error...selected document not in database.");
                return;
                }
        DataBase DbKitLink(KitLinkName);
        DbKitLink.AppendBlank();
        DbKitLink.AssignLong("KitId",KitId);
        DbKitLink.AssignLong("DocId",s.DocId);
        m_DocumentList.AddString(DbDocument.Get("Name",buf));
}

// OnDelete2() deletes documents from the kit's document list.
```

```
void KitMaintenanceDlg::OnDelete2()
{
        // TODO: Add your control notification handler code here
        char buf[50],buf1[100];
        int i;
        // Get the selected item from the Document List.
        if ((i=m_DocumentList.GetCurSel()) == LB_ERR)
                {
                MessageBox("You must select a document in the document list to be
deleted.","Information",MB_OK|MB_ICONINFORMATION);
                return;
                }
        m_DocumentList.GetText(i,buf);
        // Verify that the user wants to delete it.
        sprintf(buf1,"Are you sure that you\nwant to delete \"%s\" ?",buf);
        if (MessageBox(buf1,"Warning",MB_YESNO|MB_ICONQUESTION) != IDYES)
                return;
        DataBase DbKitLink(KitLinkName);
        DataBase DbDocument(DocumentName);
        if (DbKitLink.Select("KitId",KitId))
                {
                MessageBox("Error...Can't find any database entries for this kit.");
                return;
                }
        for (; DbKitLink.Eof()==0; DbKitLink.Skip(1))
                {
                if (DbDocument.Select("Id",DbKitLink.GetLong("DocId")) == 0)
                        {
                        if (strcmp(DbDocument.Get("Name",buf1),buf) == 0)
                                {
                                DbKitLink.Delete();
                                m_DocumentList.DeleteString(i);
                                break;
                                }
                        }
                }
} void KitMaintenanceDlg::Lock()
        {
        m_KitName.EnableWindow(0);
        m_Group.EnableWindow(0);
        m_Description.EnableWindow(0);
        m_DocumentList.EnableWindow(0);
        m_ButtonAdd2.EnableWindow(0);
        m_ButtonDelete2.EnableWindow(0);
        } void KitMaintenanceDlg::UnLock()
        {
        m_KitName.EnableWindow();
        m_Group.EnableWindow();
```

```
m_Description.EnableWindow();
m_DocumentList.EnableWindow();
m_ButtonAdd2.EnableWindow();
m_ButtonDelete2.EnableWindow();
}
```

```cpp
// kitviewe.cpp : implementation file
// include "stdafx.h"
include "pod.h"
#include "kitviewe.h"
#include "viewdlg.h"
#include "db-init.h"

#include "db.h"

ifdef _DEBUG
undef THIS_FILE
static char BASED_CODE THIS_FILE[] = __FILE__;
endif /////////////////////////////////////////////////////////////////////////////
// KitViewerDlg dialog KitViewerDlg::KitViewerDlg(long aId, CWnd* pParent /*=NULL*/)
        : CDialog(KitViewerDlg::IDD, pParent), Id(aId)
{
        //{{AFX_DATA_INIT(KitViewerDlg)
                // NOTE: the ClassWizard will add member initialization here
        //}}AFX_DATA_INIT
} void KitViewerDlg::DoDataExchange(CDataExchange* pDX)
{
        CDialog::DoDataExchange(pDX);
        //{{AFX_DATA_MAP(KitViewerDlg)
        DDX_Control(pDX, IDC_STATIC_NAME, m_KitName);
        DDX_Control(pDX, IDC_LIST1, m_Document);
        //}}AFX_DATA_MAP
}

BEGIN_MESSAGE_MAP(KitViewerDlg, CDialog)
        //{{AFX_MSG_MAP(KitViewerDlg)
        ON_LBN_SELCHANGE(IDC_LIST1, OnSelchangeList1)
        //}}AFX_MSG_MAP
END_MESSAGE_MAP()

/////////////////////////////////////////////////////////////////////////////
// KitViewerDlg message handlers BOOL KitViewerDlg::OnInitDialog()
{
        CDialog::OnInitDialog();

// TODO: Add extra initialization here
        char buf[50];
        DataBase DbDocument(DocumentName);
```

```
        DataBase DbKitLink(KitLinkName);
        if (DbDocument.Select("Id",Id))
                {
                MessageBox("No such kit.");
                return TRUE;
                }
        m_KitName.SetWindowText(DbDocument.Get("Name",buf));
        m_Document.ResetContent();
        if (DbKitLink.Select("KitId",Id))
                return TRUE;
        for (; DbKitLink.Eof()==0; DbKitLink.Skip(1))
                {
                if (DbDocument.Select("Id",DbKitLink.GetLong("DocId")) == 0)
                        {
                        m_Document.AddString(DbDocument.Get("Name",buf));
                        }
                } return TRUE;  // return TRUE  unless you set the focus to a control
} void KitViewerDlg::OnSelchangeList1()
{
        // TODO: Add your control notification handler code here
        char buf[250],name1[50],name2[50];
        m_Document.GetText(m_Document.GetCurSel(),name1);
        //MessageBox(name1);
        // Get the Document Directory.
        GetPrivateProfileString("System Defaults","DocumentDirectory","c:\\",buf,200,"pod.ini");
        if ( *(buf + strlen(buf) - 1) != '\\')
                strcat(buf,"\\");
        // Get the file name.
        DataBase DbKitLink(KitLinkName);
        DataBase DbDocument(DocumentName);
        if (DbKitLink.Select("KitId",Id))
                {
                MessageBox("Error...Couldn't find kit in kit database.");
                return;
                }
        for (; DbKitLink.Eof()==0; DbKitLink.Skip(1))
                {
                if (DbDocument.Select("Id",DbKitLink.GetLong("DocId")) == 0)
                        {
                        if (strcmp(DbDocument.Get("Name",name2),name1) == 0)
                                {
                                DbDocument.Get("File",buf+strlen(buf));
                                ViewDlg v(buf);
                                v.DoModal();
                                return;
                                }
                        }
                }
        MessageBox("Error...Couldn't find document in document database.");
```

}

```
//ini        char *s;
             m_GroupList.GetText(m_GroupList.GetCurSel(),Group);
             m_FileList.ResetContent();
             /*ini
             GetPrivateProfileString(Group,NULL,"",buf,1024,"pod.ini");
             for (s=buf; *s!='\0'; s+=strlen(s)+1)
                     m_FileList.AddString(s);
             */
             DataBase DbGroup(LibraryName);
             DataBase DbDocument(DocumentName);
             if (DbGroup.Select("Name",Group))
                     return;
             if (DbDocument.Select("GroupId",DbGroup.GetLong("Id")))
                     return;
             for (; DbDocument.Eof()==0; DbDocument.Skip(1))
                     {
                     m_FileList.AddString(DbDocument.Get("Name",buf));
                     }
} void LibraryDlg::OnSelchangeList2()
{
             // TODO: Add your control notification handler code here
             char buf[50];
             /*ini
             char Group[100],File[100];
             m_GroupList.GetText(m_GroupList.GetCurSel(),Group);
             m_FileList.GetText(m_FileList.GetCurSel(),File);
             ActionDlg a(Group,File);
             */
             m_FileList.GetText(m_FileList.GetCurSel(),buf);
             DataBase DbDocument(DocumentName);
             if (DbDocument.Select("Name",buf))
                     return;
//           ActionDlg a(DbDocument.Get("File",buf));
             ActionDlg a(DbDocument.GetLong("Id"));
             a.DoModal();
}

BOOL LibraryDlg::OnInitDialog()
{
             char buf[1024];
//ini        char *s;
             CDialog::OnInitDialog();

// TODO: Add extra initialization here
             LeftLogo.AutoLoad(IDC_LEFTLOGO,this);
             RightLogo.AutoLoad(IDC_RIGHTLOGO,this);
             m_GroupList.ResetContent();
             m_FileList.ResetContent();
             /*ini
             GetPrivateProfileString("Groups",NULL,"",buf,1024,"pod.ini");
```

```
        for (s=buf; *s!='\0'; s+=strlen(s)+1)
                m_GroupList.AddString(s);
*/
DataBase DbGroup(LibraryName);
for (DbGroup.Top(); DbGroup.Eof()==0; DbGroup.Skip(1))
        {
        m_GroupList.AddString(DbGroup.Get("Name",buf));
        } return TRUE;  // return TRUE  unless you set the focus to a control
}
```

```cpp
// mainfrm.h : interface of the CMainFrame class
//
///////////////////////////////////////////////////////////////// class CMainFrame : public CFrameWnd
{
protected: // create from serialization only
        CMainFrame();
        DECLARE_DYNCREATE(CMainFrame)

// Attributes
public:

// Operations
public:

// Implementation
public:
        virtual ~CMainFrame();
#ifdef _DEBUG
        virtual void AssertValid() const;
        virtual void Dump(CDumpContext& dc) const;
endif // Generated message map functions
protected:
        //{{AFX_MSG(CMainFrame)
        //}}AFX_MSG
        DECLARE_MESSAGE_MAP()
};

/////////////////////////////////////////////////////////////////
```

```cpp
// mainfrm.cpp : implementation of the CMainFrame class
//
include "stdafx.h"

include "pod.h"
include "mainfrm.h"

#ifdef _DEBUG
undef THIS_FILE
static char BASED_CODE THIS_FILE[] = __FILE__;
endif /////////////////////////////////////////////////////////////////
// CMainFrame IMPLEMENT_DYNCREATE(CMainFrame, CFrameWnd)

BEGIN_MESSAGE_MAP(CMainFrame, CFrameWnd)
        //{{AFX_MSG_MAP(CMainFrame)
        //}}AFX_MSG_MAP
END_MESSAGE_MAP()

/////////////////////////////////////////////////////////////////
// CMainFrame construction/destruction CMainFrame::CMainFrame()
{
        // TODO: add member initialization code here
}

CMainFrame::~CMainFrame()
{
}

/////////////////////////////////////////////////////////////////
// CMainFrame diagnostics ifdef _DEBUG
void CMainFrame::AssertValid() const
{
        CFrameWnd::AssertValid();
} void CMainFrame::Dump(CDumpContext& dc) const
{
        CFrameWnd::Dump(dc);
} endif //_DEBUG

/////////////////////////////////////////////////////////////////
// CMainFrame message handlers
```

```cpp
// password.h : header file
//

/////////////////////////////////////////////////////////////////
// PasswordDlg dialog class PasswordDlg : public CDialog
{
        char *PasswordBuf;
        int BufLength;
// Construction
public:
        PasswordDlg(char *aPasswordBuf, int aBufLength, CWnd* pParent = NULL);    // standard constructor // Dialog Data
        //{{AFX_DATA(PasswordDlg)
        enum { IDD = IDD_DIALOG9 };
        CEdit   m_Password;
        //}}AFX_DATA // Implementation
protected:
        virtual void DoDataExchange(CDataExchange* pDX);    // DDX/DDV support // Generated message map functions
        //{{AFX_MSG(PasswordDlg)
        virtual void OnOK();
        //}}AFX_MSG
        DECLARE_MESSAGE_MAP()
};
```

```cpp
// password.cpp : implementation file
// include "stdafx.h"
include "pod.h"
#include "password.h"

#ifdef _DEBUG
undef THIS_FILE
static char BASED_CODE THIS_FILE[] = __FILE__;
endif /////////////////////////////////////////////////////////////////////
// PasswordDlg dialog PasswordDlg::PasswordDlg(char *aPasswordBuf, int aBufLength, CWnd* pParent /*=NULL*/)
        : CDialog(PasswordDlg::IDD, pParent)
{
        BufLength = aBufLength;
        PasswordBuf = aPasswordBuf;
        //{{AFX_DATA_INIT(PasswordDlg)
                // NOTE: the ClassWizard will add member initialization here
        //}}AFX_DATA_INIT
} void PasswordDlg::DoDataExchange(CDataExchange* pDX)
{
        CDialog::DoDataExchange(pDX);
        //{{AFX_DATA_MAP(PasswordDlg)
        DDX_Control(pDX, IDC_EDIT1, m_Password);
        //}}AFX_DATA_MAP
}

BEGIN_MESSAGE_MAP(PasswordDlg, CDialog)
        //{{AFX_MSG_MAP(PasswordDlg)
        //}}AFX_MSG_MAP
END_MESSAGE_MAP()

/////////////////////////////////////////////////////////////////////
// PasswordDlg message handlers void PasswordDlg::OnOK()
{
        // TODO: Add extra validation here
        m_Password.GetWindowText(PasswordBuf,BufLength);

CDialog::OnOK();
}
```

```cpp
// mainfrm.cpp : implementation of the CMainFrame class
//
include "stdafx.h"

include "pod.h"
include "mainfrm.h"

#ifdef _DEBUG
undef THIS_FILE
static char BASED_CODE THIS_FILE[] = __FILE__;
endif /////////////////////////////////////////////////////////////////////////////
// CMainFrame IMPLEMENT_DYNCREATE(CMainFrame, CFrameWnd)

BEGIN_MESSAGE_MAP(CMainFrame, CFrameWnd)
        //{{AFX_MSG_MAP(CMainFrame)
        //}}AFX_MSG_MAP
END_MESSAGE_MAP()

/////////////////////////////////////////////////////////////////////////////
// CMainFrame construction/destruction CMainFrame::CMainFrame()
{
        // TODO: add member initialization code here
}

CMainFrame::~CMainFrame()
{
}

/////////////////////////////////////////////////////////////////////////////
// CMainFrame diagnostics ifdef _DEBUG
void CMainFrame::AssertValid() const
{
        CFrameWnd::AssertValid();
} void CMainFrame::Dump(CDumpContext& dc) const
{
        CFrameWnd::Dump(dc);
} endif //_DEBUG

/////////////////////////////////////////////////////////////////////////////
// CMainFrame message handlers
```

```c
#include <stdio.h>
include <stdlib.h> include "d4all.hpp"

//////////////////////////////////////////////////////////
// This is NOT a Windows program.  MUST EDIT D4ALL.H AND COMMENT OUT THE
// DEFINES FOR S4DLL AND S4WINDOWS.  Memory model is Large.  Need c5base.lib.
// Stack length = 100000.
//////////////////////////////////////////////////////////

// Library Table
static FIELD4INFO LibraryTable[] = {
        {"Name",'C',31,0},
        {"Id",'C',11,0},
        {0,0,0,0}};
static TAG4INFO LibraryTag[] = {
        {"NameTag","Name","",0,0},
        {"IdTag","Id","",e4unique,0},
        {0,0,0,0,0}};

/*
// Document (& Kit) Table
static FIELD4INFO DocumentTable[] = {
        {"Name",'C',31,0},
        {"Id",'C',11,0},
        {"GroupId",'C',11,0},
        {"File",'C',200,0},
        {"Desc",'C',1024,0},
        {"Avail",'N',11,0},
        {0,0,0,0}};
static TAG4INFO DocumentTag[] = {
        {"NameTag","Name","",0,0},
        {"IdTag","Id","",e4unique,0},
        {"GroupIdTag","GroupId","",e4unique,0},
        {"FileTag","File","",e4unique,0},
        {0,0,0,0,0}};

// Kit Link Table
static FIELD4INFO KitRefTable[] = {
        {"KitId",'N',11,0},
        {"DocId",'N',11,0},
        {0,0,0,0}};
static TAG4INFO KitLinkTag[] = {
        {"KitIdTag","KitId","",0,0},
        {"DocIdTag","DocId","",0,0},
        {0,0,0,0,0}};

// Usage Table
static FIELD4INFO UsageTable[] = {
        {"DocId",'N',11,0},
        {"Date",'D',8,0},
```

```
        {"Quantity",'N',11,0},
        {0,0,0,0}};
static TAG4INFO UsageTag[] = {
        {"DocIdTag","DocId","",0,0},
        {"DateTag","Date","",0,0},
        {"QuantityTag","Quantity","",0,0},
        {0,0,0,0,0}};

// Configuration Table
static FIELD4INFO ConfigTable[] = {
        {"Item",'C',30,0},
        {"Value",'C',30,0},
        {0,0,0,0}};
static TAG4INFO ConfigTag[] = {
        {"ItemTag","Item","",0,0},
        {0,0,0,0,0}};
*/ void main(int argc, char *argv[])
        {
        int i;
        for (i=0;i<argc;i++)
                printf("%d %s\n",i,argv[i]);
        Code4 cb;
//      Data4 Library,Document,KitRef,Usage,Config;

//      if (Library.create(cb,"Library",LibraryTable,LibraryTag))
//              printf("Error creating Library data base.\n");
//      cb.exitTest();
//      Library.close();
        }
```

```cpp
// pod.h : main header file for the POD application
// ifndef __AFXWIN_H__
        #error include 'stdafx.h' before including this file for PCH
endif include "resource.h"     // main symbols

/////////////////////////////////////////////////////////////////////////////
// CPodApp:
// See pod.cpp for the implementation of this class
// class CPodApp : public CWinApp
{
public:
        CPodApp();

// Overrides
        virtual BOOL InitInstance();
        virtual int ExitInstance();

// Implementation

//{{AFX_MSG(CPodApp)
        afx_msg void OnAppAbout();
        afx_msg void OnLibrary();
        afx_msg void OnMaintenanceGroup();
        afx_msg void OnMaintenanceDocument();
        afx_msg void OnMaintenanceDb();
        afx_msg void OnMaintenanceKit();
        afx_msg void OnReportsUsage();
        afx_msg void OnReportsViewer();
        afx_msg void OnReportsPrinter();
        afx_msg void OnMaintenanceSecurity();
        //}}AFX_MSG
        DECLARE_MESSAGE_MAP()
};

/////////////////////////////////////////////////////////////////////////////
// VB-Event extern declarations

//{{AFX_VBX_REGISTER()
//}}AFX_VBX_REGISTER

/////////////////////////////////////////////////////////////////////////////
```

```cpp
// pod.h : main header file for the POD application
// ifndef __AFXWIN_H__
        #error include 'stdafx.h' before including this file for PCH
endif include "resource.h"      // main symbols

/////////////////////////////////////////////////////////////////
// CPodApp:
// See pod.cpp for the implementation of this class
// class CPodApp : public CWinApp
{
public:
        CPodApp();

// Overrides
        virtual BOOL InitInstance();
        virtual int ExitInstance();

// Implementation

//{{AFX_MSG(CPodApp)
        afx_msg void OnAppAbout();
        afx_msg void OnLibrary();
        afx_msg void OnMaintenanceGroup();
        afx_msg void OnMaintenanceDocument();
        afx_msg void OnMaintenanceDb();
        afx_msg void OnMaintenanceKit();
        afx_msg void OnReportsUsage();
        afx_msg void OnReportsViewer();
        afx_msg void OnReportsPrinter();
        afx_msg void OnMaintenanceSecurity();
        //}}AFX_MSG
        DECLARE_MESSAGE_MAP()
};

/////////////////////////////////////////////////////////////////
// VB-Event extern declarations

//{{AFX_VBX_REGISTER()
//}}AFX_VBX_REGISTER

/////////////////////////////////////////////////////////////////
```

```cpp
// pod.cpp : Defines the class behaviors for the application.
//
include "stdafx.h"

include <stdio.h> include "pod.h"
include "mainfrm.h"
#include "poddoc.h"
#include "podview.h"
#include "libraryd.h"
#include "groupmai.h"
#include "document.h"
#include "password.h"
#include "kitmaint.h"
#include "db-init.h"
#include "usagerep.h"
#include "getfiled.h"
#include "viewdlg.h"
#include "printcon.h"
#include "pwmainte.h"
#include "security.h"

#include "pctl.h"
#include "db.h"

ifdef _DEBUG
undef THIS_FILE
static char BASED_CODE THIS_FILE[] = __FILE__;
endif //#include "dos.h"
//struct _dosdate_t RealDate,FakeDate;

/////////////////////////////////////////////////////////////////
// CPodApp

BEGIN_MESSAGE_MAP(CPodApp, CWinApp)
        //{{AFX_MSG_MAP(CPodApp)
        ON_COMMAND(ID_APP_ABOUT, OnAppAbout)
        ON_COMMAND(IDD_DIALOG1, OnLibrary)
        ON_COMMAND(ID_MAINTENANCE_GROUP, OnMaintenanceGroup)
        ON_COMMAND(ID_MAINTENANCE_DOCUMENT, OnMaintenanceDocument)
        ON_COMMAND(ID_MAINTENANCE_DB, OnMaintenanceDb)
        ON_COMMAND(ID_MAINTENANCE_KIT, OnMaintenanceKit)
        ON_COMMAND(ID_REPORTS_USAGE, OnReportsUsage)
        ON_COMMAND(ID_REPORTS_VIEWER, OnReportsViewer)
        ON_COMMAND(ID_REPORTS_PRINTER, OnReportsPrinter)
        ON_COMMAND(ID_MAINTENANCE_SECURITY, OnMaintenanceSecurity)
        //}}AFX_MSG_MAP
        // Standard file based document commands
```

```
        ON_COMMAND(ID_FILE_NEW, CWinApp::OnFileNew)
        ON_COMMAND(ID_FILE_OPEN, CWinApp::OnFileOpen)
END_MESSAGE_MAP()

/////////////////////////////////////////////////////////////////////
// CPodApp construction CPodApp::CPodApp()
{
        // TODO: add construction code here,
        // Place all significant initialization in InitInstance
}

/////////////////////////////////////////////////////////////////////
// The one and only CPodApp object CPodApp NEAR theApp;

/////////////////////////////////////////////////////////////////////
// CPodApp initialization BOOL CPodApp::InitInstance()
{
        char buf[200];
        // Standard initialization
        // If you are not using these features and wish to reduce the size
        // of your final executable, you should remove from the following
        // the specific initialization routines you do not need.

//      SetDialogBkColor();     // Set dialog background color to gray
        SetDialogBkColor(RGB(0,255,255));
        LoadStdProfileSettings();  // Load standard INI file options (including MRU)
        EnableVBX();            // Initialize VBX support // Register the application's document templates.  Document templates
        // serve as the connection between documents, frame windows and views.

CSingleDocTemplate* pDocTemplate;
        pDocTemplate = new CSingleDocTemplate(
                IDR_MAINFRAME,
                RUNTIME_CLASS(CPodDoc),
                RUNTIME_CLASS(CMainFrame),    // main SDI frame window
                RUNTIME_CLASS(CPodView));
        AddDocTemplate(pDocTemplate);

// Set up the print queue for work around printing.
        remove("podprint.bat");
/*
   _dos_getdate(&RealDate);
   FakeDate.day = 1;
   FakeDate.month = 9;
   FakeDate.year = 1994;
   FakeDate.dayofweek = 1;
   _dos_setdate(&FakeDate);
```

```
*/
        // Try to make sure this is an installed, rather than pirated, copy.
        ::GetProfileString("Extensions","mls","",buf,200);
        if (strcmp(buf,"notepad.exe ^.mls"))
                {
                MessageBox(NULL,"Arrrrrg, Matey.","Pirate Warning",MB_OK);
                return FALSE;
                } if (PAN_LoadControls(NULL) == 0)
                {
                MessageBox(NULL,"PAN_LoadControls()...failure loading VCET
DLLs.","",MB_OK);
                return FALSE;
                }
//      MessageBox(NULL,"PAN_LoadControls()...Success.","",MB_OK);
        // create a new (empty) document
        OnFileNew();

if (m_lpCmdLine[0] != '\0')
        {
                // TODO: add command line processing here
        }
        // Go into the library immediately.
        // MS Developers Network recommended this.
        //m_pMainWnd->SendMessage(IDD_DIALOG1);
        // In CWnd class definition, saw this.
        //m_pActiveWnd->
        // Since handler is in this class...
        OnLibrary();

return TRUE;
} int CPodApp::ExitInstance()
{
        // Free the controls
        PAN_FreeControls();
//      _dos_setdate(&RealDate);

return CWinApp::ExitInstance();
}

/////////////////////////////////////////////////////////////////////////
// CAboutDlg dialog used for App About class CAboutDlg : public CDialog
{
public:
        CAboutDlg();
```

```
// Dialog Data
        //{{AFX_DATA(CAboutDlg)
        enum { IDD = IDD_ABOUTBOX };
        //}}AFX_DATA // Implementation
protected:
        virtual void DoDataExchange(CDataExchange* pDX);    // DDX/DDV support
        //{{AFX_MSG(CAboutDlg)
                // No message handlers
        //}}AFX_MSG
        DECLARE_MESSAGE_MAP()
};

CAboutDlg::CAboutDlg() : CDialog(CAboutDlg::IDD)
{
        //{{AFX_DATA_INIT(CAboutDlg)
        //}}AFX_DATA_INIT
} void CAboutDlg::DoDataExchange(CDataExchange* pDX)
{
        CDialog::DoDataExchange(pDX);
        //{{AFX_DATA_MAP(CAboutDlg)
        //}}AFX_DATA_MAP
}

BEGIN_MESSAGE_MAP(CAboutDlg, CDialog)
        //{{AFX_MSG_MAP(CAboutDlg)
                // No message handlers
        //}}AFX_MSG_MAP
END_MESSAGE_MAP()

// App command to run the dialog
void CPodApp::OnAppAbout()
{
        CAboutDlg aboutDlg;
        aboutDlg.DoModal();
}

/////////////////////////////////////////////////////////////////
// VB-Event registration
// (calls to AfxRegisterVBEvent will be placed here by ClassWizard)

//{{AFX_VBX_REGISTER_MAP()
//}}AFX_VBX_REGISTER_MAP

/////////////////////////////////////////////////////////////////
// CPodApp commands void CPodApp::OnLibrary()
{
        LibraryDlg l;
```

```
        l.DoModal();
} void CPodApp::OnMaintenanceGroup()
{
        // TODO: Add your command handler code here
        if (PWMaintenanceDlg::VerifyPassword("grouppw"))
                return;
        GroupMaintenanceDlg g;
        g.DoModal();
} void CPodApp::OnMaintenanceDocument()
{
        // TODO: Add your command handler code here
        if (PWMaintenanceDlg::VerifyPassword("documentpw"))
                return;
        DocumentMaintenanceDlg d;
        d.DoModal();
} void CPodApp::OnMaintenanceDb()
{
        // TODO: Add your command handler code here
        char buf[30];
        PasswordDlg pw(buf,30);
        pw.DoModal();
        if (strcmp(buf,"michael") == 0)
                {
                DeleteDataBase();
                return;
                }
        if (strcmp(buf,"lee") == 0)
                {
                DataBase DbConfig(ConfigName);
                if (DbConfig.Select("Item","michaelpw") == 0)
                        {
                        MessageBox(0,"Passwords already established.","Error",MB_OK);
                        return;
                        }
                DbConfig.AppendBlank();
                DbConfig.Assign("Item","michaelpw");
                DbConfig.Assign("Value",PWMaintenanceDlg::encrypt(buf,"mls@src"));
                DbConfig.AppendBlank();
                DbConfig.Assign("Item","documentpw");
                DbConfig.Assign("Value",PWMaintenanceDlg::encrypt(buf,"src"));
                DbConfig.AppendBlank();
                DbConfig.Assign("Item","kitpw");
                DbConfig.Assign("Value",PWMaintenanceDlg::encrypt(buf,"src"));
                DbConfig.AppendBlank();
                DbConfig.Assign("Item","grouppw");
                DbConfig.Assign("Value",PWMaintenanceDlg::encrypt(buf,"src"));
                MessageBox(0,"Passwords established.","Status",MB_OK);
```

```
                    return;
                }
        if (strcmp(buf,"mike"))
                {
                MessageBox(0,"Incorrect password.","Violation attempt.",MB_OK);
                return;
                }
        CreateDataBase();
} void CPodApp::OnMaintenanceKit()
{
        // TODO: Add your command handler code here
        if (PWMaintenanceDlg::VerifyPassword("kitpw"))
                return;
        KitMaintenanceDlg k;
        k.DoModal();
} void CPodApp::OnReportsUsage()
{
        // TODO: Add your command handler code here
        UsageReportDlg u;
        u.DoModal();
} void CPodApp::OnReportsViewer()
{
        // TODO: Add your command handler code here
        GetFileDlg g("ReportDirectory");
        if (g.DoModal() != IDOK)
                return;
        ViewDlg v(g.FileName);
        v.DoModal();
} void CPodApp::OnReportsPrinter()
{
        // TODO: Add your command handler code here
        GetFileDlg g("ReportDirectory");
        if (g.DoModal() != IDOK)
                return;
        VCET_PrintFile(g.FileName,1);
} void CPodApp::OnMaintenanceSecurity()
{
        // TODO: Add your command handler code here
        /*
        PWMaintenanceDlg pwm("Change Master Password","michaelpw");
```

```
        if (pwm.DoModal() != IDOK)
                return;
        MessageBox(0,"Got IDOK.","Status",MB_OK);
        */
        SecurityDlg s;
        s.DoModal();
}
```

```
; pod.def : Declares the module parameters for the application.

NAME         POD
DESCRIPTION  'POD Windows Application'
EXETYPE      WINDOWS

CODE         PRELOAD MOVEABLE DISCARDABLE
DATA         PRELOAD MOVEABLE MULTIPLE

HEAPSIZE     1024   ; initial heap size
; Stack size is passed as argument to linker's /STACK option
```

```
//Microsoft App Studio generated resource script.
//
#include "resource.h"

#define APSTUDIO_READONLY_SYMBOLS
/////////////////////////////////////////////////////////////////////
//
// Generated from the TEXTINCLUDE 2 resource.
//
#include "afxres.h"

/////////////////////////////////////////////////////////////////////
undef APSTUDIO_READONLY_SYMBOLS ifdef APSTUDIO_INVOKED
/////////////////////////////////////////////////////////////////////
//
// TEXTINCLUDE
//

1 TEXTINCLUDE DISCARDABLE
BEGIN
    "resource.h\0"
END

2 TEXTINCLUDE DISCARDABLE
BEGIN
    "#include ""afxres.h""\r\n"
    "\0"
END

3 TEXTINCLUDE DISCARDABLE
BEGIN
    "#include ""res\\pod.rc2""  // non-App Studio edited resources\r\n"
    "\r\n"
    "#include ""afxres.rc""  \011// Standard components\r\n"
    "\0"
END /////////////////////////////////////////////////////////////////////
endif    // APSTUDIO_INVOKED /////////////////////////////////////////////////////////////////////
//
// Icon
//

IDR_MAINFRAME       ICON    DISCARDABLE     "RES\\POD.ICO"
IDI_ICON1           ICON    DISCARDABLE     "RES\\ICON1.ICO"
IDI_ICON2           ICON    DISCARDABLE     "RES\\ICON2.ICO"

/////////////////////////////////////////////////////////////////////
//
```

```
// Menu
//

IDR_MAINFRAME MENU PRELOAD FIXED PURE
BEGIN
    POPUP "&File"
    BEGIN
        MENUITEM "&Libraries",          IDD_DIALOG1
        MENUITEM SEPARATOR
        MENUITEM "E&xit",               ID_APP_EXIT
    END
    POPUP "&Maintenance"
    BEGIN
        MENUITEM "&Library",            ID_MAINTENANCE_GROUP
        MENUITEM "&Kit",                ID_MAINTENANCE_KIT
        MENUITEM "&Document",           ID_MAINTENANCE_DOCUMENT
        MENUITEM SEPARATOR
        MENUITEM "&Security",           ID_MAINTENANCE_SECURITY
        MENUITEM SEPARATOR
        MENUITEM "DB",                  ID_MAINTENANCE_DB
    END
    POPUP "&Reports"
    BEGIN
        MENUITEM "&Viewer",             ID_REPORTS_VIEWER
        MENUITEM "&Printer",            ID_REPORTS_PRINTER
        MENUITEM SEPARATOR
        MENUITEM "&Usage",              ID_REPORTS_USAGE
    END
    POPUP "&Help"
    BEGIN
        MENUITEM "&About Touch -N- Print...",   ID_APP_ABOUT
    END
END /////////////////////////////////////////////////////////////////
//
// Accelerator
//

IDR_MAINFRAME ACCELERATORS PRELOAD MOVEABLE PURE
BEGIN
    "N",        ID_FILE_NEW,        VIRTKEY,CONTROL
    "O",        ID_FILE_OPEN,       VIRTKEY,CONTROL
    "S",        ID_FILE_SAVE,       VIRTKEY,CONTROL
    "Z",        ID_EDIT_UNDO,       VIRTKEY,CONTROL
    "X",        ID_EDIT_CUT,        VIRTKEY,CONTROL
    "C",        ID_EDIT_COPY,       VIRTKEY,CONTROL
    "V",        ID_EDIT_PASTE,      VIRTKEY,CONTROL
    VK_BACK,    ID_EDIT_UNDO,       VIRTKEY,ALT
    VK_DELETE,  ID_EDIT_CUT,        VIRTKEY,SHIFT
    VK_INSERT,  ID_EDIT_COPY,       VIRTKEY,CONTROL
    VK_INSERT,  ID_EDIT_PASTE,      VIRTKEY,SHIFT
    VK_F6,      ID_NEXT_PANE,       VIRTKEY
```

```
    VK_F6,      ID_PREV_PANE,     VIRTKEY,SHIFT
END

/////////////////////////////////////////////////////////////
//
// Dialog
//

IDD_ABOUTBOX DIALOG DISCARDABLE  34, 22, 217, 55
STYLE DS_MODALFRAME | WS_POPUP | WS_CAPTION | WS_SYSMENU
CAPTION "About Touch -N- Print"
FONT 8, "MS Sans Serif"
BEGIN
    ICON         IDI_ICON2,IDC_STATIC,11,17,18,20
    LTEXT        "Touch -N- Print - Version 1.0",IDC_STATIC,40,10,119,8
    LTEXT        "Copyright \251 1994",IDC_STATIC,40,25,119,8
    DEFPUSHBUTTON   "OK",IDOK,176,6,32,14,WS_GROUP
END IDD_DIALOG1 DIALOG DISCARDABLE  0, 0, 169, 132
STYLE DS_MODALFRAME | WS_POPUP | WS_VISIBLE
FONT 18, "MS Sans Serif"
BEGIN
    LISTBOX      IDC_LIST1,5,41,75,89,LBS_SORT | LBS_NOINTEGRALHEIGHT |
                 WS_VSCROLL | WS_TABSTOP
    LISTBOX      IDC_LIST2,86,41,75,89,LBS_SORT | LBS_NOINTEGRALHEIGHT |
                 WS_VSCROLL | WS_TABSTOP
    CTEXT        "Touch -N- Print",IDC_STATIC,41,5,86,8
    CONTROL      "SRCLOGO8",IDC_LEFTLOGO,"Button",BS_OWNERDRAW,1,1,34,30
    CONTROL      "SRCLOGO8",IDC_RIGHTLOGO,"Button",BS_OWNERDRAW,132,1,34,
                 30
    CTEXT        "Libraries",IDC_STATIC_LEFT_TITLE,5,33,74,7
    CTEXT        "Documents",IDC_STATIC_RIGHT_TITLE,86,33,74,7
END IDD_DIALOG2 DIALOG DISCARDABLE  0, 0, 169, 132
STYLE DS_MODALFRAME | WS_POPUP | WS_VISIBLE
FONT 18, "MS Sans Serif"
BEGIN
    DEFPUSHBUTTON   "Print",IDPRINT,17,115,30,11
    DEFPUSHBUTTON   "View",IDVIEW,68,115,30,11
    PUSHBUTTON   "Cancel",IDCANCEL,119,115,30,11
    CTEXT        "Selected Document Name y",IDC_STATIC_TITLE,10,6,148,9
    LTEXT        "Now is the time for all good men to come to the aid of their country.  Now is the
time for all good men to come to the aid of their country.",
                 IDC_STATIC_DESCRIPTION,6,23,155,86
END IDD_DIALOG3 DIALOG DISCARDABLE  0, 0, 169, 132
STYLE DS_MODALFRAME | WS_POPUP | WS_VISIBLE
FONT 18, "MS Sans Serif"
BEGIN
    DEFPUSHBUTTON   "OK",IDOK,138,6,26,14
```

```
    PUSHBUTTON    "Fit",ID_ZOOM_TO_EXTENTS,138,70,26,14
    PUSHBUTTON    "Up",ID_ZOOM_UP,138,86,26,14
    PUSHBUTTON    "Down",ID_ZOOM_DOWN,138,112,26,14
    LTEXT         "%",IDC_STATIC,160,102,7,8
    RTEXT         "000",IDC_STATIC_ZOOM,138,102,21,8
    CONTROL       "",IDC_STATIC_VIEW,"Static",SS_BLACKFRAME,6,6,127,121
END IDD_DIALOG4 DIALOG DISCARDABLE  0, 0, 168, 132
STYLE DS_MODALFRAME | WS_POPUP | WS_VISIBLE
FONT 18, "MS Sans Serif"
BEGIN
    DEFPUSHBUTTON "Ok",IDPRINT,17,115,30,11
    PUSHBUTTON    "Cancel",IDCANCEL,119,115,30,11
    PUSHBUTTON    "1",IDC_BUTTON1,54,40,18,15
    PUSHBUTTON    "2",IDC_BUTTON2,75,40,18,15
    PUSHBUTTON    "3",IDC_BUTTON3,96,40,18,15
    PUSHBUTTON    "4",IDC_BUTTON4,54,57,18,15
    PUSHBUTTON    "5",IDC_BUTTON5,75,57,18,15
    PUSHBUTTON    "6",IDC_BUTTON6,96,57,18,15
    PUSHBUTTON    "7",IDC_BUTTON7,54,74,18,15
    PUSHBUTTON    "8",IDC_BUTTON8,75,74,18,15
    PUSHBUTTON    "9",IDC_BUTTON9,96,74,18,15
    PUSHBUTTON    "0",IDC_BUTTON10,75,91,18,15
    PUSHBUTTON    "Clear",IDC_CLEAR,54,91,18,15
    PUSHBUTTON    "Back",IDC_BACK,96,91,18,15
    RTEXT         "WWWWWW",IDC_STATIC_DISPLAY,62,26,37,8
    CTEXT         "Enter the number of copies to print.",IDC_STATIC,28,0,
                  113,9
END IDD_DIALOG5 DIALOG DISCARDABLE  0, 0, 168, 132
STYLE DS_MODALFRAME | WS_POPUP | WS_VISIBLE
FONT 18, "MS Sans Serif"
BEGIN
    COMBOBOX      IDC_COMBO1,3,16,75,59,CBS_DROPDOWNLIST | CBS_SORT |
                  WS_VSCROLL | WS_TABSTOP
    LISTBOX       IDC_LIST1,3,44,75,70,LBS_SORT | LBS_NOINTEGRALHEIGHT |
                  WS_VSCROLL | WS_TABSTOP
    PUSHBUTTON    "Add",IDC_ADD_GROUP,2,30,17,10
    PUSHBUTTON    "Rename",IDC_RENAME_GROUP,23,30,30,10
    PUSHBUTTON    "Delete",IDC_DELETE_GROUP,57,30,24,10
    COMBOBOX      IDC_COMBO2,91,30,75,60,CBS_DROPDOWNLIST | CBS_SORT |
                  WS_VSCROLL | WS_TABSTOP
    LISTBOX       IDC_LIST2,91,44,75,70,LBS_SORT | LBS_NOINTEGRALHEIGHT |
                  WS_VSCROLL | WS_TABSTOP
    DEFPUSHBUTTON "OK",IDOK,72,119,24,11
    CTEXT         "Working Library",IDC_STATIC,3,7,68,8
    CTEXT         "Alternate Library",IDC_STATIC,91,21,75,8
    CTEXT         "Library Maintenance",IDC_STATIC,43,0,83,8
END IDD_DIALOG6 DIALOG DISCARDABLE  0, 0, 169, 132
STYLE DS_MODALFRAME | WS_POPUP | WS_VISIBLE
```

```
IDD_DIALOG10 DIALOG DISCARDABLE  0, 0, 99, 55
STYLE DS_MODALFRAME | WS_POPUP | WS_VISIBLE
FONT 18, "MS Sans Serif"
BEGIN
    EDITTEXT       IDC_EDIT1,4,20,91,12,ES_AUTOHSCROLL
    PUSHBUTTON     "OK",IDOK,19,39,26,10
    PUSHBUTTON     "Cancel",IDCANCEL,55,39,26,10
    CTEXT          "Enter new group name",IDC_STATIC_PROMPT,4,6,91,8
END IDD_DIALOG11 DIALOG DISCARDABLE  0, 0, 170, 132
STYLE DS_MODALFRAME | WS_POPUP | WS_VISIBLE
FONT 18, "MS Sans Serif"
BEGIN
    PUSHBUTTON     "Add",IDC_ADD,135,4,26,12
    PUSHBUTTON     "Modify",IDC_MODIFY,135,20,26,12
    PUSHBUTTON     "Delete",IDC_DELETE,135,36,26,12
    DEFPUSHBUTTON  "Done",IDOK,135,52,26,12
    EDITTEXT       IDC_EDIT_NAME,39,12,80,12,ES_AUTOHSCROLL
    COMBOBOX       IDC_COMBO1,39,26,80,78,CBS_DROPDOWNLIST | CBS_SORT |
                   WS_VSCROLL | WS_TABSTOP
    PUSHBUTTON     "Insert",IDC_ADD2,10,46,29,10
    PUSHBUTTON     "Remove",IDC_DELETE2,44,46,29,10
    LISTBOX        IDC_LIST1,3,58,79,71,LBS_SORT | LBS_NOINTEGRALHEIGHT |
                   WS_VSCROLL | WS_TABSTOP
    EDITTEXT       IDC_EDIT_DESCRIPTION,84,67,79,62,ES_MULTILINE |
                   ES_AUTOVSCROLL
    RTEXT          "Name",IDC_STATIC,1,16,30,8
    RTEXT          "Library",IDC_STATIC,1,28,30,8
    CTEXT          "Kit Maintenance",IDC_STATIC,39,0,88,8
    CTEXT          "Description",IDC_STATIC,84,58,46,8
    CTEXT          "Document List",IDC_STATIC,3,38,79,8
END IDD_DIALOG12 DIALOG DISCARDABLE  0, 0, 74, 117
STYLE DS_MODALFRAME | WS_POPUP | WS_VISIBLE
FONT 18, "MS Sans Serif"
BEGIN
    DEFPUSHBUTTON  "OK",IDOK,26,104,22,11
    LISTBOX        IDC_LIST1,5,32,64,69,LBS_SORT | LBS_NOINTEGRALHEIGHT |
                   WS_VSCROLL | WS_TABSTOP
    CTEXT          "Kit Viewer",IDC_STATIC,5,2,64,8
    CTEXT          "Kit",IDC_STATIC_NAME,5,13,64,8
    CTEXT          "Select document",IDC_STATIC,5,23,64,8
END IDD_DIALOG13 DIALOG DISCARDABLE  0, 0, 169, 134
STYLE DS_MODALFRAME | WS_POPUP | WS_VISIBLE
FONT 18, "MS Sans Serif"
BEGIN
    DEFPUSHBUTTON  "OK",IDOK,37,112,36,14
    PUSHBUTTON     "Cancel",IDCANCEL,95,112,36,14
    CTEXT          "Usage Report",IDC_STATIC,52,2,65,8
```

```
    LTEXT        "Output To:",IDC_STATIC,6,70,40,8
    DEFPUSHBUTTON  "All",IDALL,6,13,37,14
    DEFPUSHBUTTON  "Library",IDGROUP,6,32,37,14
    DEFPUSHBUTTON  "Document",IDDOCUMENT,6,51,37,14
    LTEXT        "Static",IDC_STATIC_DOCUMENT,54,57,110,8
    CONTROL      "View",IDC_CHECK_VIEW,"Button",BS_AUTOCHECKBOX |
            WS_TABSTOP,45,89,34,10
    EDITTEXT     IDC_EDIT1,54,71,110,12,ES_AUTOHSCROLL
    LTEXT        "Static",IDC_STATIC_GROUP,54,38,110,8
    CONTROL      "Print",IDC_CHECK_PRINT,"Button",BS_AUTOCHECKBOX |
            WS_TABSTOP,90,89,34,10
END IDD_DIALOG14 DIALOG DISCARDABLE  0, 0, 76, 105
STYLE DS_MODALFRAME | WS_POPUP | WS_VISIBLE
FONT 18, "MS Sans Serif"
BEGIN
    LISTBOX      IDC_LIST1,6,13,64,76,LBS_SORT | LBS_NOINTEGRALHEIGHT |
            WS_VSCROLL | WS_TABSTOP
    PUSHBUTTON   "Cancel",IDCANCEL,26,92,26,11
    LTEXT        "Select Library",IDC_STATIC,6,3,64,8
END IDD_DIALOG15 DIALOG DISCARDABLE  0, 0, 111, 87
STYLE DS_MODALFRAME | WS_POPUP | WS_VISIBLE
FONT 18, "MS Sans Serif"
BEGIN
    EDITTEXT     IDC_EDIT_OLD,44,18,61,12,ES_PASSWORD | ES_AUTOHSCROLL
    EDITTEXT     IDC_EDIT_NEW,44,33,61,12,ES_PASSWORD | ES_AUTOHSCROLL
    EDITTEXT     IDC_EDIT_VERIFY,44,48,61,12,ES_PASSWORD | ES_AUTOHSCROLL
    DEFPUSHBUTTON  "OK",IDOK,23,69,27,12
    PUSHBUTTON   "Cancel",IDCANCEL,61,69,27,12
    RTEXT        "Old",IDC_STATIC,2,22,38,8
    RTEXT        "New",IDC_STATIC,2,37,38,8
    RTEXT        "Verify New",IDC_STATIC,2,52,38,8
    CTEXT        "Password Change",IDC_STATIC_TITLE,6,4,98,8
END IDD_DIALOG16 DIALOG DISCARDABLE  0, 0, 91, 92
STYLE DS_MODALFRAME | WS_POPUP | WS_VISIBLE
FONT 18, "MS Sans Serif"
BEGIN
    PUSHBUTTON   "Master",IDC_BUTTON_MASTER,27,14,37,11
    PUSHBUTTON   "Document",IDC_BUTTON_DOCUMENT,27,30,37,11
    PUSHBUTTON   "Kit",IDC_BUTTON_KIT,27,46,37,11
    PUSHBUTTON   "Library",IDC_BUTTON_GROUP,27,62,37,11
    DEFPUSHBUTTON  "OK",IDOK,9,78,26,11
    PUSHBUTTON   "Reset All",IDC_BUTTON_RESET,45,78,37,11
    CTEXT        "Password Maintenance",IDC_STATIC,1,2,89,8
END

//////////////////////////////////////////////////////
//
```

```
// Bitmap
// xSRCLOGO8U        BITMAP  DISCARDABLE      "RES\\SRCLOGO8.BMP"
CADUCEUSU         BITMAP  DISCARDABLE      "RES\\CADUCEUS.BMP"
ZSRCLOGO8U        BITMAP  DISCARDABLE      "RES\\BMP00001.BMP"
SRCLOGO8U         BITMAP  DISCARDABLE      "RES\\SRCLOGO9.BMP"

/////////////////////////////////////////////////////////////////////////////
//
// String Table
//

STRINGTABLE PRELOAD DISCARDABLE
BEGIN
    IDR_MAINFRAME         "Touch -N- Print Windows Application\nT&P\nTouch -N- Print Document\n\n\nT&P.Document\nT&P Document"
END STRINGTABLE PRELOAD DISCARDABLE
BEGIN
    AFX_IDS_APP_TITLE     "Touch -N- Print"
    AFX_IDS_IDLEMESSAGE   "Ready"
END STRINGTABLE DISCARDABLE
BEGIN
    ID_INDICATOR_EXT      "EXT"
    ID_INDICATOR_CAPS     "CAP"
    ID_INDICATOR_NUM      "NUM"
    ID_INDICATOR_SCRL     "SCRL"
    ID_INDICATOR_OVR      "OVR"
    ID_INDICATOR_REC      "REC"
END STRINGTABLE DISCARDABLE
BEGIN
    ID_FILE_NEW           "Create a new document"
    ID_FILE_OPEN          "Open an existing document"
    ID_FILE_CLOSE         "Close the active document"
    ID_FILE_SAVE          "Save the active document"
    ID_FILE_SAVE_AS       "Save the active document with a new name"
END STRINGTABLE DISCARDABLE
BEGIN
    ID_APP_ABOUT          "Display program information, version number and copyright"
    ID_APP_EXIT           "Quit the application; prompts to save documents"
END STRINGTABLE DISCARDABLE
BEGIN
    ID_FILE_MRU_FILE1     "Open this document"
    ID_FILE_MRU_FILE2     "Open this document"
```

```
// Bitmap
// xSRCLOGO8U         BITMAP  DISCARDABLE    "RES\\SRCLOGO8.BMP"
CADUCEUSU          BITMAP  DISCARDABLE    "RES\\CADUCEUS.BMP"
ZSRCLOGO8U         BITMAP  DISCARDABLE    "RES\\BMP00001.BMP"
SRCLOGO8U          BITMAP  DISCARDABLE    "RES\\SRCLOGO9.BMP"

/////////////////////////////////////////////////////////////////////////////
//
// String Table
//

STRINGTABLE PRELOAD DISCARDABLE
BEGIN
    IDR_MAINFRAME      "Touch -N- Print Windows Application\nT&P\nTouch -N- Print Document\n\n\nT&P.Document\nT&P Document"
END STRINGTABLE PRELOAD DISCARDABLE
BEGIN
    AFX_IDS_APP_TITLE    "Touch -N- Print"
    AFX_IDS_IDLEMESSAGE  "Ready"
END STRINGTABLE DISCARDABLE
BEGIN
    ID_INDICATOR_EXT     "EXT"
    ID_INDICATOR_CAPS    "CAP"
    ID_INDICATOR_NUM     "NUM"
    ID_INDICATOR_SCRL    "SCRL"
    ID_INDICATOR_OVR     "OVR"
    ID_INDICATOR_REC     "REC"
END STRINGTABLE DISCARDABLE
BEGIN
    ID_FILE_NEW       "Create a new document"
    ID_FILE_OPEN      "Open an existing document"
    ID_FILE_CLOSE     "Close the active document"
    ID_FILE_SAVE      "Save the active document"
    ID_FILE_SAVE_AS   "Save the active document with a new name"
END STRINGTABLE DISCARDABLE
BEGIN
    ID_APP_ABOUT      "Display program information, version number and copyright"
    ID_APP_EXIT       "Quit the application; prompts to save documents"
END STRINGTABLE DISCARDABLE
BEGIN
    ID_FILE_MRU_FILE1   "Open this document"
    ID_FILE_MRU_FILE2   "Open this document"
```

```
    ID_FILE_MRU_FILE3      "Open this document"
    ID_FILE_MRU_FILE4      "Open this document"
END STRINGTABLE DISCARDABLE
BEGIN
    ID_NEXT_PANE           "Switch to the next window pane"
    ID_PREV_PANE           "Switch back to the previous window pane"
END STRINGTABLE DISCARDABLE
BEGIN
    ID_EDIT_CLEAR          "Erase the selection"
    ID_EDIT_CLEAR_ALL      "Erase everything"
    ID_EDIT_COPY           "Copy the selection and put it on the Clipboard"
    ID_EDIT_CUT            "Cut the selection and put it on the Clipboard"
    ID_EDIT_FIND           "Find the specified text"
    ID_EDIT_PASTE          "Insert Clipboard contents"
    ID_EDIT_REPEAT         "Repeat the last action"
    ID_EDIT_REPLACE        "Replace specific text with different text"
    ID_EDIT_SELECT_ALL     "Select the entire document"
    ID_EDIT_UNDO           "Undo the last action"
    ID_EDIT_REDO           "Redo the previously undone action"
END STRINGTABLE DISCARDABLE
BEGIN
    AFX_IDS_SCSIZE         "Change the window size"
    AFX_IDS_SCMOVE         "Change the window position"
    AFX_IDS_SCMINIMIZE     "Reduce the window to an icon"
    AFX_IDS_SCMAXIMIZE     "Enlarge the window to full size"
    AFX_IDS_SCNEXTWINDOW   "Switch to the next document window"
    AFX_IDS_SCPREVWINDOW   "Switch to the previous document window"
    AFX_IDS_SCCLOSE        "Close the active window and prompts to save the documents"
END STRINGTABLE DISCARDABLE
BEGIN
    AFX_IDS_SCRESTORE      "Restore the window to normal size"
    AFX_IDS_SCTASKLIST     "Activate Task List"
END ifndef APSTUDIO_INVOKED
/////////////////////////////////////////////////////////////////////////////
//
// Generated from the TEXTINCLUDE 3 resource.
//
include "res\pod.rc2"  // non-App Studio edited resources include "afxres.rc"    // Standard components

/////////////////////////////////////////////////////////////////////////////
#endif    // not APSTUDIO_INVOKED
```

```
// poddoc.h : interface of the CPodDoc class
//
///////////////////////////////////////////////////////////////////////// class CPodDoc : public CDocument
{
protected: // create from serialization only
        CPodDoc();
        DECLARE_DYNCREATE(CPodDoc)

// Attributes
public:
// Operations
public:

// Implementation
public:
        virtual ~CPodDoc();
        virtual void Serialize(CArchive& ar);   // overridden for document i/o
#ifdef _DEBUG
        virtual void AssertValid() const;
        virtual void Dump(CDumpContext& dc) const;
endif protected:
        virtual BOOL OnNewDocument();

// Generated message map functions
protected:
        //{{AFX_MSG(CPodDoc)
                // NOTE - the ClassWizard will add and remove member functions here.
                //    DO NOT EDIT what you see in these blocks of generated code !
        //}}AFX_MSG
        DECLARE_MESSAGE_MAP()
};

/////////////////////////////////////////////////////////////////////////
```

```cpp
// poddoc.cpp : implementation of the CPodDoc class
//
include "stdafx.h"

include "pod.h"
#include "poddoc.h"

#ifdef _DEBUG
undef THIS_FILE
static char BASED_CODE THIS_FILE[] = __FILE__;
endif /////////////////////////////////////////////////////////////////////////////
// CPodDoc IMPLEMENT_DYNCREATE(CPodDoc, CDocument)

BEGIN_MESSAGE_MAP(CPodDoc, CDocument)
        //{{AFX_MSG_MAP(CPodDoc)
                // NOTE - the ClassWizard will add and remove mapping macros here.
                //    DO NOT EDIT what you see in these blocks of generated code!
        //}}AFX_MSG_MAP
END_MESSAGE_MAP()

/////////////////////////////////////////////////////////////////////////////
// CPodDoc construction/destruction CPodDoc::CPodDoc()
{
        // TODO: add one-time construction code here
}

CPodDoc::~CPodDoc()
{
}

BOOL CPodDoc::OnNewDocument()
{
        if (!CDocument::OnNewDocument())
                return FALSE;

// TODO: add reinitialization code here
        // (SDI documents will reuse this document)

return TRUE;
}

/////////////////////////////////////////////////////////////////////////////
// CPodDoc serialization void CPodDoc::Serialize(CArchive& ar)
{
        if (ar.IsStoring())
        {
```

```
                    // TODO: add storing code here
            }
            else
            {
                    // TODO: add loading code here
            }
    }

/////////////////////////////////////////////////////////////////////////////
    // CPodDoc diagnostics ifdef _DEBUG
    void CPodDoc::AssertValid() const
    {
            CDocument::AssertValid();
    } void CPodDoc::Dump(CDumpContext& dc) const
    {
            CDocument::Dump(dc);
    }
    #endif //_DEBUG /////////////////////////////////////////////////////////////////////////////
    // CPodDoc commands
```

```
// podview.h : interface of the CPodView class
//
///////////////////////////////////////////////////////////////// class CPodView : public CView
{
protected: // create from serialization only
        CPodView();
        DECLARE_DYNCREATE(CPodView)

// Attributes
public:
        CPodDoc* GetDocument();

// Operations
public:

// Implementation
public:
        virtual ~CPodView();
        virtual void OnDraw(CDC* pDC);  // overridden to draw this view
#ifdef _DEBUG
        virtual void AssertValid() const;
        virtual void Dump(CDumpContext& dc) const;
endif protected:

// Generated message map functions
protected:
        //{{AFX_MSG(CPodView)
        //}}AFX_MSG
        DECLARE_MESSAGE_MAP()
};

#ifndef _DEBUG  // debug version in podview.cpp
inline CPodDoc* CPodView::GetDocument()
   { return (CPodDoc*)m_pDocument; }
#endif

/////////////////////////////////////////////////////////////////
```

```
// podview.h : interface of the CPodView class
//
///////////////////////////////////////////////////////////////// class CPodView : public CView
{
protected: // create from serialization only
        CPodView();
        DECLARE_DYNCREATE(CPodView)

// Attributes
public:
        CPodDoc* GetDocument();

// Operations
public:

// Implementation
public:
        virtual ~CPodView();
        virtual void OnDraw(CDC* pDC);  // overridden to draw this view
#ifdef _DEBUG
        virtual void AssertValid() const;
        virtual void Dump(CDumpContext& dc) const;
endif protected:

// Generated message map functions
protected:
        //{{AFX_MSG(CPodView)
        //}}AFX_MSG
        DECLARE_MESSAGE_MAP()
};

#ifndef _DEBUG  // debug version in podview.cpp
inline CPodDoc* CPodView::GetDocument()
   { return (CPodDoc*)m_pDocument; }
#endif

/////////////////////////////////////////////////////////////////
```

```cpp
// podview.cpp : implementation of the CPodView class
//
include "stdafx.h"

include "pod.h"
#include "poddoc.h"
#include "podview.h"

#ifdef _DEBUG
undef THIS_FILE
static char BASED_CODE THIS_FILE[] = __FILE__;
endif /////////////////////////////////////////////////////////////////
// CPodView IMPLEMENT_DYNCREATE(CPodView, CView)

BEGIN_MESSAGE_MAP(CPodView, CView)
        //{{AFX_MSG_MAP(CPodView)
        //}}AFX_MSG_MAP
END_MESSAGE_MAP()

/////////////////////////////////////////////////////////////////
// CPodView construction/destruction CPodView::CPodView()
{
        // TODO: add construction code here
}

CPodView::~CPodView()
{
}

/////////////////////////////////////////////////////////////////
// CPodView drawing void CPodView::OnDraw(CDC* pDC)
{
        CPodDoc* pDoc = GetDocument();
        ASSERT_VALID(pDoc);

// TODO: add draw code for native data here
}

/////////////////////////////////////////////////////////////////
// CPodView diagnostics ifdef _DEBUG
void CPodView::AssertValid() const
{
        CView::AssertValid();
}
```

```
void CPodView::Dump(CDumpContext& dc) const
{
        CView::Dump(dc);
}

CPodDoc* CPodView::GetDocument() // non-debug version is inline
{
        ASSERT(m_pDocument->IsKindOf(RUNTIME_CLASS(CPodDoc)));
        return (CPodDoc*)m_pDocument;
}
endif //_DEBUG ///////////////////////////////////////////////////////////
// CPodView message handlers
```

```cpp
// poddoc.cpp : implementation of the CPodDoc class
//
include "stdafx.h"

include "pod.h"
#include "poddoc.h"

#ifdef _DEBUG
undef THIS_FILE
static char BASED_CODE THIS_FILE[] = __FILE__;
endif /////////////////////////////////////////////////////////////////////////////
// CPodDoc IMPLEMENT_DYNCREATE(CPodDoc, CDocument)

BEGIN_MESSAGE_MAP(CPodDoc, CDocument)
        //{{AFX_MSG_MAP(CPodDoc)
                // NOTE - the ClassWizard will add and remove mapping macros here.
                //    DO NOT EDIT what you see in these blocks of generated code!
        //}}AFX_MSG_MAP
END_MESSAGE_MAP()

/////////////////////////////////////////////////////////////////////////////
// CPodDoc construction/destruction CPodDoc::CPodDoc()
{
        // TODO: add one-time construction code here
}

CPodDoc::~CPodDoc()
{
}

BOOL CPodDoc::OnNewDocument()
{
        if (!CDocument::OnNewDocument())
                return FALSE;

// TODO: add reinitialization code here
        // (SDI documents will reuse this document)

return TRUE;
}

/////////////////////////////////////////////////////////////////////////////
// CPodDoc serialization void CPodDoc::Serialize(CArchive& ar)
{
        if (ar.IsStoring())
        {
```

```
                // TODO: add storing code here
        }
        else
        {
                // TODO: add loading code here
        }
}

/////////////////////////////////////////////////////////////////////////////
// CPodDoc diagnostics ifdef _DEBUG
void CPodDoc::AssertValid() const
{
        CDocument::AssertValid();
} void CPodDoc::Dump(CDumpContext& dc) const
{
        CDocument::Dump(dc);
}
endif //_DEBUG /////////////////////////////////////////////////////////////////////////////
// CPodDoc commands
```

```
// printcon.h : header file
//

/////////////////////////////////////////////////////////////
// PrintControlDlg dialog class PrintControlDlg : public CDialog
{
// Construction
        long Id;
        long Copies,DefaultCopies,MaxCopies;
        void NumberButton(int);
        void UpdateUsage();
public:
        PrintControlDlg(long aId, CWnd* pParent = NULL);        // standard constructor // Dialog Data
        //{{AFX_DATA(PrintControlDlg)
        enum { IDD = IDD_DIALOG4 };
        CButton      m_ButtonClear;
        CButton      m_ButtonBack;
        CButton      m_Button9;
        CButton      m_Button8;
        CButton      m_Button7;
        CButton      m_Button6;
        CButton      m_Button5;
        CButton      m_Button4;
        CButton      m_Button3;
        CButton      m_Button2;
        CButton      m_Button10;
        CButton      m_Button1;
        CButton      m_Print;
        CButton      m_Cancel;
        CStatic m_Display;
        //}}AFX_DATA // Implementation
protected:
        virtual void DoDataExchange(CDataExchange* pDX);        // DDX/DDV support // Generated message map functions
        //{{AFX_MSG(PrintControlDlg)
        afx_msg void OnClose();
        afx_msg void OnClear();
        virtual BOOL OnInitDialog();
        afx_msg void OnButton1();
        afx_msg void OnButton10();
        afx_msg void OnButton2();
        afx_msg void OnButton3();
        afx_msg void OnButton4();
        afx_msg void OnButton5();
        afx_msg void OnButton6();
        afx_msg void OnButton7();
        afx_msg void OnButton8();
```

```
        afx_msg void OnButton9();
        afx_msg void OnBack();
        afx_msg void OnPrint();
        //}}AFX_MSG
        DECLARE_MESSAGE_MAP()
};

void VCET_PrintFile(LPSTR FileName, int nCopies);
```

```
// printcon.cpp : implementation file
//
include "stdafx.h"

#include <math.h>
#include <stdlib.h>
#include <stdio.h>
#include <memory.h>
#include <string.h>
#include <io.h>
#include <errno.h>
include <dos.h> include <commdlg.h> include "pctl.h"

include "pod.h"
#include "printcon.h"
#include "db-init.h"

#include "db.h"

ifdef _DEBUG
undef THIS_FILE
static char BASED_CODE THIS_FILE[] = __FILE__;
endif /////////////////////////////////////////////////////////////////////////////
// PrintControlDlg dialog PrintControlDlg::PrintControlDlg(long aId, CWnd* pParent /*=NULL*/)
        : CDialog(PrintControlDlg::IDD, pParent), Id(aId)
{
        char buf[100];
        // Get the default and maximum number of copies allowed.
        GetPrivateProfileString("Printing Defaults","Default Copies","0",buf,50,"pod.ini");
        DefaultCopies = strtol(buf,NULL,10);
        GetPrivateProfileString("Printing Defaults","Maximum Copies","0",buf,50,"pod.ini");
        MaxCopies = strtol(buf,NULL,10);
        //{{AFX_DATA_INIT(PrintControlDlg)
                // NOTE: the ClassWizard will add member initialization here
        //}}AFX_DATA_INIT
} void PrintControlDlg::DoDataExchange(CDataExchange* pDX)
{
        CDialog::DoDataExchange(pDX);
        //{{AFX_DATA_MAP(PrintControlDlg)
        DDX_Control(pDX, IDC_CLEAR, m_ButtonClear);
        DDX_Control(pDX, IDC_BACK, m_ButtonBack);
        DDX_Control(pDX, IDC_BUTTON9, m_Button9);
```

```cpp
        DDX_Control(pDX, IDC_BUTTON8, m_Button8);
        DDX_Control(pDX, IDC_BUTTON7, m_Button7);
        DDX_Control(pDX, IDC_BUTTON6, m_Button6);
        DDX_Control(pDX, IDC_BUTTON5, m_Button5);
        DDX_Control(pDX, IDC_BUTTON4, m_Button4);
        DDX_Control(pDX, IDC_BUTTON3, m_Button3);
        DDX_Control(pDX, IDC_BUTTON2, m_Button2);
        DDX_Control(pDX, IDC_BUTTON10, m_Button10);
        DDX_Control(pDX, IDC_BUTTON1, m_Button1);
        DDX_Control(pDX, IDPRINT, m_Print);
        DDX_Control(pDX, IDCANCEL, m_Cancel);
        DDX_Control(pDX, IDC_STATIC_DISPLAY, m_Display);
        //}}AFX_DATA_MAP
}

BEGIN_MESSAGE_MAP(PrintControlDlg, CDialog)
        //{{AFX_MSG_MAP(PrintControlDlg)
        ON_WM_CLOSE()
        ON_BN_CLICKED(IDC_CLEAR, OnClear)
        ON_BN_CLICKED(IDC_BUTTON1, OnButton1)
        ON_BN_CLICKED(IDC_BUTTON10, OnButton10)
        ON_BN_CLICKED(IDC_BUTTON2, OnButton2)
        ON_BN_CLICKED(IDC_BUTTON3, OnButton3)
        ON_BN_CLICKED(IDC_BUTTON4, OnButton4)
        ON_BN_CLICKED(IDC_BUTTON5, OnButton5)
        ON_BN_CLICKED(IDC_BUTTON6, OnButton6)
        ON_BN_CLICKED(IDC_BUTTON7, OnButton7)
        ON_BN_CLICKED(IDC_BUTTON8, OnButton8)
        ON_BN_CLICKED(IDC_BUTTON9, OnButton9)
        ON_BN_CLICKED(IDC_BACK, OnBack)
        ON_BN_CLICKED(IDPRINT, OnPrint)
        //}}AFX_MSG_MAP
END_MESSAGE_MAP()

/////////////////////////////////////////////////////////////////
// PrintControlDlg message handlers void PrintControlDlg::OnClose()
{
        // TODO: Add your message handler code here and/or call default CDialog::OnClose();
} void PrintControlDlg::OnClear()
{
        // TODO: Add your control notification handler code here
        char buf[20];
        Copies = 0;
        m_Display.SetWindowText(ltoa(Copies,buf,10));
}

BOOL PrintControlDlg::OnInitDialog()
```

```
{
        CDialog::OnInitDialog();

// TODO: Add extra initialization here
        char buf[20];
        Copies = DefaultCopies;
        m_Display.SetWindowText(ltoa(Copies,buf,10));

return TRUE;  // return TRUE  unless you set the focus to a control
} void PrintControlDlg::NumberButton(int id)
        {
        char buf[50];
        // Allow calculator style entry for enough places for MaxCopies.
        // Need to calc how wide num is the mod with 10 to that power.
        // Put this in init for optimization.
        long x = MaxCopies;
        int Width = 0;
        while (x /= 10) Width++;
        if (MaxCopies > 0L)
                Copies %= (long)pow(10.,(double)Width);
        // Don't let the resource overflow.
        if (Copies > 100000L)
                Copies %= 100000L;
        Copies *= 10;
        Copies += id;
        if ((MaxCopies > 0L) && (Copies > MaxCopies))
                Copies = MaxCopies;
        m_Display.SetWindowText(ltoa(Copies,buf,10));
        } void PrintControlDlg::OnButton1()
{
        // TODO: Add your control notification handler code here
        NumberButton(1);
} void PrintControlDlg::OnButton10()
{
        // TODO: Add your control notification handler code here
        NumberButton(0);
} void PrintControlDlg::OnButton2()
{
        // TODO: Add your control notification handler code here
        NumberButton(2);
} void PrintControlDlg::OnButton3()
{
```

```cpp
        // TODO: Add your control notification handler code here
        NumberButton(3);
} void PrintControlDlg::OnButton4()
{
        // TODO: Add your control notification handler code here
        NumberButton(4);
} void PrintControlDlg::OnButton5()
{
        // TODO: Add your control notification handler code here
        NumberButton(5);
} void PrintControlDlg::OnButton6()
{
        // TODO: Add your control notification handler code here
        NumberButton(6);
} void PrintControlDlg::OnButton7()
{
        // TODO: Add your control notification handler code here
        NumberButton(7);
} void PrintControlDlg::OnButton8()
{
        // TODO: Add your control notification handler code here
        NumberButton(8);
} void PrintControlDlg::OnButton9()
{
        // TODO: Add your control notification handler code here
        NumberButton(9);
} void PrintControlDlg::OnBack()
{
        // TODO: Add your control notification handler code here
        char buf[20];
        Copies /= 10;
        m_Display.SetWindowText(ltoa(Copies,buf,10));
} void PrintControlDlg::UpdateUsage()
        {
        char buf[100];
        //char buf1[100];
        struct _dosdate_t dt;
```

```
        DataBase DbUsage(UsageName);
        _dos_getdate(&dt);
        sprintf(buf,"%04u%02hu%02hu",dt.year,dt.month,dt.day);
        //sprintf(buf1,"DocId=%ld\nDate=<<%s>>",FileId,buf);
        //MessageBox(buf1);
        // If the document has already been printed today, accumulate in that record.
        if (DbUsage.Select("Date",buf) == 0)
                {
                for (; DbUsage.Eof()==0; DbUsage.Skip(1))
                        {
                        if (DbUsage.GetLong("DocId") == Id)
                                {
        DbUsage.AssignLong("Quantity",DbUsage.GetLong("Quantity")+Copies);
                                return;
                                }
                        }
                }
        // If the document hasn't been printed today, add a record.
        DbUsage.AppendBlank();
        DbUsage.Assign("Date",buf);
        DbUsage.AssignLong("DocId",Id);
        DbUsage.AssignLong("Quantity",Copies);
        } void PrintControlDlg::OnPrint()
        {
        char buf[250],*fbuf;
        long KitId,i,ii;
        // Put up print message and disable buttons.
        m_Print.EnableWindow(0);
        m_Cancel.EnableWindow(0);
        m_Button1.EnableWindow(0);
        m_Button2.EnableWindow(0);
        m_Button3.EnableWindow(0);
        m_Button4.EnableWindow(0);
        m_Button5.EnableWindow(0);
        m_Button6.EnableWindow(0);
        m_Button7.EnableWindow(0);
        m_Button8.EnableWindow(0);
        m_Button9.EnableWindow(0);
        m_Button10.EnableWindow(0);
        m_ButtonClear.EnableWindow(0);
        m_ButtonBack.EnableWindow(0);
        m_Display.SetWindowText("Printing...");
        // Get the Document Directory.
        GetPrivateProfileString("System Defaults","DocumentDirectory","c:\\",buf,200,"pod.ini");
        if ( *(buf + strlen(buf) - 1) != '\\')
                strcat(buf,"\\");
        // Get the file name.
        DataBase DbDocument(DocumentName);
        if (DbDocument.Select("Id",Id))
                {
```

```
                    MessageBox("Invalid file id.");
                    OnCancel();
                    return;
                    }
        // If it is a kit, print all of the files in the kit.
        fbuf = buf + strlen(buf);
        if (strcmp(DbDocument.Get("File",fbuf),"*") == 0)
                    {
                    KitId = Id;
                    //MessageBox("This is a kit.");
                    DataBase DbKitLink(KitLinkName);
                    // Collate the kits.  Don't accumulate Copies*Copies into usage database.
                    ii = Copies;
                    Copies = 1L;
                    for (i=0; i<ii; i++)
                            {
                            if (DbKitLink.Select("KitId",KitId))
                                    {
                                    MessageBox("This kit has no
documents.","Status",MB_OK|MB_ICONINFORMATION);
                                    OnCancel();
                                    return;
                                    }
                            for (; DbKitLink.Eof()==0; DbKitLink.Skip(1))
                                    {
                                    Id = DbKitLink.GetLong("DocId");        // set Id for
UpdateUsage()
                                    if (DbDocument.Select("Id",Id) == 0)
                                            {
                                            DbDocument.Get("File",fbuf);
                                            UpdateUsage();
                                            VCET_PrintFile(buf,1);
                                            }
                                    }
                            }
                    Copies = ii;
                    Id = KitId;
                    OnCancel();
                    return;
                    }

UpdateUsage();
        VCET_PrintFile(buf,(int)Copies);
        OnCancel();
        }

/*      // This is the batch printing work around I used until CSI finally managed,
        // after several months, to get their API to work with post script files.
        // To use it, comment out everything from the VCET_PrintFile() call to the
        // function ending } in the lines above.
        char FileName[250];
        strcpy(FileName,buf);
        char *fn = "podprint.bat";
        FILE *fp;
```

```
        UINT err;
        //char buf[100];
        int toggle=0;

if (_access(fn,00) == 0)
                m_Display.SetWindowText("Printing...");
        while (_access(fn,00) == 0)
                WaitMessage();
        m_Display.SetWindowText(ltoa(Copies,buf,10));

if ((fp = fopen(fn,"w")) == NULL)
                {
                MessageBox("Error creating print batch.");
                return;
                }
        fprintf(fp,"@echo off\n\n");
//      fprintf(fp,"prompt $p$g$e[0;37;44m\ncls\n");
        fprintf(fp,"echo.\necho.\n");
        fprintf(fp,"echo                    P R I N T   M O N I T O R\n\n");
        fprintf(fp,"echo.\necho.\n\n");
        for (long i=1L; i<=Copies; i++)
                {
                fprintf(fp,"echo Printing copy %ld of %ld.\n",i,Copies);
//              fprintf(fp,"copy %s lpt1:\n\n",FileName);
                fprintf(fp,"print %s \n\n",FileName);
                }
        fprintf(fp,"del %s\n",fn);
        fclose(fp);
        err = WinExec(fn,SW_HIDE);
        if (err < 32)
                {
                sprintf(buf,"Error %u",err);
                MessageBox(buf);
                }
        OnCancel();
        }
*/

BOOL CALLBACK AbortProc(HDC hdc, int error)
        {
        if (error != 0 && error != SP_OUTOFDISK)
                {
                // Unrecoverable error.
                return FALSE;
                }
        else
                {
                MSG msg;
                while (PeekMessage(&msg,0,0,0,PM_REMOVE))
                        {
                        TranslateMessage(&msg);
                        DispatchMessage(&msg);
                        }
                }
```

```
        return TRUE;
        } void VCET_PrintFile(LPSTR FileName, int nCopies)
        {
        PRINTDLG pd;
//      RECT rec={2000,2000,2550,3450};       // Create the control offscreen.
        RECT rec={2000,2000,850,1150};        // Create the control offscreen.
        int err;
        char buf[100];
        HWND handle;
        PAN_CtlFileInfo FileInfo;
        PAN_CtlPrintOptions PrintOptions;
        char c_footertxt[256];
//      FARPROC lpAbortProc; // Printer abort procedure.
        DWORD status;
        int i;
        LOGFONT fnt;
        HANDLE hInst = AfxGetInstanceHandle();
        CWinApp *cp = AfxGetApp();
        HWND hMainWnd = cp->m_pMainWnd->m_hWnd;
        HWND DeskTopWnd;
        RECT DeskTopRect;
        int FontSize;

// Developed at 800*600 resolution.  Scale to any screen resolution for views.
        DeskTopWnd = GetDesktopWindow();
        GetWindowRect(DeskTopWnd,&DeskTopRect);
        //sprintf(buf,"Desk Top Window Rectangle\nleft=%d\ntop=%d\nright=%d\nbottom=%d\n",
        //      DeskTopRect.left,DeskTopRect.top,DeskTopRect.right,DeskTopRect.bottom);
        //MessageBox(NULL,buf,"Information",MB_APPLMODAL);
        if (DeskTopRect.right >= 800)
                FontSize = -10;
        else
                FontSize = -9;
                //FontSize = (int)((-10. * (double)DeskTopRect.right / 800.) + .5);
        //

WritePrivateProfileString("Options","psmindpi","300","pctl.ini");
//      Tried to fix scaling by going back to low resolution.  Didn't work.
//      WritePrivateProfileString("Options","psmindpi","75","pctl.ini");

// Load the image
        if ((handle = PAN_CreateControl(NULL,0,&rec,NULL,NULL)) == NULL)
                {
                MessageBox(NULL,"PAN_CreateControl...Error","DEBUG",MB_APPLMODAL);
                return;
                }

ShowWindow(handle,SW_SHOW);
        err = (int)SendMessage(handle,PM_CTLSETFILE,(WPARAM)-1,(LPARAM)(LPSTR)FileName);
        if (err != PAN_CTLERRNONE)
                {
```

```
            wsprintf(buf,"Error on PM_CTLSETFILE Code = %d",err);
            MessageBox(NULL,buf,"DEBUG",MB_APPLMODAL);
            return;
            }

// Force a paint
    SendMessage(handle,PM_CTLPAINT,0,0);

// Zoom to extents
    memset(&FileInfo,0,sizeof(PAN_CtlFileInfo));
    SendMessage(handle,PM_CTLGETFILE,(WPARAM)0,(LPARAM)(PAN_CtlFileInfo FAR
*)&FileInfo);
    if (FileInfo.type == PAN_RasterFile || FileInfo.type == PAN_VectorFile)
            {

SendMessage(handle,PM_CTLSETLMBACTION,(WPARAM)PAN_CTLLMBZOOM,(LPA
RAM)0);
            SendMessage(handle,WM_RBUTTONDOWN,0,0);
            SendMessage(handle,WM_RBUTTONUP,0,0);
            }
    // Switch to fixed font for ASCII files such as the reports.
    if (strcmp(FileInfo.desc,"ASCII Text") == 0)
            {
            err =
(int)::SendMessage(handle,PM_CTLGETBASEFONT,0,(LPARAM)(LPLOGFONT) &fnt);
            if (err != PAN_CTLERRNONE)
                    MessageBox(NULL,"Error on
PM_CTLGETBASEFONT.","Status",MB_APPLMODAL);
            //fnt.lfHeight = -10;
            fnt.lfHeight = FontSize;
            fnt.lfWeight = FW_BOLD;
            strcpy(fnt.lfFaceName,"Courier New");
            err =
(int)::SendMessage(handle,PM_CTLSETBASEFONT,0,(LPARAM)(LOGFONT FAR *) &fnt);
            if (err != PAN_CTLERRNONE)
                    MessageBox(NULL,"Error on
PM_CTLSETBASEFONT.","Status",MB_APPLMODAL);
            }

// Get system printer information
    memset(&pd,0,sizeof(PRINTDLG));
    pd.lStructSize = sizeof(PRINTDLG);
    pd.Flags = PD_RETURNDC | PD_RETURNDEFAULT;
    pd.hwndOwner = handle;
    if (PrintDlg(&pd) == 0)
            {
            MessageBox(NULL,"Error...unable to initialize
printer","DEBUG",MB_APPLMODAL);
            return;
            } pd.Flags = PD_RETURNDC | PD_RETURNIC;
    pd.nCopies = 1;
    pd.nFromPage = 1;
```

```
            pd.nToPage = 0x7FFF;  // 0x0001 for single page gives big speed increase
            pd.nToPage = abs(FileInfo.nPages);     // Note in readme.txt says neg bit could be set
//          sprintf(buf,"nPages = %d",FileInfo.nPages);
//          MessageBox(NULL,buf,"nPages",MB_OK);
            pd.nMinPage = 0x0001;
            pd.nMaxPage = 0x7FFF;

// Set the CSI VCET print options
            memset(&PrintOptions,0,sizeof(PAN_CtlPrintOptions));
            // Printer DC structure
            PrintOptions.printDlg = &pd;
            // Print to fit
            PrintOptions.units = CTLUNIT_PIXEL;
            PrintOptions.nImageUnits = 0;
            PrintOptions.nPaperUnits = 0;
            // Margins
            PrintOptions.margins.units = CTLUNIT_INCH;
            PrintOptions.margins.top = 0.1;
            PrintOptions.margins.left = 0.1;
            PrintOptions.margins.bottom = 0.1;
            PrintOptions.margins.right = 0.1;
            // Headers & Footers
            lstrcpy(PrintOptions.headers.font.lfFaceName,"Arial");
            PrintOptions.headers.font.lfHeight = -10;
            // If ini says to, print file name in footer.
            GetPrivateProfileString("Printing Defaults","FileName","",buf,100,"pod.ini");
            if (strcmp(buf,"footer") == 0)
                    {
                    wsprintf(c_footertxt,"Filename = %s",FileName);
                    PrintOptions.headers.botCtrText = c_footertxt;
                    }

// Set AbortProc
//          lpAbortProc = MakeProcInstance(AbortProc,hInst);
//          SetAbortProc(PrintOptions.printDlg->hDC,lpAbortProc);
            SetAbortProc(PrintOptions.printDlg->hDC,AbortProc);

// Important:  Disable the main window to avoid reentrancy problems
            EnableWindow(hMainWnd,FALSE);

while (nCopies-- > 0)
                    {
                    err = (int)SendMessage(handle,PM_CTLPRINT,(WORD)-1,
                            (LPARAM)(PAN_CtlPrintOptions FAR *)&PrintOptions);
                    }
            if (err != PAN_CTLERRNONE)
                    {
                    // CSI has problem...always return err=8 on Post Script multiple copies.
                    // Doesn't seem to cause problem, so ignore it.
                    if (FileInfo.type != PAN_RasterFile && FileInfo.type != PAN_VectorFile)
                            {
                            wsprintf(buf,"Error on PM_CTLPRINT.  Code = %d",err);
                            MessageBox(NULL,buf,"DEBUG",MB_APPLMODAL);
                            }
```

```
            } status = PAN_CTLSTATUSIDLE;
    SendMessage(handle,PM_CTLGETSTATUS,0,(LPARAM)(LPVOID)&status);
    SendMessage(handle,PM_CTLDESTROY,0,0);
    for (i=0; (i<10) && status != PAN_CTLSTATUSIDLE; i++)
            {
            SendMessage(handle,PM_CTLGETSTATUS,0,(LPARAM)(LPVOID)&status);
            }
    if (status == PAN_CTLSTATUSIDLE)
            {
            DestroyWindow(handle);
            }
//  FreeProcInstance(lpAbortProc);
    EnableWindow(hMainWnd,TRUE);
    DeleteDC(pd.hDC);
    WritePrivateProfileString("Options","psmindpi","75","pctl.ini");
    }
```

```cpp
// pwmainte.h : header file
//

/////////////////////////////////////////////////////////////
// PWMaintenanceDlg dialog class PWMaintenanceDlg : public CDialog
{
        char *Title,*ID;
// Construction
public:
        PWMaintenanceDlg(char *aTitle, char *aID, CWnd* pParent = NULL);    // standard constructor
        ~PWMaintenanceDlg();
        static char *encrypt(char *s, char *t);
        static int VerifyPassword(char *PWLevel, char *PWValue=NULL);

// Dialog Data
        //{{AFX_DATA(PWMaintenanceDlg)
        enum { IDD = IDD_DIALOG15 };
        CStatic  m_Title;
        CEdit    m_VerifyPassword;
        CEdit    m_OldPassword;
        CEdit    m_NewPassword;
        //}}AFX_DATA // Implementation
protected:
        virtual void DoDataExchange(CDataExchange* pDX);    // DDX/DDV support // Generated message map functions
        //{{AFX_MSG(PWMaintenanceDlg)
        virtual BOOL OnInitDialog();
        virtual void OnOK();
        //}}AFX_MSG
        DECLARE_MESSAGE_MAP()
};
```

```cpp
// pwmainte.cpp : implementation file
// include "stdafx.h"
include "pod.h"
#include "pwmainte.h"
#include "db-init.h"
#include "password.h"

#include <string.h>
#include <stdio.h>
include <math.h> include "db.h"

ifdef _DEBUG
undef THIS_FILE
static char BASED_CODE THIS_FILE[] = __FILE__;
endif /////////////////////////////////////////////////////////////////////////////
// PWMaintenanceDlg dialog PWMaintenanceDlg::PWMaintenanceDlg(char *aTitle, char *aID, CWnd* pParent /*=NULL*/)
        : CDialog(PWMaintenanceDlg::IDD, pParent)
{
        if ((aTitle == NULL) || (aID == NULL))
                return;
        if ((Title = new char[strlen(aTitle)+2]) == 0)
                {
                ID = 0;
                return;
                }
        if ((ID = new char[strlen(aID)+2]) == 0)
                return;
        strcpy(Title,aTitle);
        strcpy(ID,aID);

//{{AFX_DATA_INIT(PWMaintenanceDlg)
                // NOTE: the ClassWizard will add member initialization here
        //}}AFX_DATA_INIT
}

PWMaintenanceDlg::~PWMaintenanceDlg()
        {
        if (Title != 0)
                delete Title;
        if (ID != 0)
                delete ID;
        }
```

```
void PWMaintenanceDlg::DoDataExchange(CDataExchange* pDX)
{
        CDialog::DoDataExchange(pDX);
        //{{AFX_DATA_MAP(PWMaintenanceDlg)
        DDX_Control(pDX, IDC_STATIC_TITLE, m_Title);
        DDX_Control(pDX, IDC_EDIT_VERIFY, m_VerifyPassword);
        DDX_Control(pDX, IDC_EDIT_OLD, m_OldPassword);
        DDX_Control(pDX, IDC_EDIT_NEW, m_NewPassword);
        //}}AFX_DATA_MAP
}

BEGIN_MESSAGE_MAP(PWMaintenanceDlg, CDialog)
        //{{AFX_MSG_MAP(PWMaintenanceDlg)
        //}}AFX_MSG_MAP
END_MESSAGE_MAP()

char *PWMaintenanceDlg::encrypt(char *s, char *t)
        {
        double x = 0.;
        while (*t)
                {
                x *= 1.1;
                x += log((double)(*t++));
                if (x > 1.7E307)
                        x -= 1.7E307;
                }
        sprintf(s,"%lf",x);
        return s;
        }

// VerifyPassword()...return 0 for access, non-zero for no access.
int PWMaintenanceDlg::VerifyPassword(char *PWLevel, char *PWValue)
        {
        char buf[50],buf1[50];
        //
        if (PWValue == NULL)
                {
                PasswordDlg pw(buf,50);
                if (pw.DoModal() != IDOK)
                        return -1;
                }
        else
                {
                strcpy(buf,PWValue);
                }
        //
        DataBase DbConfig(ConfigName);
        PWMaintenanceDlg::encrypt(buf,buf);
        // Check for master password.
        if (DbConfig.Select("Item","michaelpw"))
                {
```

```
                ::MessageBox(0,"No passwords established.","Warning",MB_OK);
                return 1;
                }
        if (strcmp(buf,DbConfig.Get("Value",buf1)) == 0)
                return 0;
        // Check for password.
        if (DbConfig.Select("Item",PWLevel))
                return 2;
        if (strcmp(buf,DbConfig.Get("Value",buf1)) == 0)
                return 0;
        ::MessageBox(0,"Incorrect password.","Warning",MB_OK);
        return 3;
        }

/////////////////////////////////////////////////////////////////
// PWMaintenanceDlg message handlers BOOL PWMaintenanceDlg::OnInitDialog()
{
        CDialog::OnInitDialog();

// TODO: Add extra initialization here
        m_Title.SetWindowText(Title);

return TRUE;  // return TRUE  unless you set the focus to a control
} void PWMaintenanceDlg::OnOK()
{
        // TODO: Add extra validation here
        char OldBuf[50],NewBuf[50],VerifyBuf[50];
        // Get the inputs.
        m_OldPassword.GetWindowText(OldBuf,50);
        m_NewPassword.GetWindowText(NewBuf,50);
        m_VerifyPassword.GetWindowText(VerifyBuf,50);
        // Verify the new password.
        if (strcmp(NewBuf,VerifyBuf))
                {
                MessageBox("New password not verified.  Password not changed.");
                m_NewPassword.SetFocus();
                m_NewPassword.SetSel(0,-1);
                return;
                }
        // Verify the old password.
        if (VerifyPassword(ID,OldBuf))
                {
                OnCancel();
                return;
                }
        // Encrypt the new password.
        encrypt(NewBuf,NewBuf);
```

```
// Look up the old password in the configuration database.
DataBase DbConfig(ConfigName);
if (DbConfig.Select("Item",ID))
        {
        OnCancel();
        return;
        }
// Save the new password.
DbConfig.Assign("Value",NewBuf);

CDialog::OnOK();
}
```

```cpp
// printcon.cpp : implementation file
//
include "stdafx.h"

#include <math.h>
#include <stdlib.h>
#include <stdio.h>
#include <memory.h>
#include <string.h>
#include <io.h>
#include <errno.h>
include <dos.h> include <commdlg.h> include "pctl.h"

include "pod.h"
#include "printcon.h"
#include "db-init.h"

#include "db.h"

ifdef _DEBUG
undef THIS_FILE
static char BASED_CODE THIS_FILE[] = __FILE__;
endif /////////////////////////////////////////////////////////////////////
// PrintControlDlg dialog PrintControlDlg::PrintControlDlg(long aId, CWnd* pParent /*=NULL*/)
        : CDialog(PrintControlDlg::IDD, pParent), Id(aId)
{
        char buf[100];
        // Get the default and maximum number of copies allowed.
        GetPrivateProfileString("Printing Defaults","Default Copies","0",buf,50,"pod.ini");
        DefaultCopies = strtol(buf,NULL,10);
        GetPrivateProfileString("Printing Defaults","Maximum Copies","0",buf,50,"pod.ini");
        MaxCopies = strtol(buf,NULL,10);
        //{{AFX_DATA_INIT(PrintControlDlg)
                // NOTE: the ClassWizard will add member initialization here
        //}}AFX_DATA_INIT
} void PrintControlDlg::DoDataExchange(CDataExchange* pDX)
{
        CDialog::DoDataExchange(pDX);
        //{{AFX_DATA_MAP(PrintControlDlg)
        DDX_Control(pDX, IDC_CLEAR, m_ButtonClear);
        DDX_Control(pDX, IDC_BACK, m_ButtonBack);
        DDX_Control(pDX, IDC_BUTTON9, m_Button9);
```

```
        DDX_Control(pDX, IDC_BUTTON8, m_Button8);
        DDX_Control(pDX, IDC_BUTTON7, m_Button7);
        DDX_Control(pDX, IDC_BUTTON6, m_Button6);
        DDX_Control(pDX, IDC_BUTTON5, m_Button5);
        DDX_Control(pDX, IDC_BUTTON4, m_Button4);
        DDX_Control(pDX, IDC_BUTTON3, m_Button3);
        DDX_Control(pDX, IDC_BUTTON2, m_Button2);
        DDX_Control(pDX, IDC_BUTTON10, m_Button10);
        DDX_Control(pDX, IDC_BUTTON1, m_Button1);
        DDX_Control(pDX, IDPRINT, m_Print);
        DDX_Control(pDX, IDCANCEL, m_Cancel);
        DDX_Control(pDX, IDC_STATIC_DISPLAY, m_Display);
        //}}AFX_DATA_MAP
}

BEGIN_MESSAGE_MAP(PrintControlDlg, CDialog)
        //{{AFX_MSG_MAP(PrintControlDlg)
        ON_WM_CLOSE()
        ON_BN_CLICKED(IDC_CLEAR, OnClear)
        ON_BN_CLICKED(IDC_BUTTON1, OnButton1)
        ON_BN_CLICKED(IDC_BUTTON10, OnButton10)
        ON_BN_CLICKED(IDC_BUTTON2, OnButton2)
        ON_BN_CLICKED(IDC_BUTTON3, OnButton3)
        ON_BN_CLICKED(IDC_BUTTON4, OnButton4)
        ON_BN_CLICKED(IDC_BUTTON5, OnButton5)
        ON_BN_CLICKED(IDC_BUTTON6, OnButton6)
        ON_BN_CLICKED(IDC_BUTTON7, OnButton7)
        ON_BN_CLICKED(IDC_BUTTON8, OnButton8)
        ON_BN_CLICKED(IDC_BUTTON9, OnButton9)
        ON_BN_CLICKED(IDC_BACK, OnBack)
        ON_BN_CLICKED(IDPRINT, OnPrint)
        //}}AFX_MSG_MAP
END_MESSAGE_MAP()

/////////////////////////////////////////////////////////////////////////////
// PrintControlDlg message handlers void PrintControlDlg::OnClose()
{
        // TODO: Add your message handler code here and/or call default CDialog::OnClose();
} void PrintControlDlg::OnClear()
{
        // TODO: Add your control notification handler code here
        char buf[20];
        Copies = 0;
        m_Display.SetWindowText(ltoa(Copies,buf,10));
}

BOOL PrintControlDlg::OnInitDialog()
```

```
{
        CDialog::OnInitDialog();

// TODO: Add extra initialization here
        char buf[20];
        Copies = DefaultCopies;
        m_Display.SetWindowText(ltoa(Copies,buf,10));

return TRUE;  // return TRUE  unless you set the focus to a control
} void PrintControlDlg::NumberButton(int id)
        {
        char buf[50];
        // Allow calculator style entry for enough places for MaxCopies.
        // Need to calc how wide num is the mod with 10 to that power.
        // Put this in init for optimization.
        long x = MaxCopies;
        int Width = 0;
        while (x /= 10) Width++;
        if (MaxCopies > 0L)
                Copies %= (long)pow(10.,(double)Width);
        // Don't let the resource overflow.
        if (Copies > 100000L)
                Copies %= 100000L;
        Copies *= 10;
        Copies += id;
        if ((MaxCopies > 0L) && (Copies > MaxCopies))
                Copies = MaxCopies;
        m_Display.SetWindowText(ltoa(Copies,buf,10));
        } void PrintControlDlg::OnButton1()
{
        // TODO: Add your control notification handler code here
        NumberButton(1);
} void PrintControlDlg::OnButton10()
{
        // TODO: Add your control notification handler code here
        NumberButton(0);
} void PrintControlDlg::OnButton2()
{
        // TODO: Add your control notification handler code here
        NumberButton(2);
} void PrintControlDlg::OnButton3()
{
```

```
            // TODO: Add your control notification handler code here
            NumberButton(3);
} void PrintControlDlg::OnButton4()
{
            // TODO: Add your control notification handler code here
            NumberButton(4);
} void PrintControlDlg::OnButton5()
{
            // TODO: Add your control notification handler code here
            NumberButton(5);
} void PrintControlDlg::OnButton6()
{
            // TODO: Add your control notification handler code here
            NumberButton(6);
} void PrintControlDlg::OnButton7()
{
            // TODO: Add your control notification handler code here
            NumberButton(7);
} void PrintControlDlg::OnButton8()
{
            // TODO: Add your control notification handler code here
            NumberButton(8);
} void PrintControlDlg::OnButton9()
{
            // TODO: Add your control notification handler code here
            NumberButton(9);
} void PrintControlDlg::OnBack()
{
            // TODO: Add your control notification handler code here
            char buf[20];
            Copies /= 10;
            m_Display.SetWindowText(ltoa(Copies,buf,10));
} void PrintControlDlg::UpdateUsage()
            {
            char buf[100];
            //char buf1[100];
            struct _dosdate_t dt;
```

```
        DataBase DbUsage(UsageName);
        _dos_getdate(&dt);
        sprintf(buf,"%04u%02hu%02hu",dt.year,dt.month,dt.day);
        //sprintf(buf1,"DocId=%ld\nDate=<<%s>>",FileId,buf);
        //MessageBox(buf1);
        // If the document has already been printed today, accumulate in that record.
        if (DbUsage.Select("Date",buf) == 0)
                {
                for (; DbUsage.Eof()==0; DbUsage.Skip(1))
                        {
                        if (DbUsage.GetLong("DocId") == Id)
                                {
DbUsage.AssignLong("Quantity",DbUsage.GetLong("Quantity")+Copies);
                                return;
                                }
                        }
                }
        // If the document hasn't been printed today, add a record.
        DbUsage.AppendBlank();
        DbUsage.Assign("Date",buf);
        DbUsage.AssignLong("DocId",Id);
        DbUsage.AssignLong("Quantity",Copies);
        } void PrintControlDlg::OnPrint()
        {
        char buf[250],*fbuf;
        long KitId,i,ii;
        // Put up print message and disable buttons.
        m_Print.EnableWindow(0);
        m_Cancel.EnableWindow(0);
        m_Button1.EnableWindow(0);
        m_Button2.EnableWindow(0);
        m_Button3.EnableWindow(0);
        m_Button4.EnableWindow(0);
        m_Button5.EnableWindow(0);
        m_Button6.EnableWindow(0);
        m_Button7.EnableWindow(0);
        m_Button8.EnableWindow(0);
        m_Button9.EnableWindow(0);
        m_Button10.EnableWindow(0);
        m_ButtonClear.EnableWindow(0);
        m_ButtonBack.EnableWindow(0);
        m_Display.SetWindowText("Printing...");
        // Get the Document Directory.
        GetPrivateProfileString("System Defaults","DocumentDirectory","c:\\",buf,200,"pod.ini");
        if ( *(buf + strlen(buf) - 1) != '\\')
                strcat(buf,"\\");
        // Get the file name.
        DataBase DbDocument(DocumentName);
        if (DbDocument.Select("Id",Id))
                {
```

```
                    MessageBox("Invalid file id.");
                    OnCancel();
                    return;
                    }
        // If it is a kit, print all of the files in the kit.
        fbuf = buf + strlen(buf);
        if (strcmp(DbDocument.Get("File",fbuf),"*") == 0)
                    {
                    KitId = Id;
                    //MessageBox("This is a kit.");
                    DataBase DbKitLink(KitLinkName);
                    // Collate the kits.  Don't accumulate Copies*Copies into usage database.
                    ii = Copies;
                    Copies = 1L;
                    for (i=0; i<ii; i++)
                                {
                                if (DbKitLink.Select("KitId",KitId))
                                            {
                                            MessageBox("This kit has no
documents.","Status",MB_OK|MB_ICONINFORMATION);
                                            OnCancel();
                                            return;
                                            }
                                for (; DbKitLink.Eof()==0; DbKitLink.Skip(1))
                                            {
                                            Id = DbKitLink.GetLong("DocId");        // set Id for
UpdateUsage()
                                            if (DbDocument.Select("Id",Id) == 0)
                                                        {
                                                        DbDocument.Get("File",fbuf);
                                                        UpdateUsage();
                                                        VCET_PrintFile(buf,1);
                                                        }
                                            }
                                }
                    Copies = ii;
                    Id = KitId;
                    OnCancel();
                    return;
                    }

UpdateUsage();
        VCET_PrintFile(buf,(int)Copies);
        OnCancel();
        }

/*      // This is the batch printing work around I used until CSI finally managed,
        // after several months, to get their API to work with post script files.
        // To use it, comment out everything from the VCET_PrintFile() call to the
        // function ending } in the lines above.
        char FileName[250];
        strcpy(FileName,buf);
        char *fn = "podprint.bat";
        FILE *fp;
```

```
                UINT err;
                //char buf[100];
                int toggle=0;

if (_access(fn,00) == 0)
                        m_Display.SetWindowText("Printing...");
                while (_access(fn,00) == 0)
                        WaitMessage();
                m_Display.SetWindowText(ltoa(Copies,buf,10));

if ((fp = fopen(fn,"w")) == NULL)
                        {
                        MessageBox("Error creating print batch.");
                        return;
                        }
                fprintf(fp,"@echo off\n\n");
//              fprintf(fp,"prompt $p$g$e[0;37;44m\ncls\n");
                fprintf(fp,"echo.\necho.\n");
                fprintf(fp,"echo                    P R I N T   M O N I T O R\n\n");
                fprintf(fp,"echo.\necho.\n\n");
                for (long i=1L; i<=Copies; i++)
                        {
                        fprintf(fp,"echo Printing copy %ld of %ld.\n",i,Copies);
//                      fprintf(fp,"copy %s lpt1:\n\n",FileName);
                        fprintf(fp,"print %s \n\n",FileName);
                        }
                fprintf(fp,"del %s\n",fn);
                fclose(fp);
                err = WinExec(fn,SW_HIDE);
                if (err < 32)
                        {
                        sprintf(buf,"Error %u",err);
                        MessageBox(buf);
                        }
                OnCancel();
                }
*/

BOOL CALLBACK AbortProc(HDC hdc, int error)
        {
        if (error != 0 && error != SP_OUTOFDISK)
                {
                // Unrecoverable error.
                return FALSE;
                }
        else
                {
                MSG msg;
                while (PeekMessage(&msg,0,0,0,PM_REMOVE))
                        {
                        TranslateMessage(&msg);
                        DispatchMessage(&msg);
                        }
                }
```

```
            return TRUE;
        } void VCET_PrintFile(LPSTR FileName, int nCopies)
        {
        PRINTDLG pd;
//      RECT rec={2000,2000,2550,3450};         // Create the control offscreen.
        RECT rec={2000,2000,850,1150};          // Create the control offscreen.
        int err;
        char buf[100];
        HWND handle;
        PAN_CtlFileInfo FileInfo;
        PAN_CtlPrintOptions PrintOptions;
        char c_footertxt[256];
//      FARPROC lpAbortProc; // Printer abort procedure.
        DWORD status;
        int i;
        LOGFONT fnt;
        HANDLE hInst = AfxGetInstanceHandle();
        CWinApp *cp = AfxGetApp();
        HWND hMainWnd = cp->m_pMainWnd->m_hWnd;
        HWND DeskTopWnd;
        RECT DeskTopRect;
        int FontSize;

// Developed at 800*600 resolution.  Scale to any screen resolution for views.
        DeskTopWnd = GetDesktopWindow();
        GetWindowRect(DeskTopWnd,&DeskTopRect);
        //sprintf(buf,"Desk Top Window Rectangle\nleft=%d\ntop=%d\nright=%d\nbottom=%d\n",
        //      DeskTopRect.left,DeskTopRect.top,DeskTopRect.right,DeskTopRect.bottom);
        //MessageBox(NULL,buf,"Information",MB_APPLMODAL);
        if (DeskTopRect.right >= 800)
                FontSize = -10;
        else
                FontSize = -9;
                //FontSize = (int)((-10. * (double)DeskTopRect.right / 800.) + .5);
        //

WritePrivateProfileString("Options","psmindpi","300","pctl.ini");
//      Tried to fix scaling by going back to low resolution.  Didn't work.
//      WritePrivateProfileString("Options","psmindpi","75","pctl.ini");

// Load the image
        if ((handle = PAN_CreateControl(NULL,0,&rec,NULL,NULL)) == NULL)
                {
                MessageBox(NULL,"PAN_CreateControl...Error","DEBUG",MB_APPLMODAL);
                return;
                }

ShowWindow(handle,SW_SHOW);
        err = (int)SendMessage(handle,PM_CTLSETFILE,(WPARAM)-1,(LPARAM)(LPSTR)FileName);
        if (err != PAN_CTLERRNONE)
                {
```

```
            wsprintf(buf,"Error on PM_CTLSETFILE Code = %d",err);
            MessageBox(NULL,buf,"DEBUG",MB_APPLMODAL);
            return;
            }

// Force a paint
    SendMessage(handle,PM_CTLPAINT,0,0);

// Zoom to extents
    memset(&FileInfo,0,sizeof(PAN_CtlFileInfo));
    SendMessage(handle,PM_CTLGETFILE,(WPARAM)0,(LPARAM)(PAN_CtlFileInfo FAR *)&FileInfo);
        if (FileInfo.type == PAN_RasterFile || FileInfo.type == PAN_VectorFile)
            {

SendMessage(handle,PM_CTLSETLMBACTION,(WPARAM)PAN_CTLLMBZOOM,(LPARAM)0);
            SendMessage(handle,WM_RBUTTONDOWN,0,0);
            SendMessage(handle,WM_RBUTTONUP,0,0);
            }
    // Switch to fixed font for ASCII files such as the reports.
        if (strcmp(FileInfo.desc,"ASCII Text") == 0)
            {
            err = (int)::SendMessage(handle,PM_CTLGETBASEFONT,0,(LPARAM)(LPLOGFONT) &fnt);
            if (err != PAN_CTLERRNONE)
                    MessageBox(NULL,"Error on PM_CTLGETBASEFONT.","Status",MB_APPLMODAL);
            //fnt.lfHeight = -10;
            fnt.lfHeight = FontSize;
            fnt.lfWeight = FW_BOLD;
            strcpy(fnt.lfFaceName,"Courier New");
            err = (int)::SendMessage(handle,PM_CTLSETBASEFONT,0,(LPARAM)(LOGFONT FAR *) &fnt);
            if (err != PAN_CTLERRNONE)
                    MessageBox(NULL,"Error on PM_CTLSETBASEFONT.","Status",MB_APPLMODAL);
            }

// Get system printer information
    memset(&pd,0,sizeof(PRINTDLG));
    pd.lStructSize = sizeof(PRINTDLG);
    pd.Flags = PD_RETURNDC | PD_RETURNDEFAULT;
    pd.hwndOwner = handle;
    if (PrintDlg(&pd) == 0)
            {
            MessageBox(NULL,"Error...unable to initialize printer","DEBUG",MB_APPLMODAL);
            return;
            } pd.Flags = PD_RETURNDC | PD_RETURNIC;
    pd.nCopies = 1;
    pd.nFromPage = 1;
```

```
          pd.nToPage = 0x7FFF;  // 0x0001 for single page gives big speed increase
          pd.nToPage = abs(FileInfo.nPages);      // Note in readme.txt says neg bit could be set
//        sprintf(buf,"nPages = %d",FileInfo.nPages);
//        MessageBox(NULL,buf,"nPages",MB_OK);
          pd.nMinPage = 0x0001;
          pd.nMaxPage = 0x7FFF;

// Set the CSI VCET print options
          memset(&PrintOptions,0,sizeof(PAN_CtlPrintOptions));
          // Printer DC structure
          PrintOptions.printDlg = &pd;
          // Print to fit
          PrintOptions.units = CTLUNIT_PIXEL;
          PrintOptions.nImageUnits = 0;
          PrintOptions.nPaperUnits = 0;
          // Margins
          PrintOptions.margins.units = CTLUNIT_INCH;
          PrintOptions.margins.top = 0.1;
          PrintOptions.margins.left = 0.1;
          PrintOptions.margins.bottom = 0.1;
          PrintOptions.margins.right = 0.1;
          // Headers & Footers
          lstrcpy(PrintOptions.headers.font.lfFaceName,"Arial");
          PrintOptions.headers.font.lfHeight = -10;
          // If ini says to, print file name in footer.
          GetPrivateProfileString("Printing Defaults","FileName","",buf,100,"pod.ini");
          if (strcmp(buf,"footer") == 0)
                  {
                  wsprintf(c_footertxt,"Filename = %s",FileName);
                  PrintOptions.headers.botCtrText = c_footertxt;
                  }

// Set AbortProc
//        lpAbortProc = MakeProcInstance(AbortProc,hInst);
//        SetAbortProc(PrintOptions.printDlg->hDC,lpAbortProc);
          SetAbortProc(PrintOptions.printDlg->hDC,AbortProc);

// Important:  Disable the main window to avoid reentrancy problems
          EnableWindow(hMainWnd,FALSE);

while (nCopies-- > 0)
                  {
                  err = (int)SendMessage(handle,PM_CTLPRINT,(WORD)-1,
                          (LPARAM)(PAN_CtlPrintOptions FAR *)&PrintOptions);
                  }
          if (err != PAN_CTLERRNONE)
                  {
                  // CSI has problem...always return err=8 on Post Script multiple copies.
                  // Doesn't seem to cause problem, so ignore it.
                  if (FileInfo.type != PAN_RasterFile && FileInfo.type != PAN_VectorFile)
                          {
                          wsprintf(buf,"Error on PM_CTLPRINT.  Code = %d",err);
                          MessageBox(NULL,buf,"DEBUG",MB_APPLMODAL);
                          }
```

```
            }
    status = PAN_CTLSTATUSIDLE;
    SendMessage(handle,PM_CTLGETSTATUS,0,(LPARAM)(LPVOID)&status);
    SendMessage(handle,PM_CTLDESTROY,0,0);
    for (i=0; (i<10) && status != PAN_CTLSTATUSIDLE; i++)
            {
            SendMessage(handle,PM_CTLGETSTATUS,0,(LPARAM)(LPVOID)&status);
            }
    if (status == PAN_CTLSTATUSIDLE)
            {
            DestroyWindow(handle);
            }
//  FreeProcInstance(lpAbortProc);
    EnableWindow(hMainWnd,TRUE);
    DeleteDC(pd.hDC);
    WritePrivateProfileString("Options","psmindpi","75","pctl.ini");
    }
```

```
// password.h : header file
//

/////////////////////////////////////////////////////////////////
// Password dialog class Password : public CDialog
{
// Construction
public:
        Password(CWnd* pParent = NULL);     // standard constructor // Dialog Data
        //{{AFX_DATA(Password)
        enum { IDD = IDD_DIALOG9 };
        CEdit   m_PassWord;
        //}}AFX_DATA // Implementation
protected:
        virtual void DoDataExchange(CDataExchange* pDX);    // DDX/DDV support // Generated message map functions
        //{{AFX_MSG(Password)
        virtual void OnOK();
        //}}AFX_MSG
        DECLARE_MESSAGE_MAP()
};
```

```cpp
// password.cpp : implementation file
// include "stdafx.h"
include "pod.h"
#include "password.h"

#ifdef _DEBUG
undef THIS_FILE
static char BASED_CODE THIS_FILE[] = __FILE__;
endif /////////////////////////////////////////////////////////////////////////////
// Password dialog Password::Password(CWnd* pParent /*=NULL*/)
        : CDialog(Password::IDD, pParent)
{
        //{{AFX_DATA_INIT(Password)
                // NOTE: the ClassWizard will add member initialization here
        //}}AFX_DATA_INIT
} void Password::DoDataExchange(CDataExchange* pDX)
{
        CDialog::DoDataExchange(pDX);
        //{{AFX_DATA_MAP(Password)
        DDX_Control(pDX, IDC_EDIT1, m_PassWord);
        //}}AFX_DATA_MAP
}

BEGIN_MESSAGE_MAP(Password, CDialog)
        //{{AFX_MSG_MAP(Password)
        //}}AFX_MSG_MAP
END_MESSAGE_MAP()

/////////////////////////////////////////////////////////////////////////////
// Password message handlers void Password::OnOK()
{
        // TODO: Add extra validation here
        char buf[30];
        m_PassWord.GetWindowText(buf,30);
        if (strcmp(buf,"mike") == 0)
                {
                MessageBox("Let us begin.");
                }
        CDialog::OnOK();
}
```

```
//{{NO_DEPENDENCIES}}
// App Studio generated include file.
// Used by POD.RC
//
#define IDR_MAINFRAME              2
#define ID_ZOOM_TO_EXTENTS         2
#define IDVIEW                     3
#define ID_ZOOM_UP                 3
#define ID_ZOOM_DOWN               4
#define IDALL                      6
#define IDGROUP                    7
#define IDDOCUMENT                 8
#define IDD_ABOUTBOX               100
#define IDD_DIALOG1                102
#define IDD_DIALOG2                103
#define IDD_DIALOG3                104
#define IDD_DIALOG4                105
#define IDI_ICON1                  109
#define IDI_ICON2                  110
#define IDD_DIALOG5                116
#define IDD_DIALOG6                118
#define IDD_DIALOG7                120
#define IDD_DIALOG8                121
#define IDD_DIALOG9                123
#define IDD_DIALOG10               124
#define IDD_DIALOG11               125
#define IDD_DIALOG12               126
#define IDD_DIALOG13               127
#define IDD_DIALOG14               128
#define IDD_DIALOG15               129
#define IDD_DIALOG16               130
#define IDC_LIST1                  1000
#define IDC_LIST2                  1001
#define IDC_STATIC_TITLE           1002
#define IDC_STATIC_DESCRIPTION     1003
#define IDPRINT                    1004
#define IDC_STATIC_VIEW            1005
#define IDC_BUTTON1                1007
#define IDC_BUTTON2                1008
#define IDC_BUTTON3                1009
#define IDC_BUTTON4                1010
#define IDC_BUTTON5                1011
#define IDC_BUTTON6                1012
#define IDC_BUTTON7                1013
#define IDC_BUTTON8                1014
#define IDC_BUTTON9                1015
#define IDC_BUTTON10               1016
#define IDC_CLEAR                  1017
#define IDC_BACK                   1018
#define IDC_STATIC_DISPLAY         1019
#define IDC_LEFTLOGO               1022
#define IDC_RIGHTLOGO              1023
#define IDC_STATIC_LEFT_TITLE      1024
#define IDC_STATIC_RIGHT_TITLE     1025
```

```
#define IDC_COMBO1              1026
#define IDC_COMBO2              1027
#define IDC_ADD_GROUP           1028
#define IDC_RENAME_GROUP        1029
#define IDC_DELETE_GROUP        1030
#define IDC_ADD                 1032
#define IDC_MODIFY              1033
#define IDC_DELETE              1034
#define IDC_EDIT1               1035
#define IDC_ADD2                1035
#define IDC_EDIT_DESCRIPTION    1036
#define IDC_EDIT_NEW            1036
#define IDC_STATIC_PROMPT       1037
#define IDC_DELETE2             1037
#define IDC_EDIT_VERIFY         1037
#define IDC_STATIC_FILE         1038
#define IDC_EDIT_NAME           1039
#define IDC_STATIC_AVAILABLE    1040
#define IDC_STATIC_PICK         1041
#define IDC_STATIC_NAME         1042
#define IDC_CHECK_VIEW          1045
#define IDC_CHECK_PRINT         1046
#define IDC_STATIC_DOCUMENT     1047
#define IDC_STATIC_GROUP        1048
#define IDC_STATIC_ZOOM         1049
#define IDC_EDIT_OLD            1050
#define IDC_BUTTON_DOCUMENT     1051
#define IDC_BUTTON_KIT          1052
#define IDC_BUTTON_GROUP        1053
#define IDC_BUTTON_MASTER       1054
#define IDC_BUTTON_RESET        1055
#define ID_FILE_MAINTENANCE     32772
#define ID_FILE_REPORTS         32773
#define ID_MAINTENANCE_KIT      32775
#define ID_MAINTENANCE_DOCUMENT 32776
#define ID_MAINTENANCE_GROUP    32777
#define ID_MAINTENANCE_DB       32778
#define ID_REPORTS_VIEWER       32779
#define ID_REPORTS_USAGE        32780
#define ID_REPORTS_PRINTER      32781
#define ID_MAINTENANCE_SECURITY 32782

// Next default values for new objects
//
#ifdef APSTUDIO_INVOKED
ifndef APSTUDIO_READONLY_SYMBOLS define _APS_NEXT_RESOURCE_VALUE    131
define _APS_NEXT_COMMAND_VALUE     32783
#define _APS_NEXT_CONTROL_VALUE     1056
#define _APS_NEXT_SYMED_VALUE       101
#endif
#endif
```

```
//{{NO_DEPENDENCIES}}
// App Studio generated include file.
// Used by POD.RC
//
#define IDR_MAINFRAME            2
#define ID_ZOOM_TO_EXTENTS       2
#define IDVIEW                   3
#define ID_ZOOM_UP               3
#define ID_ZOOM_DOWN             4
#define IDALL                    6
#define IDGROUP                  7
#define IDDOCUMENT               8
#define IDD_ABOUTBOX             100
#define IDD_DIALOG1              102
#define IDD_DIALOG2              103
#define IDD_DIALOG3              104
#define IDD_DIALOG4              105
#define IDI_ICON1                109
#define IDI_ICON2                110
#define IDD_DIALOG5              116
#define IDD_DIALOG6              118
#define IDD_DIALOG7              120
#define IDD_DIALOG8              121
#define IDD_DIALOG9              123
#define IDD_DIALOG10             124
#define IDD_DIALOG11             125
#define IDD_DIALOG12             126
#define IDD_DIALOG13             127
#define IDD_DIALOG14             128
#define IDD_DIALOG15             129
#define IDD_DIALOG16             130
#define IDC_LIST1                1000
#define IDC_LIST2                1001
#define IDC_STATIC_TITLE         1002
#define IDC_STATIC_DESCRIPTION   1003
#define IDPRINT                  1004
#define IDC_STATIC_VIEW          1005
#define IDC_BUTTON1              1007
#define IDC_BUTTON2              1008
#define IDC_BUTTON3              1009
#define IDC_BUTTON4              1010
#define IDC_BUTTON5              1011
#define IDC_BUTTON6              1012
#define IDC_BUTTON7              1013
#define IDC_BUTTON8              1014
#define IDC_BUTTON9              1015
#define IDC_BUTTON10             1016
#define IDC_CLEAR                1017
#define IDC_BACK                 1018
#define IDC_STATIC_DISPLAY       1019
#define IDC_LEFTLOGO             1022
#define IDC_RIGHTLOGO            1023
#define IDC_STATIC_LEFT_TITLE    1024
#define IDC_STATIC_RIGHT_TITLE   1025
```

```
#define IDC_COMBO1              1026
#define IDC_COMBO2              1027
#define IDC_ADD_GROUP           1028
#define IDC_RENAME_GROUP        1029
#define IDC_DELETE_GROUP        1030
#define IDC_ADD                 1032
#define IDC_MODIFY              1033
#define IDC_DELETE              1034
#define IDC_EDIT1               1035
#define IDC_ADD2                1035
#define IDC_EDIT_DESCRIPTION    1036
#define IDC_EDIT_NEW            1036
#define IDC_STATIC_PROMPT       1037
#define IDC_DELETE2             1037
#define IDC_EDIT_VERIFY         1037
#define IDC_STATIC_FILE         1038
#define IDC_EDIT_NAME           1039
#define IDC_STATIC_AVAILABLE    1040
#define IDC_STATIC_PICK         1041
#define IDC_STATIC_NAME         1042
#define IDC_CHECK_VIEW          1045
#define IDC_CHECK_PRINT         1046
#define IDC_STATIC_DOCUMENT     1047
#define IDC_STATIC_GROUP        1048
#define IDC_STATIC_ZOOM         1049
#define IDC_EDIT_OLD            1050
#define IDC_BUTTON_DOCUMENT     1051
#define IDC_BUTTON_KIT          1052
#define IDC_BUTTON_GROUP        1053
#define IDC_BUTTON_MASTER       1054
#define IDC_BUTTON_RESET        1055
#define ID_FILE_MAINTENANCE     32772
#define ID_FILE_REPORTS         32773
#define ID_MAINTENANCE_KIT      32775
#define ID_MAINTENANCE_DOCUMENT 32776
#define ID_MAINTENANCE_GROUP    32777
#define ID_MAINTENANCE_DB       32778
#define ID_REPORTS_VIEWER       32779
#define ID_REPORTS_USAGE        32780
#define ID_REPORTS_PRINTER      32781
#define ID_MAINTENANCE_SECURITY 32782

// Next default values for new objects
//
#ifdef APSTUDIO_INVOKED
ifndef APSTUDIO_READONLY_SYMBOLS define _APS_NEXT_RESOURCE_VALUE    131
define _APS_NEXT_COMMAND_VALUE     32783
#define _APS_NEXT_CONTROL_VALUE     1056
#define _APS_NEXT_SYMED_VALUE       101
#endif
#endif
```

```
// security.h : header file
//

/////////////////////////////////////////////////////////////////////
// SecurityDlg dialog class SecurityDlg : public CDialog
{
// Construction
public:
        SecurityDlg(CWnd* pParent = NULL);   // standard constructor // Dialog Data
        //{{AFX_DATA(SecurityDlg)
        enum { IDD = IDD_DIALOG16 };
                // NOTE: the ClassWizard will add data members here
        //}}AFX_DATA // Implementation
protected:
        virtual void DoDataExchange(CDataExchange* pDX);    // DDX/DDV support // Generated message map functions
        //{{AFX_MSG(SecurityDlg)
        afx_msg void OnButtonDocument();
        afx_msg void OnButtonGroup();
        afx_msg void OnButtonKit();
        afx_msg void OnButtonMaster();
        afx_msg void OnButtonReset();
        //}}AFX_MSG
        DECLARE_MESSAGE_MAP()
};
```

```cpp
// security.h : header file
//

/////////////////////////////////////////////////////////////////
// SecurityDlg dialog class SecurityDlg : public CDialog
{
// Construction
public:
        SecurityDlg(CWnd* pParent = NULL);   // standard constructor // Dialog Data
        //{{AFX_DATA(SecurityDlg)
        enum { IDD = IDD_DIALOG16 };
                // NOTE: the ClassWizard will add data members here
        //}}AFX_DATA // Implementation
protected:
        virtual void DoDataExchange(CDataExchange* pDX);    // DDX/DDV support // Generated message map functions
        //{{AFX_MSG(SecurityDlg)
        afx_msg void OnButtonDocument();
        afx_msg void OnButtonGroup();
        afx_msg void OnButtonKit();
        afx_msg void OnButtonMaster();
        afx_msg void OnButtonReset();
        //}}AFX_MSG
        DECLARE_MESSAGE_MAP()
};
```

```
// security.h : header file
//

/////////////////////////////////////////////////////////////////////
// SecurityDlg dialog class SecurityDlg : public CDialog
{
// Construction
public:
        SecurityDlg(CWnd* pParent = NULL);   // standard constructor // Dialog Data
        //{{AFX_DATA(SecurityDlg)
        enum { IDD = IDD_DIALOG16 };
                // NOTE: the ClassWizard will add data members here
        //}}AFX_DATA // Implementation
protected:
        virtual void DoDataExchange(CDataExchange* pDX);    // DDX/DDV support // Generated message map functions
        //{{AFX_MSG(SecurityDlg)
        afx_msg void OnButtonDocument();
        afx_msg void OnButtonGroup();
        afx_msg void OnButtonKit();
        afx_msg void OnButtonMaster();
        afx_msg void OnButtonReset();
        //}}AFX_MSG
        DECLARE_MESSAGE_MAP()
};
```

```cpp
// security.cpp : implementation file
// include "stdafx.h"
include "pod.h"
#include "security.h"
#include "pwmainte.h"
#include "db-init.h"

#include "db.h"

ifdef _DEBUG
undef THIS_FILE
static char BASED_CODE THIS_FILE[] = __FILE__;
endif /////////////////////////////////////////////////////////////////////////////
// SecurityDlg dialog SecurityDlg::SecurityDlg(CWnd* pParent /*=NULL*/)
        : CDialog(SecurityDlg::IDD, pParent)
{
        //{{AFX_DATA_INIT(SecurityDlg)
                // NOTE: the ClassWizard will add member initialization here
        //}}AFX_DATA_INIT
} void SecurityDlg::DoDataExchange(CDataExchange* pDX)
{
        CDialog::DoDataExchange(pDX);
        //{{AFX_DATA_MAP(SecurityDlg)
                // NOTE: the ClassWizard will add DDX and DDV calls here
        //}}AFX_DATA_MAP
}

BEGIN_MESSAGE_MAP(SecurityDlg, CDialog)
        //{{AFX_MSG_MAP(SecurityDlg)
        ON_BN_CLICKED(IDC_BUTTON_DOCUMENT, OnButtonDocument)
        ON_BN_CLICKED(IDC_BUTTON_GROUP, OnButtonGroup)
        ON_BN_CLICKED(IDC_BUTTON_KIT, OnButtonKit)
        ON_BN_CLICKED(IDC_BUTTON_MASTER, OnButtonMaster)
        ON_BN_CLICKED(IDC_BUTTON_RESET, OnButtonReset)
        //}}AFX_MSG_MAP
END_MESSAGE_MAP()

/////////////////////////////////////////////////////////////////////////////
// SecurityDlg message handlers void SecurityDlg::OnButtonDocument()
{
        // TODO: Add your control notification handler code here
        PWMaintenanceDlg pwm("Change Document Password","documentpw");
```

```
        pwm.DoModal();
} void SecurityDlg::OnButtonGroup()
{
        // TODO: Add your control notification handler code here
        PWMaintenanceDlg pwm("Change Library Password","grouppw");
        pwm.DoModal();
} void SecurityDlg::OnButtonKit()
{
        // TODO: Add your control notification handler code here
        PWMaintenanceDlg pwm("Change Kit Password","kitpw");
        pwm.DoModal();
} void SecurityDlg::OnButtonMaster()
{
        // TODO: Add your control notification handler code here
        PWMaintenanceDlg pwm("Change Master Password","michaelpw");
        pwm.DoModal();
} void SecurityDlg::OnButtonReset()
{
        // TODO: Add your control notification handler code here
        char buf[30];
        if (PWMaintenanceDlg::VerifyPassword("michaelpw"))
                return;
        DataBase DbConfig(ConfigName);
        if (DbConfig.Select("Item","michaelpw") == 0)
                DbConfig.Assign("Value",PWMaintenanceDlg::encrypt(buf,"mls@src"));
        if (DbConfig.Select("Item","documentpw") == 0)
                DbConfig.Assign("Value",PWMaintenanceDlg::encrypt(buf,"src"));
        if (DbConfig.Select("Item","kitpw") == 0)
                DbConfig.Assign("Value",PWMaintenanceDlg::encrypt(buf,"src"));
        if (DbConfig.Select("Item","grouppw") == 0)
                DbConfig.Assign("Value",PWMaintenanceDlg::encrypt(buf,"src"));
}
```

```
// selectdo.h : header file
//

/////////////////////////////////////////////////////////////////////
// SelectDocumentDlg dialog class SelectDocumentDlg : public CDialog
{
// Construction
        int What;
        long GroupId;
public:
        SelectDocumentDlg(int aWhat=0, CWnd* pParent = NULL);   // standard constructor // Dialog Data
        //{{AFX_DATA(SelectDocumentDlg)
        enum { IDD = IDD_DIALOG8 };
        CStatic  m_PickTitle;
        CListBox    m_Document;
        CComboBox   m_Group;
        //}}AFX_DATA
        long DocId;

// Implementation
protected:
        virtual void DoDataExchange(CDataExchange* pDX);    // DDX/DDV support // Generated message map functions
        //{{AFX_MSG(SelectDocumentDlg)
        afx_msg void OnSelchangeGroup();
        virtual BOOL OnInitDialog();
        afx_msg void OnSelchangeDocument();
        //}}AFX_MSG
        DECLARE_MESSAGE_MAP()
};
```

```cpp
// selectdo.cpp : implementation file
// include "stdafx.h"
include "pod.h"
#include "selectdo.h"
#include "db-init.h"

#include "db.h"

ifdef _DEBUG
undef THIS_FILE
static char BASED_CODE THIS_FILE[] = __FILE__;
endif /////////////////////////////////////////////////////////////////////////////
// SelectDocumentDlg dialog SelectDocumentDlg::SelectDocumentDlg(int aWhat, CWnd* pParent /*=NULL*/)
        : CDialog(SelectDocumentDlg::IDD, pParent), What(aWhat)
{
        //{{AFX_DATA_INIT(SelectDocumentDlg)
        //}}AFX_DATA_INIT
} void SelectDocumentDlg::DoDataExchange(CDataExchange* pDX)
{
        CDialog::DoDataExchange(pDX);
        //{{AFX_DATA_MAP(SelectDocumentDlg)
        DDX_Control(pDX, IDC_STATIC_PICK, m_PickTitle);
        DDX_Control(pDX, IDC_LIST1, m_Document);
        DDX_Control(pDX, IDC_COMBO1, m_Group);
        //}}AFX_DATA_MAP
}

BEGIN_MESSAGE_MAP(SelectDocumentDlg, CDialog)
        //{{AFX_MSG_MAP(SelectDocumentDlg)
        ON_CBN_SELCHANGE(IDC_COMBO1, OnSelchangeGroup)
        ON_LBN_SELCHANGE(IDC_LIST1, OnSelchangeDocument)
        //}}AFX_MSG_MAP
END_MESSAGE_MAP()

/////////////////////////////////////////////////////////////////////////////
// SelectDocumentDlg message handlers void SelectDocumentDlg::OnSelchangeGroup()
{
        // TODO: Add your control notification handler code here
        char buf[50];
        DataBase DbDocument(DocumentName);
        DataBase DbGroup(LibraryName);
```

```
        // Get the group id & use it to get all documents in the group.
        m_Group.GetWindowText(buf,50);
        if (strcmp(buf," No Library") == 0)
                {
                GroupId = -1;
                }
        else
                {
                if (DbGroup.Select("Name",buf))
                        {
                        MessageBox("Error...Group not in database.");
                        return;
                        }
                GroupId = DbGroup.GetLong("Id");
                }
        m_Document.ResetContent();
        if (DbDocument.Select("GroupId",GroupId))
                return;
        //sprintf(buf,"What = %d",What);
        //MessageBox(buf);
        for (; DbDocument.Eof()==0; DbDocument.Skip(1))
                {
                if (What)
                        {
                        // If it is a kit, add it to list.
                        if (strcmp(DbDocument.Get("File",buf),"*") == 0)
                                m_Document.AddString(DbDocument.Get("Name",buf));
                        }
                else
                        {
                        // If not a kit, add it to list.
                        if (strcmp(DbDocument.Get("File",buf),"*"))
                                m_Document.AddString(DbDocument.Get("Name",buf));
                        }
                }
}

BOOL SelectDocumentDlg::OnInitDialog()
{
        char buf[50];
        CDialog::OnInitDialog();

// TODO: Add extra initialization here
        GroupId = -2;
        DocId = -1;
        if (What)
                m_PickTitle.SetWindowText("Kits");
        else
                m_PickTitle.SetWindowText("Documents");
        DataBase DbLibrary(LibraryName);
        m_Group.AddString(" No Library");
        for (DbLibrary.Top(); DbLibrary.Eof()==0; DbLibrary.Skip(1))
                {
```

```
                if (DbLibrary.Get("Name",buf) != NULL)
                        {
                        m_Group.AddString(buf);
                        }
                } return TRUE;  // return TRUE  unless you set the focus to a control
} void SelectDocumentDlg::OnSelchangeDocument()
{
        // TODO: Add your control notification handler code here
        char buf[50];
        DataBase DbDocument(DocumentName);
        m_Document.GetText(m_Document.GetCurSel(),buf);
        DbDocument.Select("Name",buf);
        for (; DbDocument.Eof()==0; DbDocument.Skip(1))
                {
                if (DbDocument.GetLong("GroupId") == GroupId)
                        {
                        DocId = DbDocument.GetLong("Id");
                        break;
                        }
                }
        OnOK();
}
```

```cpp
// selectgr.h : header file
//

/////////////////////////////////////////////////////////////
// SelectGroupDlg dialog class SelectGroupDlg : public CDialog
{
        int NoLib;
// Construction
public:
        SelectGroupDlg(int aNoLib=1, CWnd* pParent = NULL);  // standard constructor // Dialog Data
        //{{AFX_DATA(SelectGroupDlg)
        enum { IDD = IDD_DIALOG14 };
        CListBox        m_Group;
        //}}AFX_DATA
        long Id;

// Implementation
protected:
        virtual void DoDataExchange(CDataExchange* pDX);    // DDX/DDV support // Generated message map functions
        //{{AFX_MSG(SelectGroupDlg)
        virtual BOOL OnInitDialog();
        afx_msg void OnSelchangeGroup();
        //}}AFX_MSG
        DECLARE_MESSAGE_MAP()
};
```

```cpp
// selectgr.cpp : implementation file
// include "stdafx.h"
include "pod.h"
#include "selectgr.h"
#include "db-init.h"

#include "db.h"

ifdef _DEBUG
undef THIS_FILE
static char BASED_CODE THIS_FILE[] = __FILE__;
endif /////////////////////////////////////////////////////////////////////////////
// SelectGroupDlg dialog SelectGroupDlg::SelectGroupDlg(int aNoLib, CWnd* pParent /*=NULL*/)
        : CDialog(SelectGroupDlg::IDD, pParent), NoLib(aNoLib)
{
        //{{AFX_DATA_INIT(SelectGroupDlg)
                // NOTE: the ClassWizard will add member initialization here
        //}}AFX_DATA_INIT
} void SelectGroupDlg::DoDataExchange(CDataExchange* pDX)
{
        CDialog::DoDataExchange(pDX);
        //{{AFX_DATA_MAP(SelectGroupDlg)
        DDX_Control(pDX, IDC_LIST1, m_Group);
        //}}AFX_DATA_MAP
}

BEGIN_MESSAGE_MAP(SelectGroupDlg, CDialog)
        //{{AFX_MSG_MAP(SelectGroupDlg)
        ON_LBN_SELCHANGE(IDC_LIST1, OnSelchangeGroup)
        //}}AFX_MSG_MAP
END_MESSAGE_MAP()

/////////////////////////////////////////////////////////////////////////////
// SelectGroupDlg message handlers BOOL SelectGroupDlg::OnInitDialog()
{
        CDialog::OnInitDialog();

// TODO: Add extra initialization here
        char buf[50];
        DataBase DbLibrary(LibraryName);
        Id = -1;
        if (NoLib)
```

```
            m_Group.AddString(" No Library");
    for (DbLibrary.Top(); DbLibrary.Eof()==0; DbLibrary.Skip(1))
        {
        if (DbLibrary.Get("Name",buf) != NULL)
            {
            m_Group.AddString(buf);
            }
        } return TRUE;  // return TRUE  unless you set the focus to a control
} void SelectGroupDlg::OnSelchangeGroup()
{
    // TODO: Add your control notification handler code here
    char buf[50];
    DataBase DbGroup(LibraryName);
    m_Group.GetText(m_Group.GetCurSel(),buf);
    if (DbGroup.Select("Name",buf))
        Id = -1;
    else
        Id = DbGroup.GetLong("Id");
    OnOK();
}
```

```cpp
// selectgr.cpp : implementation file
// include "stdafx.h"
include "pod.h"
#include "selectgr.h"
#include "db-init.h"

#include "db.h"

ifdef _DEBUG
undef THIS_FILE
static char BASED_CODE THIS_FILE[] = __FILE__;
endif /////////////////////////////////////////////////////////////////////////////
// SelectGroupDlg dialog SelectGroupDlg::SelectGroupDlg(int aNoLib, CWnd* pParent /*=NULL*/)
        : CDialog(SelectGroupDlg::IDD, pParent), NoLib(aNoLib)
{
        //{{AFX_DATA_INIT(SelectGroupDlg)
                // NOTE: the ClassWizard will add member initialization here
        //}}AFX_DATA_INIT
} void SelectGroupDlg::DoDataExchange(CDataExchange* pDX)
{
        CDialog::DoDataExchange(pDX);
        //{{AFX_DATA_MAP(SelectGroupDlg)
        DDX_Control(pDX, IDC_LIST1, m_Group);
        //}}AFX_DATA_MAP
}

BEGIN_MESSAGE_MAP(SelectGroupDlg, CDialog)
        //{{AFX_MSG_MAP(SelectGroupDlg)
        ON_LBN_SELCHANGE(IDC_LIST1, OnSelchangeGroup)
        //}}AFX_MSG_MAP
END_MESSAGE_MAP()

/////////////////////////////////////////////////////////////////////////////
// SelectGroupDlg message handlers BOOL SelectGroupDlg::OnInitDialog()
{
        CDialog::OnInitDialog();

// TODO: Add extra initialization here
        char buf[50];
        DataBase DbLibrary(LibraryName);
        Id = -1;
        if (NoLib)
```

```
            m_Group.AddString(" No Library");
    for (DbLibrary.Top(); DbLibrary.Eof()==0; DbLibrary.Skip(1))
            {
            if (DbLibrary.Get("Name",buf) != NULL)
                    {
                    m_Group.AddString(buf);
                    }
            } return TRUE;  // return TRUE  unless you set the focus to a control
} void SelectGroupDlg::OnSelchangeGroup()
{
    // TODO: Add your control notification handler code here
    char buf[50];
    DataBase DbGroup(LibraryName);
    m_Group.GetText(m_Group.GetCurSel(),buf);
    if (DbGroup.Select("Name",buf))
            Id = -1;
    else
            Id = DbGroup.GetLong("Id");
    OnOK();
}
```

```cpp
// selectgr.h : header file
//

/////////////////////////////////////////////////////////////////////////////
// SelectGroupDlg dialog class SelectGroupDlg : public CDialog
{
        int NoLib;
// Construction
public:
        SelectGroupDlg(int aNoLib=1, CWnd* pParent = NULL);   // standard constructor // Dialog Data
        //{{AFX_DATA(SelectGroupDlg)
        enum { IDD = IDD_DIALOG14 };
        CListBox       m_Group;
        //}}AFX_DATA
        long Id;

// Implementation
protected:
        virtual void DoDataExchange(CDataExchange* pDX);     // DDX/DDV support // Generated message map functions
        //{{AFX_MSG(SelectGroupDlg)
        virtual BOOL OnInitDialog();
        afx_msg void OnSelchangeGroup();
        //}}AFX_MSG
        DECLARE_MESSAGE_MAP()
};
```

```
// stdafx.h : include file for standard system include files,
//  or project specific include files that are used frequently, but
//      are changed infrequently
// include <afxwin.h>        // MFC core and standard components
include <afxext.h>        // MFC extensions (including VB)
```

```
// stdafx.cpp : source file that includes just the standard includes
//  stdafx.pch will be the pre-compiled header
//  stdafx.obj will contain the pre-compiled type information include "stdafx.h"
```

```cpp
// stdafx.cpp : source file that includes just the standard includes
//  stdafx.pch will be the pre-compiled header
//  stdafx.obj will contain the pre-compiled type information include "stdafx.h"
```

```cpp
// usagerep.h : header file
//

/////////////////////////////////////////////////////////////
// UsageReportDlg dialog class UsageReportDlg : public CDialog
{
        long Id;
        int AllGroupDocument;
        void Report();
// Construction
public:
        UsageReportDlg(CWnd* pParent = NULL);    // standard constructor // Dialog Data
        //{{AFX_DATA(UsageReportDlg)
        enum { IDD = IDD_DIALOG13 };
        CButton       m_ButtonOK;
        CButton       m_ButtonCancel;
        CButton       m_ButtonGroup;
        CButton       m_ButtonDocument;
        CButton       m_ButtonAll;
        CButton       m_CheckPrint;
        CStatic m_Group;
        CStatic m_Document;
        CEdit   m_Output;
        CButton       m_CheckView;
        //}}AFX_DATA // Implementation
protected:
        virtual void DoDataExchange(CDataExchange* pDX);    // DDX/DDV support // Generated message map functions
        //{{AFX_MSG(UsageReportDlg)
        virtual BOOL OnInitDialog();
        afx_msg void OnAll();
        afx_msg void OnGroup();
        afx_msg void OnDocument();
        virtual void OnOK();
        //}}AFX_MSG
        DECLARE_MESSAGE_MAP()
};
```

```cpp
// usagerep.cpp : implementation file
// include "stdafx.h"

include <dos.h> include "pod.h"
include "usagerep.h"
#include "selectdo.h"
#include "selectgr.h"
#include "db-init.h"
#include "viewdlg.h"
#include "printcon.h"

#include "db.h"

ifdef _DEBUG
undef THIS_FILE
static char BASED_CODE THIS_FILE[] = __FILE__;
endif /////////////////////////////////////////////////////////////////////////////
// UsageReportDlg dialog UsageReportDlg::UsageReportDlg(CWnd* pParent /*=NULL*/)
        : CDialog(UsageReportDlg::IDD, pParent)
{
        //{{AFX_DATA_INIT(UsageReportDlg)
        //}}AFX_DATA_INIT
} void UsageReportDlg::DoDataExchange(CDataExchange* pDX)
{
        CDialog::DoDataExchange(pDX);
        //{{AFX_DATA_MAP(UsageReportDlg)
        DDX_Control(pDX, IDOK, m_ButtonOK);
        DDX_Control(pDX, IDCANCEL, m_ButtonCancel);
        DDX_Control(pDX, IDGROUP, m_ButtonGroup);
        DDX_Control(pDX, IDDOCUMENT, m_ButtonDocument);
        DDX_Control(pDX, IDALL, m_ButtonAll);
        DDX_Control(pDX, IDC_CHECK_PRINT, m_CheckPrint);
        DDX_Control(pDX, IDC_STATIC_GROUP, m_Group);
        DDX_Control(pDX, IDC_STATIC_DOCUMENT, m_Document);
        DDX_Control(pDX, IDC_EDIT1, m_Output);
        DDX_Control(pDX, IDC_CHECK_VIEW, m_CheckView);
        //}}AFX_DATA_MAP
}

BEGIN_MESSAGE_MAP(UsageReportDlg, CDialog)
        //{{AFX_MSG_MAP(UsageReportDlg)
        ON_BN_CLICKED(IDALL, OnAll)
        ON_BN_CLICKED(IDGROUP, OnGroup)
```

```
        ON_BN_CLICKED(IDDOCUMENT, OnDocument)
    //}}AFX_MSG_MAP
END_MESSAGE_MAP()

/////////////////////////////////////////////////////////////////////////////
// UsageReportDlg message handlers BOOL UsageReportDlg::OnInitDialog()
{
        CDialog::OnInitDialog();

// TODO: Add extra initialization here
        char buf[250];
        Id = -2;
        AllGroupDocument = 0;
        m_Group.SetWindowText("");
        m_Document.SetWindowText("");
        //
        GetPrivateProfileString("System Defaults","ReportDirectory","c:\\",buf,200,"pod.ini");
        if (*(buf+strlen(buf)-1) == '\\')
                strcat(buf,"usage.rpt");
        else
                strcat(buf,"\\usage.rpt");
        m_Output.SetWindowText(buf);
        //
        m_CheckPrint.SetCheck(0);
        m_CheckView.SetCheck(0);

return TRUE;  // return TRUE  unless you set the focus to a control
} void UsageReportDlg::OnAll()
{
        // TODO: Add your control notification handler code here
        AllGroupDocument = 0;
        Id = -2;
        m_Group.SetWindowText("");
        m_Document.SetWindowText("");
} void UsageReportDlg::OnGroup()
{
        // TODO: Add your control notification handler code here
        SelectGroupDlg s(0);    // No Library not used here.
        char buf[50];

if (s.DoModal() != IDOK)
                return;
        DataBase DbGroup(LibraryName);
        if (DbGroup.Select("Id",s.Id))
                {
```

```
                MessageBox("Error...No such library in database.");
                return;
                }
        m_Group.SetWindowText(DbGroup.Get("Name",buf));
        Id = s.Id;
        AllGroupDocument = 1;
        m_Document.SetWindowText("");
} void UsageReportDlg::OnDocument()
{
        // TODO: Add your control notification handler code here
        SelectDocumentDlg s;
        char buf[50];

if (s.DoModal() != IDOK)
                return;
        DataBase DbDocument(DocumentName);
        if (DbDocument.Select("Id",s.DocId))
                {
                MessageBox("Error...No such document in database.");
                return;
                }
        Id = s.DocId;
        m_Document.SetWindowText(DbDocument.Get("Name",buf));
        AllGroupDocument = 2;
        m_Group.SetWindowText("");
} void UsageReportDlg::OnOK()
{
        // TODO: Add extra validation here
        char buf[100];

// Disable all of the buttons so user can't screw anything up.
        m_ButtonAll.EnableWindow(0);
        m_ButtonGroup.EnableWindow(0);
        m_ButtonDocument.EnableWindow(0);
        m_ButtonOK.EnableWindow(0);
        m_ButtonCancel.EnableWindow(0);
        m_CheckPrint.EnableWindow(0);
        m_CheckView.EnableWindow(0);
        m_Output.EnableWindow(0);
        // If printing a group, get the group id.
        if (AllGroupDocument == 1)
                {
                DataBase DbGroup(LibraryName);
                m_Group.GetWindowText(buf,50);
                if (strcmp(buf," No Library") == 0)
                        {
                        Id = -1;
                        }
```

```
                    else
                        {
                            if (DbGroup.Select("Name",buf))
                                {
                                    MessageBox("Error...Group not in database.");
                                    return;
                                }
                            Id = DbGroup.GetLong("Id");
                        }
                }
        Report();
        m_Output.GetWindowText(buf,100);
        if (m_CheckPrint.GetCheck())
                {
                VCET_PrintFile(buf,1);
                }
        if (m_CheckView.GetCheck())
                {
                ViewDlg v(buf);
                v.DoModal();
                }
//
        CDialog::OnOK();
}

//
//
static void ParseDate(unsigned *year, unsigned *month, unsigned *day, char *date)
        {
        char buf[10];
        strcpy(buf,date);
        *day = (unsigned)strtoul(buf+6,NULL,10);
        buf[6] = '\0';
        *month = (unsigned)strtoul(buf+4,NULL,10);
        buf[4] = '\0';
        *year = (unsigned)strtoul(buf,NULL,10);
        }
//
//
static char *ProcessDocument(char *s, long Id)
        {
        DataBase DbUsage(UsageName);
        char buf[50];
        long count[13],ytd;
        int i;
        unsigned year,month,day,d;
        struct _dosdate_t dt;
        _dos_getdate(&dt);

if (DbUsage.Select("DocId",Id))
                {
                sprintf(s,"");
                return s;
```

```
                }
        for (i=0;i<13;i++)
                count[i] = 0L;

for (; DbUsage.Eof()==0; DbUsage.Skip(1))
                {
                DbUsage.Get("Date",buf);
                ParseDate(&year,&month,&day,buf);
                if (dt.year == year)
                        {
                        count[month] += DbUsage.GetLong("Quantity");
                        }
                }
        strcpy(s,"");
        for (d=1,ytd=0L; d<=month; d++)
                {
                ytd += count[d];
                sprintf(s+strlen(s),"%8ld",count[d]);
//              sprintf(buf,"%8ld",count[d]);
//              strcat(s,buf);
                }
        strcat(s,"*       ");d++;
        sprintf(buf,"%8s","");
        for (; d<=12; d++)
                strcat(s,buf);
        sprintf(s+strlen(s),"%8ld%8ld",(long)(.5+((double)ytd/(double)month)),ytd);
        return s;
        } static void DocumentHeader(FILE *fp)
        {
        char buf[200];
//
        fprintf(fp,"%-31s%8s%8s%8s%8s%8s%8s%8s%8s%8s%8s%8s%8s%8s\n",
                "Document Name","Jan","Feb","Mar","Apr","May",
                "Jun","Jul","Aug","Sep","Oct","Nov","Dec","avg","YTD");
        memset(buf,'-',143);
        buf[143] = '\0';
        fprintf(fp,"%s\n",buf);
        }

//
// Document() can process either a single document or a group of documents.
// Id can be either a document id or a group id depending upon GrpDoc.
// GrpDoc = 0 = group, GrpDoc = 1 = document.
//
static void Document(FILE *fp, long Id, int GrpDoc)
        {
        char Name[40],File[30],buf[200];
        DataBase DbDocument(DocumentName);
```

```c
            DocumentHeader(fp);
            if (GrpDoc)
                    {
                    // Process a single document.
                    if (DbDocument.Select("Id",Id))
                            {
                            fprintf(fp,"Invalid document id = %ld\n");
                            return;
                            }
                    DbDocument.Get("Name",Name);
                    //DbDocument.Get("File",File);
                    //fprintf(fp,"%-35s%-20s%s\n",Name,File,ProcessDocument(buf,Id));
                    Name[31] = '\0';
                    fprintf(fp,"%-31s%s\n",Name,ProcessDocument(buf,Id));
                    }
            else
                    {
                    // Process a group of documents.
                    if (DbDocument.Select("GroupId",Id))
                            {
                            fprintf(fp,"No documents in this group.\n");
                            return;
                            }
                    for (; DbDocument.Eof()==0; DbDocument.Skip(1))
                            {
                            DbDocument.Get("Name",Name);
                            if (strcmp(DbDocument.Get("File",File),"*"))
                                    {
                                    //fprintf(fp,"%-35s%-20s%s\n",Name,File,
                                    //      ProcessDocument(buf,DbDocument.GetLong("Id")));
                                    Name[31] = '\0';
                                    fprintf(fp,"%-31s%s\n",Name,
                                            ProcessDocument(buf,DbDocument.GetLong("Id")));
                                    }
                            }
                    }
            }

//
// Group() can process either a single group or all groups of documents.
// If Id < 0 then all groups are processed.
//
static void Group(FILE *fp, long Id)
        {
        char Name[40];
        DataBase DbGroup(LibraryName);

if (Id >= 0)
                {
                if (DbGroup.Select("Id",Id))
                        {
                        fprintf(fp,"Invalid group id: %ld\n");
                        return;
```

```
                    }
                DbGroup.Get("Name",Name);
                fprintf(fp,"\n\t\tLibrary:  %s\n\n",Name);
                Document(fp,Id,0);
                fprintf(fp,"\n");
                }
        else
                {
                for (DbGroup.Top(); DbGroup.Eof()==0; DbGroup.Skip(1))
                        {
                        DbGroup.Get("Name",Name);
                        fprintf(fp,"\n\t\tLibrary:  %s\n\n",Name);
                        Document(fp,DbGroup.GetLong("Id"),0);
                        fprintf(fp,"\n");
                        }
                }
        } void UsageReportDlg::Report()
        {
        char buf[100];
        //char buf1[200];
        FILE *fp;
        m_Output.GetWindowText(buf,100);
        //sprintf(buf1,"AllGroupDocument=%d\nId=%ld\nOutput To:
<<%s>>\nPrint=%d\nView=%d",
        //       AllGroupDocument,Id,buf,m_CheckPrint.GetCheck(),m_CheckView.GetCheck());
        //MessageBox(buf1,"Report");
        //
        if ((fp = fopen(buf,"w")) == NULL)
                {
                MessageBox("Can't open output file.","Error");
                return;
                } fprintf(fp,"\t\t\t\t\t\t\tU S A G E   R E P O R T\n\n\n");

if (AllGroupDocument == 0)
                Group(fp,-1L);
        if (AllGroupDocument == 1)
                Group(fp,Id);
        if (AllGroupDocument == 2)
                Document(fp,Id,1);

fprintf(fp,"* - These months may contain incomplete data.\n");

fclose(fp);
        }
```

```cpp
// viewdlg.h : header file
// include "pctl.h"
/////////////////////////////////////////////////////////////////
// ViewDlg dialog class ViewDlg : public CDialog
{
// Construction
        char *FileName;
        HWND hCtl;
        PAN_CtlFileInfo FileInfo;
public:
        ViewDlg(char *aFileName, CWnd* pParent = NULL);   // standard constructor // Dialog Data
        //{{AFX_DATA(ViewDlg)
        enum { IDD = IDD_DIALOG3 };
        CStatic  m_ZoomPercent;
        CButton      m_ZoomToExtents;
        CButton      m_IDOK;
        CStatic  m_View;
        //}}AFX_DATA // Implementation
protected:
        virtual void DoDataExchange(CDataExchange* pDX);    // DDX/DDV support // Generated message map functions
        //{{AFX_MSG(ViewDlg)
        afx_msg LRESULT OnPaintZoom(WPARAM,LPARAM);
        virtual BOOL OnInitDialog();
        afx_msg void OnClose();
        afx_msg void OnZoomToExtents();
        afx_msg void OnZoomDown();
        afx_msg void OnZoomUp();
        //}}AFX_MSG
        DECLARE_MESSAGE_MAP()
};
```

```cpp
// viewdlg.cpp : implementation file
//
include "stdafx.h"

#include <stdlib.h>
include <string.h> include "pod.h"
include "viewdlg.h"
//#include "pctl.h" in viewdlg.h ifdef _DEBUG
undef THIS_FILE
static char BASED_CODE THIS_FILE[] = __FILE__;
endif define WM_PAINT_ZOOM (WM_USER + 100)

extern LRESULT __loadds CALLBACK CallBackFcn(HWND,UINT,WPARAM,LPARAM);
//extern LRESULT CALLBACK CallBackFcn(HWND,UINT,WPARAM,LPARAM);
Public WNDPROC CallBackFcnPtr;

Public LRESULT __loadds CALLBACK CallBackFcn(HWND hwnd, UINT msg, WPARAM wp,
LPARAM lp)
//Public LRESULT CALLBACK CallBackFcn(HWND hwnd, UINT msg, WPARAM wp, LPARAM lp)
    {
    if (msg == PNM_CTLPAINT)
        {
        //MessageBox(0,"Got a PNM_CTLPAINT message.","Status",MB_OK);
        SendMessage(GetParent(GetParent(hwnd)),WM_PAINT_ZOOM,0,0);
        }
    return 0;
    }

//////////////////////////////////////////////////////////
// ViewDlg dialog

ViewDlg::ViewDlg(char *aFileName, CWnd* pParent /*=NULL*/)
    : CDialog(ViewDlg::IDD, pParent)
{
    FileName = (char *)malloc(strlen(aFileName)+2);
    strcpy(FileName,aFileName);
    //{{AFX_DATA_INIT(ViewDlg)
        // NOTE: the ClassWizard will add member initialization here
    //}}AFX_DATA_INIT
} void ViewDlg::DoDataExchange(CDataExchange* pDX)
{
    CDialog::DoDataExchange(pDX);
    //{{AFX_DATA_MAP(ViewDlg)
    DDX_Control(pDX, IDC_STATIC_ZOOM, m_ZoomPercent);
    DDX_Control(pDX, ID_ZOOM_TO_EXTENTS, m_ZoomToExtents);
```

```
        DDX_Control(pDX, IDOK, m_IDOK);
        DDX_Control(pDX, IDC_STATIC_VIEW, m_View);
    //}}AFX_DATA_MAP
}

BEGIN_MESSAGE_MAP(ViewDlg, CDialog)
    //{{AFX_MSG_MAP(ViewDlg)
    ON_MESSAGE(WM_PAINT_ZOOM,OnPaintZoom)
    ON_WM_CLOSE()
    ON_BN_CLICKED(ID_ZOOM_TO_EXTENTS, OnZoomToExtents)
    ON_BN_CLICKED(ID_ZOOM_DOWN, OnZoomDown)
    ON_BN_CLICKED(ID_ZOOM_UP, OnZoomUp)
    //}}AFX_MSG_MAP
END_MESSAGE_MAP()

/////////////////////////////////////////////////////////////////
// ViewDlg message handlers BOOL ViewDlg::OnInitDialog()
{
    CDialog::OnInitDialog();

// TODO: Add extra initialization here
    RECT rec;
    int err;
    char buf[100];
    LOGFONT fnt;
    //PAN_CtlFileInfo FileInfo;
    CWnd *DeskTopWnd;
    RECT DeskTopRect;
    int FontSize;
    unsigned long z;

// Developed at 800*600 resolution.  Scale to any screen resolution for views.
    DeskTopWnd = GetDesktopWindow();
    DeskTopWnd->GetWindowRect(&DeskTopRect);
    //sprintf(buf,"Desk Top Window Rectangle\nleft=%d\ntop=%d\nright=%d\nbottom=%d\n",
    //      DeskTopRect.left,DeskTopRect.top,DeskTopRect.right,DeskTopRect.bottom);
    //MessageBox(buf);
    if (DeskTopRect.right >= 800)
        FontSize = -10;
    else
        FontSize = -9;
        //FontSize = (int)((-10. * (double)DeskTopRect.right / 800.) + .5);
    //

*((FARPROC FAR*) &CallBackFcnPtr) =
MakeProcInstance((FARPROC)CallBackFcn,AfxGetInstanceHandle());
    if (CallBackFcnPtr == NULL)
        {
        MessageBox("Error on MakeProcInstance().");
        return FALSE;
        }
```

```
        ::GetClientRect(m_View.m_hWnd,&rec);
        if ((hCtl =
PAN_CreateControl(m_View.m_hWnd,IDC_STATIC_VIEW,&rec,NULL,CallBackFcnPtr)) ==
NULL)
                {
                MessageBox("PAN_CreateControl()...Error.");
                return FALSE;
                }

::ShowWindow(hCtl,SW_SHOW);
        ::UpdateWindow(hCtl);
        err = (int)::SendMessage(hCtl,PM_CTLSETFILE,(WPARAM)-
1,(LPARAM)(LPSTR)FileName);
        if (err != PAN_CTLERRNONE)
                {
                sprintf(buf,"Error on PM_CTLSETFILE.  Code = %d",err);
                MessageBox(buf);
                }
        // Set to fixed font for reports.
        memset(&FileInfo,0,sizeof(PAN_CtlFileInfo));
        ::SendMessage(hCtl,PM_CTLGETFILE,(WPARAM)0,(LPARAM)(PAN_CtlFileInfo FAR
*)&FileInfo);
        //if (FileInfo.type == PAN_DocumentFile)
        if (strcmp(FileInfo.desc,"ASCII Text") == 0)
                {
                err =
(int)::SendMessage(hCtl,PM_CTLGETBASEFONT,0,(LPARAM)(LPLOGFONT) &fnt);
                if (err != PAN_CTLERRNONE)
                        MessageBox("Error on PM_CTLGETBASEFONT.");
                //fnt.lfHeight = -10;
                fnt.lfHeight = FontSize;
                fnt.lfWeight = FW_BOLD;
                strcpy(fnt.lfFaceName,"Courier New");
                /*
                CFontDialog dlg(&fnt);
                if (dlg.DoModal() == IDOK)
                        {
                */
                err =
(int)::SendMessage(hCtl,PM_CTLSETBASEFONT,0,(LPARAM)(LOGFONT FAR *) &fnt);
                if (err != PAN_CTLERRNONE)
                        MessageBox("Error on PM_CTLSETBASEFONT.");
                //      }
                }
        //
//      err =
(int)::SendMessage(hCtl,PM_CTLSETCAPS,0,PAN_CTLCAPSZOOM|PAN_CTLCAPSPAGE|PA
N_CTLCAPSSIZE|PAN_CTLCAPSMOUSE|PAN_CTLCAPSKEYBD);
        err = (int)::SendMessage(hCtl,PM_CTLSETCAPS,1,0);
        if (err != PAN_CTLERRNONE)
                {
                sprintf(buf,"Error on PM_CTLSETCAPS.  Code = %d",err);
                MessageBox(buf);
                }
```

```
        ::SendMessage(hCtl,PM_CTLSETLMBACTION,(WPARAM)PAN_CTLLMBZOOM,(LPAR
AM)0);

::ShowWindow(hCtl,SW_SHOW);
        ::UpdateWindow(hCtl);

::SendMessage(hCtl,PM_CTLGETZOOM,PAN_CTLZOOMBOTH,(LONG)&z);
        z /= 1000;
        sprintf(buf,"%lu",z);
        m_ZoomPercent.SetWindowText(buf);

return TRUE;  // return TRUE  unless you set the focus to a control
} void ViewDlg::OnClose()
{
        // TODO: Add your message handler code here and/or call default
        free(FileName);
        ::SendMessage(hCtl,PM_CTLDESTROY,0,0);
        if (CallBackFcnPtr != NULL)
                FreeProcInstance((FARPROC)CallBackFcnPtr);
//      I think this is destroying the action dialog's window.
//      DestroyWindow();

CDialog::OnClose();
}

// Touch screen doesn't support right mouse button, so added an on-screen button
// to do the CSI-VCET zoom to extents.
void ViewDlg::OnZoomToExtents()
{
        // TODO: Add your control notification handler code here
        unsigned long z;
        char buf[50];
        // If zoom to extents is supported with this file type, use it.
        if (FileInfo.type == PAN_RasterFile || FileInfo.type == PAN_VectorFile)
                {
                ::SendMessage(hCtl,WM_RBUTTONDOWN,0,0);
                ::SendMessage(hCtl,WM_RBUTTONUP,0,0);
                ::SendMessage(hCtl,PM_CTLGETZOOM,PAN_CTLZOOMBOTH,(LONG)&z);
                z /= 1000;
                sprintf(buf,"%lu",z);
                m_ZoomPercent.SetWindowText(buf);
                }
        else if (FileInfo.type == PAN_DocumentFile)
                {
                m_ZoomPercent.SetWindowText("40");
                ::SendMessage(hCtl,PM_CTLSETZOOM,PAN_CTLZOOMBOTH,40000L);
                }
        else
                {
                m_ZoomPercent.SetWindowText("100");
```

```
            ::SendMessage(hCtl,PM_CTLSETZOOM,PAN_CTLZOOMBOTH,100000L);
        }
} void ViewDlg::OnZoomDown()
{
    // TODO: Add your control notification handler code here
    char buf[50];
    unsigned long z;
    m_ZoomPercent.GetWindowText(buf,50);
    z = strtoul(buf,NULL,10);
    z -= 5L;
    if (z < 10L)
        z = 10L;
    //sprintf(buf,"%lu",z);
    //m_ZoomPercent.SetWindowText(buf);
    ::SendMessage(hCtl,PM_CTLSETZOOM,PAN_CTLZOOMBOTH,z*1000L);
} void ViewDlg::OnZoomUp()
{
    // TODO: Add your control notification handler code here
    char buf[50];
    unsigned long z;
    m_ZoomPercent.GetWindowText(buf,50);
    z = strtoul(buf,NULL,10);
    z += 5L;
    //sprintf(buf,"%lu",z);
    //m_ZoomPercent.SetWindowText(buf);
    ::SendMessage(hCtl,PM_CTLSETZOOM,PAN_CTLZOOMBOTH,z*1000L);
}

LRESULT ViewDlg::OnPaintZoom(WPARAM w, LPARAM l)
    {
    //MessageBox("OnPaintZoom()");
    char buf[50];
    unsigned long z;
    ::SendMessage(hCtl,PM_CTLGETZOOM,PAN_CTLZOOMBOTH,(LONG)&z);
    z /= 1000;
    // Limit zoom to 3000% to try to catch most of CSI's crashes at extreme zoom.
    if (z > 3000)
        ::SendMessage(hCtl,PM_CTLSETZOOM,PAN_CTLZOOMBOTH,2000000L);
    else
        {
        sprintf(buf,"%lu",z);
        m_ZoomPercent.SetWindowText(buf);
        }
    return 0;
    }
```

```cpp
// viewdlg.cpp : implementation file
//
include "stdafx.h"

#include <stdlib.h>
include <string.h> include "pod.h"
include "viewdlg.h"
//#include "pctl.h" in viewdlg.h ifdef _DEBUG
undef THIS_FILE
static char BASED_CODE THIS_FILE[] = __FILE__;
endif define WM_PAINT_ZOOM (WM_USER + 100)

extern LRESULT __loadds CALLBACK CallBackFcn(HWND,UINT,WPARAM,LPARAM);
//extern LRESULT CALLBACK CallBackFcn(HWND,UINT,WPARAM,LPARAM);
Public WNDPROC CallBackFcnPtr;

Public LRESULT __loadds CALLBACK CallBackFcn(HWND hwnd, UINT msg, WPARAM wp, LPARAM lp)
//Public LRESULT CALLBACK CallBackFcn(HWND hwnd, UINT msg, WPARAM wp, LPARAM lp)
    {
    if (msg == PNM_CTLPAINT)
        {
        //MessageBox(0,"Got a PNM_CTLPAINT message.","Status",MB_OK);
        SendMessage(GetParent(GetParent(hwnd)),WM_PAINT_ZOOM,0,0);
        }
    return 0;
    }

////////////////////////////////////////////////////////////
// ViewDlg dialog

ViewDlg::ViewDlg(char *aFileName, CWnd* pParent /*=NULL*/)
    : CDialog(ViewDlg::IDD, pParent)
{
    FileName = (char *)malloc(strlen(aFileName)+2);
    strcpy(FileName,aFileName);
    //{{AFX_DATA_INIT(ViewDlg)
        // NOTE: the ClassWizard will add member initialization here
    //}}AFX_DATA_INIT
} void ViewDlg::DoDataExchange(CDataExchange* pDX)
{
    CDialog::DoDataExchange(pDX);
    //{{AFX_DATA_MAP(ViewDlg)
    DDX_Control(pDX, IDC_STATIC_ZOOM, m_ZoomPercent);
    DDX_Control(pDX, ID_ZOOM_TO_EXTENTS, m_ZoomToExtents);
```

```
          DDX_Control(pDX, IDOK, m_IDOK);
          DDX_Control(pDX, IDC_STATIC_VIEW, m_View);
          //}}AFX_DATA_MAP
}

BEGIN_MESSAGE_MAP(ViewDlg, CDialog)
       //{{AFX_MSG_MAP(ViewDlg)
       ON_MESSAGE(WM_PAINT_ZOOM,OnPaintZoom)
       ON_WM_CLOSE()
       ON_BN_CLICKED(ID_ZOOM_TO_EXTENTS, OnZoomToExtents)
       ON_BN_CLICKED(ID_ZOOM_DOWN, OnZoomDown)
       ON_BN_CLICKED(ID_ZOOM_UP, OnZoomUp)
       //}}AFX_MSG_MAP
END_MESSAGE_MAP()

/////////////////////////////////////////////////////////////////////////////
// ViewDlg message handlers BOOL ViewDlg::OnInitDialog()
{
       CDialog::OnInitDialog();

// TODO: Add extra initialization here
       RECT rec;
       int err;
       char buf[100];
       LOGFONT fnt;
       //PAN_CtlFileInfo FileInfo;
       CWnd *DeskTopWnd;
       RECT DeskTopRect;
       int FontSize;
       unsigned long z;

// Developed at 800*600 resolution.  Scale to any screen resolution for views.
       DeskTopWnd = GetDesktopWindow();
       DeskTopWnd->GetWindowRect(&DeskTopRect);
       //sprintf(buf,"Desk Top Window Rectangle\nleft=%d\ntop=%d\nright=%d\nbottom=%d\n",
       //         DeskTopRect.left,DeskTopRect.top,DeskTopRect.right,DeskTopRect.bottom);
       //MessageBox(buf);
       if (DeskTopRect.right >= 800)
               FontSize = -10;
       else
               FontSize = -9;
               //FontSize = (int)((-10. * (double)DeskTopRect.right / 800.) + .5);
       //

*((FARPROC FAR*) &CallBackFcnPtr) =
MakeProcInstance((FARPROC)CallBackFcn,AfxGetInstanceHandle());
       if (CallBackFcnPtr == NULL)
               {
               MessageBox("Error on MakeProcInstance().");
               return FALSE;
               }
```

```
            DDX_Control(pDX, IDOK, m_IDOK);
            DDX_Control(pDX, IDC_STATIC_VIEW, m_View);
        //}}AFX_DATA_MAP
}

BEGIN_MESSAGE_MAP(ViewDlg, CDialog)
        //{{AFX_MSG_MAP(ViewDlg)
        ON_MESSAGE(WM_PAINT_ZOOM,OnPaintZoom)
        ON_WM_CLOSE()
        ON_BN_CLICKED(ID_ZOOM_TO_EXTENTS, OnZoomToExtents)
        ON_BN_CLICKED(ID_ZOOM_DOWN, OnZoomDown)
        ON_BN_CLICKED(ID_ZOOM_UP, OnZoomUp)
        //}}AFX_MSG_MAP
END_MESSAGE_MAP()

/////////////////////////////////////////////////////////////////
// ViewDlg message handlers BOOL ViewDlg::OnInitDialog()
{
        CDialog::OnInitDialog();

// TODO: Add extra initialization here
        RECT rec;
        int err;
        char buf[100];
        LOGFONT fnt;
        //PAN_CtlFileInfo FileInfo;
        CWnd *DeskTopWnd;
        RECT DeskTopRect;
        int FontSize;
        unsigned long z;

// Developed at 800*600 resolution.  Scale to any screen resolution for views.
        DeskTopWnd = GetDesktopWindow();
        DeskTopWnd->GetWindowRect(&DeskTopRect);
        //sprintf(buf,"Desk Top Window Rectangle\nleft=%d\ntop=%d\nright=%d\nbottom=%d\n",
        //      DeskTopRect.left,DeskTopRect.top,DeskTopRect.right,DeskTopRect.bottom);
        //MessageBox(buf);
        if (DeskTopRect.right >= 800)
                FontSize = -10;
        else
                FontSize = -9;
                //FontSize = (int)((-10. * (double)DeskTopRect.right / 800.) + .5);
        //

*((FARPROC FAR*) &CallBackFcnPtr) =
MakeProcInstance((FARPROC)CallBackFcn,AfxGetInstanceHandle());
        if (CallBackFcnPtr == NULL)
                {
                MessageBox("Error on MakeProcInstance().");
                return FALSE;
                }
```

```
        ::GetClientRect(m_View.m_hWnd,&rec);
        if ((hCtl =
PAN_CreateControl(m_View.m_hWnd,IDC_STATIC_VIEW,&rec,NULL,CallBackFcnPtr)) ==
NULL)
                {
                MessageBox("PAN_CreateControl()...Error.");
                return FALSE;
                }

::ShowWindow(hCtl,SW_SHOW);
        ::UpdateWindow(hCtl);
        err = (int)::SendMessage(hCtl,PM_CTLSETFILE,(WPARAM)-
1,(LPARAM)(LPSTR)FileName);
        if (err != PAN_CTLERRNONE)
                {
                sprintf(buf,"Error on PM_CTLSETFILE.  Code = %d",err);
                MessageBox(buf);
                }
        // Set to fixed font for reports.
        memset(&FileInfo,0,sizeof(PAN_CtlFileInfo));
        ::SendMessage(hCtl,PM_CTLGETFILE,(WPARAM)0,(LPARAM)(PAN_CtlFileInfo FAR
*)&FileInfo);
        //if (FileInfo.type == PAN_DocumentFile)
        if (strcmp(FileInfo.desc,"ASCII Text") == 0)
                {
                err =
(int)::SendMessage(hCtl,PM_CTLGETBASEFONT,0,(LPARAM)(LPLOGFONT) &fnt);
                if (err != PAN_CTLERRNONE)
                        MessageBox("Error on PM_CTLGETBASEFONT.");
                //fnt.lfHeight = -10;
                fnt.lfHeight = FontSize;
                fnt.lfWeight = FW_BOLD;
                strcpy(fnt.lfFaceName,"Courier New");
                /*
                CFontDialog dlg(&fnt);
                if (dlg.DoModal() == IDOK)
                        {
                */
                err =
(int)::SendMessage(hCtl,PM_CTLSETBASEFONT,0,(LPARAM)(LOGFONT FAR *) &fnt);
                        if (err != PAN_CTLERRNONE)
                                MessageBox("Error on PM_CTLSETBASEFONT.");
                //      }
                }
        //
//      err =
(int)::SendMessage(hCtl,PM_CTLSETCAPS,0,PAN_CTLCAPSZOOM|PAN_CTLCAPSPAGE|PA
N_CTLCAPSSIZE|PAN_CTLCAPSMOUSE|PAN_CTLCAPSKEYBD);
        err = (int)::SendMessage(hCtl,PM_CTLSETCAPS,1,0);
        if (err != PAN_CTLERRNONE)
                {
                sprintf(buf,"Error on PM_CTLSETCAPS.  Code = %d",err);
                MessageBox(buf);
                }
```

```
        ::SendMessage(hCtl,PM_CTLSETLMBACTION,(WPARAM)PAN_CTLLMBZOOM,(LPAR
AM)0);

::ShowWindow(hCtl,SW_SHOW);
        ::UpdateWindow(hCtl);

::SendMessage(hCtl,PM_CTLGETZOOM,PAN_CTLZOOMBOTH,(LONG)&z);
        z /= 1000;
        sprintf(buf,"%lu",z);
        m_ZoomPercent.SetWindowText(buf);

return TRUE;  // return TRUE  unless you set the focus to a control
} void ViewDlg::OnClose()
{
        // TODO: Add your message handler code here and/or call default
        free(FileName);
        ::SendMessage(hCtl,PM_CTLDESTROY,0,0);
        if (CallBackFcnPtr != NULL)
                FreeProcInstance((FARPROC)CallBackFcnPtr);
//      I think this is destroying the action dialog's window.
//      DestroyWindow();

CDialog::OnClose();
}

// Touch screen doesn't support right mouse button, so added an on-screen button
// to do the CSI-VCET zoom to extents.
void ViewDlg::OnZoomToExtents()
{
        // TODO: Add your control notification handler code here
        unsigned long z;
        char buf[50];
        // If zoom to extents is supported with this file type, use it.
        if (FileInfo.type == PAN_RasterFile || FileInfo.type == PAN_VectorFile)
                {
                ::SendMessage(hCtl,WM_RBUTTONDOWN,0,0);
                ::SendMessage(hCtl,WM_RBUTTONUP,0,0);
                ::SendMessage(hCtl,PM_CTLGETZOOM,PAN_CTLZOOMBOTH,(LONG)&z);
                z /= 1000;
                sprintf(buf,"%lu",z);
                m_ZoomPercent.SetWindowText(buf);
                }
        else if (FileInfo.type == PAN_DocumentFile)
                {
                m_ZoomPercent.SetWindowText("40");
                ::SendMessage(hCtl,PM_CTLSETZOOM,PAN_CTLZOOMBOTH,40000L);
                }
        else
                {
                m_ZoomPercent.SetWindowText("100");
```

```
            ::SendMessage(hCtl,PM_CTLSETZOOM,PAN_CTLZOOMBOTH,100000L);
            }
} void ViewDlg::OnZoomDown()
{
        // TODO: Add your control notification handler code here
        char buf[50];
        unsigned long z;
        m_ZoomPercent.GetWindowText(buf,50);
        z = strtoul(buf,NULL,10);
        z -= 5L;
        if (z < 10L)
                z = 10L;
        //sprintf(buf,"%lu",z);
        //m_ZoomPercent.SetWindowText(buf);
        ::SendMessage(hCtl,PM_CTLSETZOOM,PAN_CTLZOOMBOTH,z*1000L);
} void ViewDlg::OnZoomUp()
{
        // TODO: Add your control notification handler code here
        char buf[50];
        unsigned long z;
        m_ZoomPercent.GetWindowText(buf,50);
        z = strtoul(buf,NULL,10);
        z += 5L;
        //sprintf(buf,"%lu",z);
        //m_ZoomPercent.SetWindowText(buf);
        ::SendMessage(hCtl,PM_CTLSETZOOM,PAN_CTLZOOMBOTH,z*1000L);
}

LRESULT ViewDlg::OnPaintZoom(WPARAM w, LPARAM l)
        {
        //MessageBox("OnPaintZoom()");
        char buf[50];
        unsigned long z;
        ::SendMessage(hCtl,PM_CTLGETZOOM,PAN_CTLZOOMBOTH,(LONG)&z);
        z /= 1000;
        // Limit zoom to 3000% to try to catch most of CSI's crashes at extreme zoom.
        if (z > 3000)
                ::SendMessage(hCtl,PM_CTLSETZOOM,PAN_CTLZOOMBOTH,2000000L);
        else
                {
                sprintf(buf,"%lu",z);
                m_ZoomPercent.SetWindowText(buf);
                }
        return 0;
        }
```